United States Patent
Robbin et al.

(10) Patent No.: US 12,360,958 B2
(45) Date of Patent: *Jul. 15, 2025

(54) WIDGET SYNCHRONIZATION IN ACCORDANCE WITH SYNCHRONIZATION PREFERENCES

(71) Applicant: Apple Inc., Cupertino, CA (US)

(72) Inventors: Jeffrey L. Robbin, Los Altos, CA (US); David Heller, Los Altos, CA (US); Christopher R. Wysocki, Los Gatos, CA (US); Timothy Wasko, High River, CA (US); Gordon Freedman, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 90 days.

This patent is subject to a terminal disclaimer.

(21) Appl. No.: 17/647,542

(22) Filed: Jan. 10, 2022

(65) Prior Publication Data

US 2022/0197869 A1 Jun. 23, 2022

Related U.S. Application Data

(63) Continuation of application No. 16/139,980, filed on Sep. 24, 2018, now Pat. No. 11,221,996, which is a
(Continued)

(51) Int. Cl.
*G06F 16/182* (2019.01)
*G06F 3/04842* (2022.01)

(52) U.S. Cl.
CPC ........ *G06F 16/182* (2019.01); *G06F 3/04842* (2013.01)

(58) Field of Classification Search
CPC .......................... G06F 3/04842; G06F 16/182
See application file for complete search history.

(56) References Cited

U.S. PATENT DOCUMENTS 5,793,368 A 8/1998 Beer
5,832,510 A 11/1998 Hiromichi
(Continued)

FOREIGN PATENT DOCUMENTS

EP 1353269 A2 10/2003
EP 1429569 A1 6/2004
(Continued)

OTHER PUBLICATIONS

"iPod + iTunes," Markt+Technick Verlang, Dec. 22, 2007.
(Continued)

*Primary Examiner* — William L Bashore
*Assistant Examiner* — Gregory A Distefano
(74) *Attorney, Agent, or Firm* — Blank Rome LLP

(57) ABSTRACT

Improved techniques and apparatus for managing data between a host device (e.g., host computer) and a client device. The data being managed can, for example, pertain to portable computer programs, such as widgets. The managing of the data thus can involve transfer of portable computer programs (e.g., widgets) between the host device and the client device. In one embodiment, the transfer of portable computer programs between a host device and a client device can be referred to as synchronization.

20 Claims, 52 Drawing Sheets

Related U.S. Application Data continuation of application No. 11/767,443, filed on Jun. 22, 2007, now Pat. No. 10,083,184.

(60) Provisional application No. 60/879,319, filed on Jan. 7, 2007.

(56) References Cited

U.S. PATENT DOCUMENTS

| | | | |
|---|---|---|---|
| 5,845,299 A | 12/1998 | Arora | |
| 5,909,678 A | 6/1999 | Bergman | |
| 5,911,145 A | 6/1999 | Arora | |
| 6,178,443 B1 | 1/2001 | Lin | |
| 6,314,451 B1* | 11/2001 | Landsman | G06Q 30/0241 |
| | | | 709/219 |
| 6,389,467 B1 | 5/2002 | Eyal | |
| 6,411,943 B1 | 6/2002 | Crawford | |
| 6,429,880 B2 | 8/2002 | Marcos | |
| 6,686,937 B1 | 2/2004 | Cragun | |
| 6,993,532 B1 | 1/2006 | Platt | |
| 7,017,120 B2* | 3/2006 | Shnier | H04N 21/25891 |
| | | | 715/783 |
| 7,130,892 B2 | 10/2006 | Mukai | |
| 7,194,692 B2 | 3/2007 | Marcos | |
| 7,233,951 B1 | 6/2007 | Gainer | |
| 7,680,849 B2 | 3/2010 | Heller | |
| 7,707,514 B2 | 4/2010 | Forstall | |
| 7,761,800 B2 | 7/2010 | Chaudhri | |
| 7,765,326 B2 | 7/2010 | Robbin | |
| 7,769,903 B2 | 8/2010 | Robbin | |
| 7,797,446 B2 | 9/2010 | Heller | |
| 7,954,064 B2 | 5/2011 | Forstall | |
| 8,150,937 B2 | 4/2012 | Ng | |
| 8,453,065 B2 | 5/2013 | Chaudhri | |
| 8,543,931 B2 | 9/2013 | Forstall | |
| 8,626,952 B2 | 1/2014 | Robbin | |
| 2001/0047377 A1* | 11/2001 | Sincaglia | H04N 21/816 |
| | | | 348/E7.071 |
| 2002/0026645 A1* | 2/2002 | Son | H04N 21/4753 |
| | | | 725/111 |
| 2002/0078075 A1 | 6/2002 | Colson | |
| 2002/0095663 A1 | 7/2002 | Joory | |
| 2002/0104096 A1* | 8/2002 | Cramer | H04N 21/8193 |
| | | | 348/E7.071 |
| 2003/0079038 A1 | 4/2003 | Robbin | |
| 2003/0167318 A1 | 9/2003 | Robbin | |
| 2003/0236933 A1 | 12/2003 | Shigeta | |
| 2004/0268052 A1* | 12/2004 | Glasco | G06F 12/0817 |
| | | | 711/E12.027 |
| 2005/0289195 A1 | 12/2005 | Lehtola | |
| 2006/0074750 A1* | 4/2006 | Clark | H04N 21/26208 |
| | | | 348/E7.072 |
| 2006/0100978 A1 | 5/2006 | Heller | |
| 2006/0106806 A1 | 5/2006 | Sperling | |
| 2006/0236264 A1 | 10/2006 | Cain | |
| 2006/0265409 A1 | 11/2006 | Neumann | |
| 2006/0265503 A1 | 11/2006 | Jones | |
| 2006/0288057 A1 | 12/2006 | Collins | |
| 2007/0013051 A1 | 1/2007 | Heyan | |
| 2007/0056013 A1 | 3/2007 | Duncan | |
| 2007/0078953 A1 | 4/2007 | Chai | |
| 2007/0101288 A1 | 5/2007 | Forstall | |
| 2007/0101297 A1 | 5/2007 | Forstall | |
| 2007/0106627 A1 | 5/2007 | Srivastava | |
| 2007/0118813 A1 | 5/2007 | Forstall | |
| 2007/0130217 A1 | 6/2007 | Linyard | |
| 2007/0185919 A1 | 8/2007 | Kaplan | |
| 2007/0255850 A1 | 11/2007 | Gould | |
| 2007/0271312 A1 | 11/2007 | Heller | |
| 2008/0018927 A1 | 1/2008 | Martin | |
| 2008/0034309 A1 | 2/2008 | Louch | |
| 2008/0034314 A1 | 2/2008 | Louch | |
| 2008/0076473 A1* | 3/2008 | Yang | H04L 67/04 |
| | | | 455/557 |
| 2008/0082627 A1 | 4/2008 | Allen | |
| 2008/0133653 A1* | 6/2008 | Fok | H04W 4/02 |
| | | | 709/201 |
| 2008/0147671 A1 | 6/2008 | Simon | |
| 2008/0168185 A1 | 7/2008 | Robbin | |
| 2008/0168245 A1 | 7/2008 | De Atley | |
| 2008/0168525 A1 | 7/2008 | Heller | |
| 2008/0168526 A1 | 7/2008 | Robbin | |
| 2009/0061925 A1* | 3/2009 | Finkelstein | H04W 52/0264 |
| | | | 455/566 |
| 2009/0290725 A1 | 11/2009 | Huang | |
| 2010/0161720 A1 | 6/2010 | Colligan | |
| 2010/0287308 A1 | 11/2010 | Robbin | |
| 2011/0173314 A1* | 7/2011 | McQuarrie | G06F 16/93 |
| | | | 709/224 |
| 2014/0358860 A1 | 12/2014 | Wautier | |
| 2015/0193347 A1 | 7/2015 | Kluesing | |

FOREIGN PATENT DOCUMENTS

| | | | |
|---|---|---|---|
| JP | 107509333 A | 10/1995 | |
| JP | 109223060 A | 8/1997 | |
| JP | 2003077214 A | 3/2003 | |
| JP | 2003303137 A | 10/2003 | |
| JP | 2003319485 A | 11/2003 | |
| KR | 20010063284 A | 7/2001 | |
| KR | 20020011027 A | 2/2002 | |
| KR | 20060035634 A | 4/2006 | |
| WO | 0043914 A1 | 7/2000 | |
| WO | 0155889 A1 | 8/2001 | |
| WO | 2004034286 A1 | 4/2004 | |

OTHER PUBLICATIONS

"Perfect guide for digital/audio technique to enjoy music in PC," Nobuya Fukuda, published in "Nikkei Click," Japan, Nikkei business Publications, Inc., Sep. 8, 1999, vol. 6/No. 10, p. 169.

Apple Inc., "Apple-Downloads-Dashboard," http://www.apple.com/downloads/dashboard, downloaded Dec. 16, 2008, pp. 1-2.

Bott, "Special Edition Using Microsoft 1-18 Windows Millennium Passage," Special Edition Using Microsoft Windows Millennium Edition, Nov. 3, 2000, pp. 1-24.

Erdmann et al., "iPod + iTunes," O'Reilly, 2006.

European Search Report for EP 08250051.3, dated May 26, 2008.

GUI Widget, Wikipedia.org, htt://en.wikipedia.org/wiki/Widget_(computing), downloaded Dec. 29, 2008, pp. 1-2.

Hei et al., "iPod+iTunes," Markt+Technick Verlag, Dec. 22, 2006.

International Preliminary Report on Patentability for PCT/US2008/050339, mailed Jul. 16, 2009.

International Search Report and Written Opinion for PCT/US2008/050339, mailed May 26, 2008.

* cited by examiner

WIDGET SYNCHRONIZATION IN ACCORDANCE WITH SYNCHRONIZATION PREFERENCES

CROSS-REFERENCE TO RELATED APPLICATIONS

This application is a continuation of U.S. application Ser. No. 16/139,980, filed Sep. 24, 2018, and entitled "Widget Synchronization in Accordance with Synchronization Preferences," which is a continuation of U.S. application Ser. No. 11/767,443, filed Jun. 22, 2007, and entitled "Widget Synchronization in Accordance with Synchronization Preferences," which claims priority benefit of U.S. Provisional Application No. 60/879,319, filed Jan. 7, 2007, and entitled "MULTI-DEVICE DATA SYNCHRONIZATION OR BACKUP VIA WITH HOST DEVICE," all of which are hereby incorporated herein by reference.

This application is also related to: (i) U.S. application Ser. No. 11/679,082, filed Feb. 26, 2007, and entitled "DATA SYNCHRONIZATION WITH HOST DEVICE IN ACCORDANCE WITH SYNCHRONIZATION PREFERENCES," which is hereby incorporated herein by reference; (ii) U.S. application Ser. No. 11/679,104, filed Feb. 26, 2007, and entitled "PRIORITIZED DATA SYNCHRONIZATION WITH HOST DEVICE," which is hereby incorporated herein by reference; (iii) U.S. application Ser. No. 11/679,114, filed Feb. 26, 2007, and entitled "DATA BACKUP FOR MOBILE DEVICE," which is hereby incorporated herein by reference; (iv) U.S. application Ser. No. 11/499,887, filed Aug. 4, 2006, and entitled "SYNCHRONIZATION OF WIDGETS AND DASHBOARDS," which is hereby incorporated herein by reference; and (v) U.S. application Ser. No. 10/877,968, filed Jun. 25, 2004, and entitled "UNIFIED INTEREST LAYER FOR USER INTERFACES," which is hereby incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND

1. Field of the Invention

The present invention relates to electronic devices and, more particularly, to synchronization of data between electronic devices.

2. Description of the Related Art

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc. However, such synchronization schemes tend to utilize filenames and modification dates to determine whether files need to be copied between the devices.

In the case of media players, such as music players, files are typically moved between a host computer and a media player through use of a drag and drop operation, like that conventionally done with respect to copying of a data file from a Windows desktop to a floppy disk. Hence, a user of the media player manually initiates the synchronization for individual media assets. As a consequence, such manual synchronization tends to be tedious and time consuming for users. Synchronization tends to be slow because data is transmitted between devices over a slow link. More recently, synchronization of a music player with a host computer has been able to be automatically initiated once a bus connection over a peripheral cable connects the music player to the host computer. As an example of such a system, see U.S. Patent Publication No.: 2003/0167318 A1. Conventionally, however, synchronization has not adequately considered multiple different types of devices and the various different types of data that might be stored to such devices. Thus, there is a need for improved techniques and apparatus to synchronize data between media devices.

SUMMARY OF THE INVENTION

The invention relates to improved techniques and apparatus for managing data between a host device (e.g., host computer) and a client device. The data being managed can, for example, pertain to portable computer programs, such as widgets. The managing of the data thus can involve transfer of portable computer programs (e.g., widgets) between the host device and the client device.

The invention can be implemented in numerous ways, including as a method, system, device, apparatus (including graphical user interface), or computer readable medium. Several embodiments of the invention are discussed below.

As a graphical user interface for configuring synchronization preferences for widgets at a host device, one embodiment of the invention can, for example, include at least: a synchronization enable control that enables synchronization of widgets to be enabled or disabled; and a list of available widgets on the host device, each of the available widgets in the list of available widgets being user-selectable.

As a method for establishing synchronization preference settings for widgets on a host computing device able to be synchronized to a client computing device, one embodiment of the invention can, for example, include at least: permitting the user of the host computing device to enable or disable synchronization of widgets; determining available widgets on the host computing device; presenting the available widgets in a list on the host computing device; permitting the user of the host computing device to select one or more of the available widgets in the list to be synchronized; receiving a user selection of one or more of the available widgets in the list to be synchronized; and storing the selected one or more of the available widgets as at least a part of the synchronization preference settings.

As a method for synchronizing widgets on a host computing device to a client computing device, one embodiment of the invention can, for example, include at least: obtaining identification information for a client computing device accessible to the host computing device; retrieving widget synchronization preferences for the client computing device based on the identification information; determining at least one widget utilized on the host computing device that is designated for synchronization with the client computing device based on the widget synchronization preferences; and copying at least a portion of the at least one widget from the host computing device to the client computing device.

As a method for synchronizing widgets on a host computing device to a client computing device, another embodiment of the invention can, for example, include at least: determining whether synchronization of portable computer programs is to be performed; determining at least one portable computer program utilized on the host computing device that is designated for synchronization; and copying at least a portion of the at least one portable computer program from the host computing device to the client computing device.

As a computer readable medium including at least tangible computer program code stored on or in the computer readable medium for synchronizing widgets on a host computing device to a client computing device, one embodiment of the invention can, for example, include at least: computer program code for retrieving a widget synchronization preference for a client computing device that is accessible to the host computing device; computer program code for determining at least one widget utilized on the host computing device that is designated for synchronization with the client computing device based on the widget synchronization preference; and computer program code for copying at least a portion of the at least one widget from the host computing device to the client computing device.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 6A-2 is a summary synchronization screen according to one embodiment of the invention.

FIG. 6B-1 is a personal synchronization preference screen according to one embodiment of the invention.

FIG. 6B-2 is a personal synchronization preference screen according to another embodiment of the invention.

DETAILED DESCRIPTION OF THE INVENTION

The invention relates to improved techniques and apparatus for managing data between a host device (e.g., host computer) and a client device. The data being managed can, for example, pertain to portable computer programs, such as widgets. The managing of the data thus can involve transfer of portable computer programs (e.g., widgets) between the host device and the client device. In one embodiment, the transfer of portable computer programs between a host device and a client device can be referred to as synchronization.

Various aspects, embodiments, implementations or features of the invention can be used separately or in any combination. One aspect of the invention pertains to synchronization of data (e.g., media data) with respect to a client device (e.g., media device). In one embodiment, synchronization can be performed in accordance with different priorities for differ types of data. In another embodiment, synchronization can be performed in accordance with one or more synchronization preferences. Another aspect of the invention pertains to prioritization of media data before being transferred (e.g., copied) from one a host device to a media device. Another aspect of the invention pertains to backup of data for a mobile device, which is typically a media device. According to still another aspect of the invention, a graphical user interface can be presented to assist a user in setting one or more preferences to be utilized during synchronization or data backup. Yet still another aspect of the invention pertains to pairing a media device with a host device (e.g., host computer). Once paired data can be transferred (e.g., for synchronization) between the media device and the host device in a wireless manner.

In general, the client device or the media device can correspond to one or more of: a music player, game player, video player, camera, mobile telephone (e.g., cell phone), personal digital assistant (PDA), and/or the like. When the media device supports two or more such functions, the media device can be referred to as a multi-function device. One example of a multi-function device is a device capable of operating as a mobile telephone and a music player. Another example of a multi-function device is a device capable of operating as a mobile telephone, a music player and a video player.

Embodiments of various aspects of the invention are discussed below with reference to FIGS. 1A-22. However, those skilled in the art will readily appreciate that the detailed description given herein with respect to these figures is for explanatory purposes as the invention extends beyond these limited embodiments.

Figure 1A:
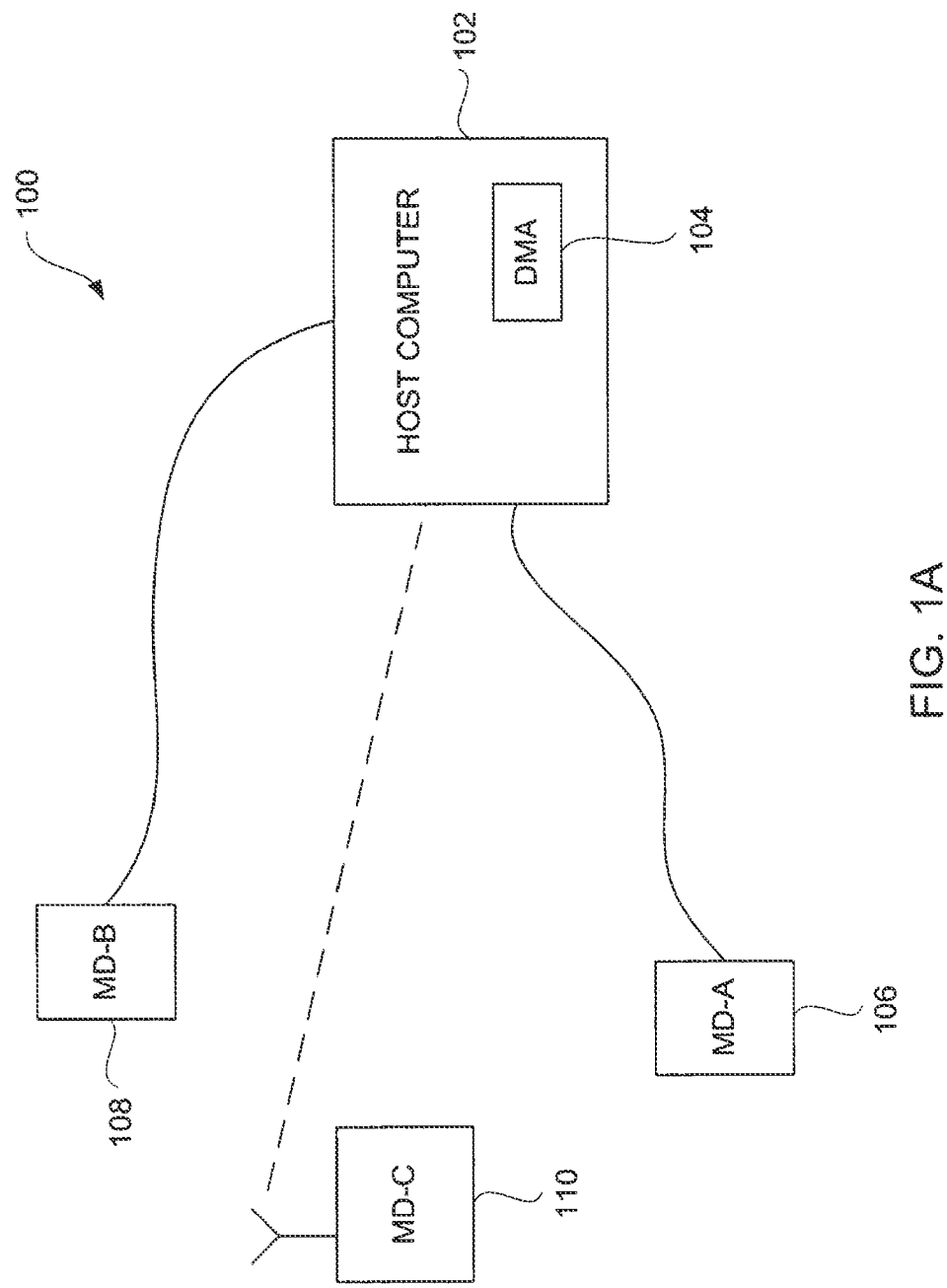
FIG. 1A is a block diagram of a multi-device system according to one embodiment of the invention.

FIG. 1A is a block diagram of a multi-device system 100 according to one embodiment of the invention. The multi-device system 100 includes a host computer 102. The host computer 102 includes a data management application (DMA) 104. The data management application 104 is an application program that operates on the host computer 102. The data management application 104 can manage data on the host computer 102 as well as on other devices that may connect to the host computer 102. More particularly, the multi-device system 100 can also support one or more media devices. As illustrated in FIG. 1A, the host computer 102 can couple to one or more of media device (MD-A) 106, media device (MD-B) 108, and media device (MD-C) 110. Media devices can represent different types of media devices. Examples of media devices include media playback devices (including portable media players, portable digital assistants, mobile telephones), set-top boxes, etc. In some cases, the media devices are mobile or portable. The data management application 104 operating on the host computer 102 can manage data residing on the one or more media devices. More particularly, the data management provided by the data management application 104 can serve to transfer (e.g., synchronize) data, such as media data, between the host computer 102 and one or more of the media devices. In addition, the data management application 104 can also provide data backup for certain data acquired by the one or more media devices.

Figure 1B:
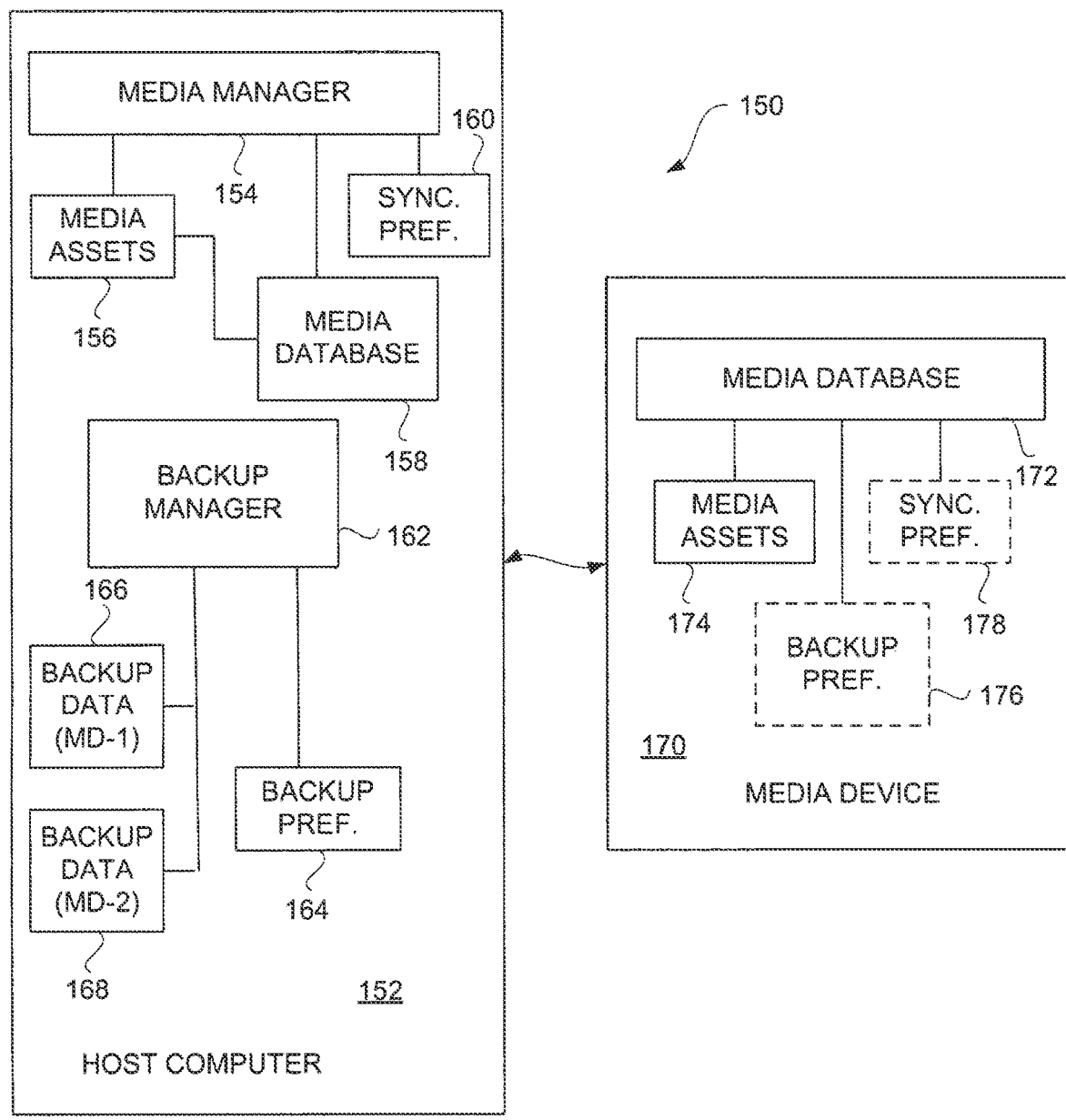
FIG. 1B is a block diagram of a multi-device system according to one embodiment of the invention.

FIG. 1B is a block diagram of a multi-device system 150 according to one embodiment of the invention. The multi-device system 150 includes a host computer 152 having various functional components in order to support synchronization and/or backup operations with respect to one or more media devices. The host computer 152 is, for example, suitable to implement the host computer 102 illustrated in FIG. 1A. The host computer 152 can include a media manager 154. The media manager 154 operates to manage the media assets 156 stored on the host computer 152 as well as associated media information stored in a media database 158. The management of the media assets and the media information involves transfer (e.g., synchronization) of at least a portion of such media assets and corresponding media information with other devices (namely, media devices). The synchronization process can be performed or influenced by one or more synchronization preferences 160 stored at the host computer 152. In one implementation, a user of the host computer 154 can set or modify the one or more synchronization preferences 160. As discussed in further detail below, the synchronization preferences 160 can be set or modified differently for different media devices and/or for different types of media assets. Also, the priority (or order) in which media assets, or types of media assets, are transferred (e.g., during synchronization) can be predetermined or user-determined.

The host computer 152 can also includes a backup manager 162. The backup manager 162 is a functional module, such as provided by a data management application, operating on the host computer 152. The backup manager 162 operates to backup certain data that is associated with one or more of the media devices being supported by the host computer 152. In this regard, the backup manager 162 can utilize one or more backup preferences 164. The user of the host computer 152 can set or modify the one or more backup preferences 164. As discussed in greater detail below, the backup preferences 164 can be set differently for different media devices. The backup manager 162 can also store backup data for the one or more mobile devices. As depicted in FIG. 1B, the backup manager 162 has stored backup data (MD-1) 166 for a first mobile device and stored backup data (MD-2) 168 for a second media device.

Although the media manager 154 and the backup manager 162 are shown as separate functional modules, the media manager 154 and the backup manager 162 can be part of a common manager. The common manager can be provided by a data management application.

The multi-device system 150 also includes a media device 170. The media device 170 represents one media device that can be coupled to the host computer 152. However, it should be understood that the multi-device system 150 can allow one or more such media devices to be connected to the host computer 152. The media device 170 can include a media database 172 and media assets 174. The media device 170 can also include one or more backup preferences 176 and one or more synchronization preferences 178. The media assets 174 represent the media assets stored on the media device 170. For example, these media assets 174 have been stored to the media device 170 by the media manager 154 of the host computer 152 during a synchronization operation. Additionally, the media device 170 can also acquire media assets directly and store them to the media assets 174. Similarly, media information associated with the media assets can be stored to the media database 172.

The one or more backup preferences 176 and the one or more synchronization preferences 178 can be optionally provided on the media device 170. In other words, the user of the media device 170 can optionally set one or more backup preferences 176 to be utilized during backup of certain data from the media device 170 to the host computer 152 as supervised by the backup manager 162. The one or more synchronization preferences 178 can also be optionally provided by a user of the media device 170. To the extent that the one or more synchronization preferences 178 have been locally provided at the media device 170, the media manager 154 may utilize the one or more synchronization preferences 178 when performing a synchronization operation with respect to the media device 170. In one embodiment, the host computer 152 stores the one or more synchronization preferences 160 and the media device 170 also stores one or more synchronization preferences 178. The synchronization preferences themselves can thus, in one embodiment, be changed at either the host computer 152 or the media device 170. In the event of conflicts between the synchronization preferences, certain predetermined rules can be utilized to resolve such conflicts. Likewise, one or more backup preferences can be set from either the host computer 152 and/or the media device 170.

Figure 2:
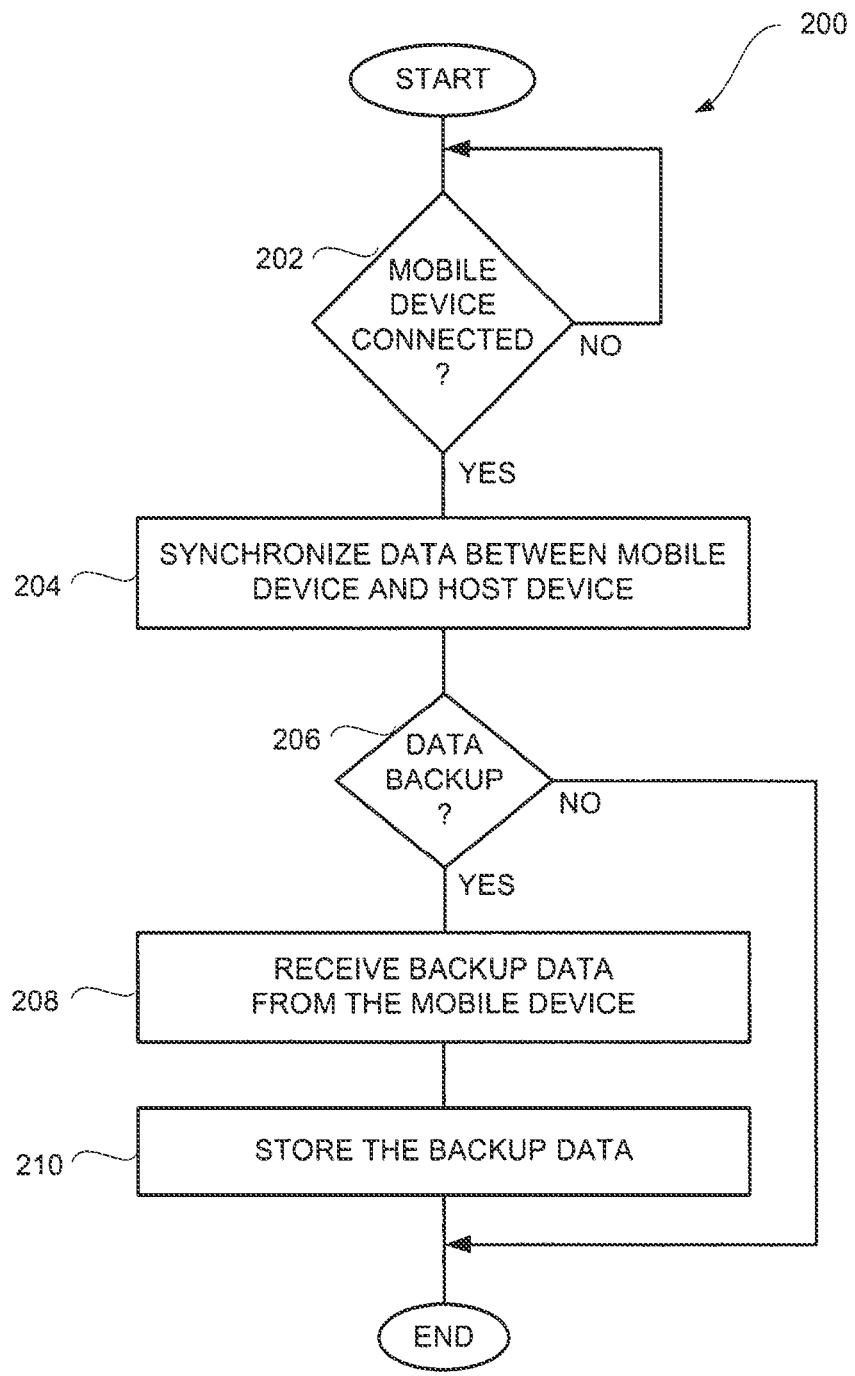
FIG. 2 is a flow diagram of a data transfer process according to one embodiment of the invention.

FIG. 2 is a flow diagram of a data transfer process 200 according to one embodiment of the invention. The data transfer process 200 is, for example, performed by a host device, such as the host computer 102 illustrated in FIG. 1A or the host computer 152 illustrated in FIG. 1B.

The data transfer process 200 begins with a decision 202. The decision 202 determines whether a mobile device is connected. In this embodiment, the host computer can determine whether a mobile device has been connected. As an example, the mobile device can be a media device that may be connected to the host device. When the decision 202 determines that a mobile device has not been connected, then the data transfer process 200 awaits such a mobile device connection. On the other hand, when the decision 202 determines that a mobile device has been connected, the data transfer process 200 is effectively invoked. In other words, in one embodiment, the connection of a mobile device to the host computer can automatically trigger the data transfer process 200.

Once the decision 202 determines that a mobile device has been connected, data can be synchronized 204 between the mobile device and the host device. Typically, the data being synchronized 204 includes media data. The data can also include other data such as workout data, game play data, configuration or settings data, etc. Furthermore, the data can also include other data such as widgets and their associated data. The synchronization 204 concerns the transfer of data between the mobile device and the host device. Synchronization is discussed in more detail below.

Next, a decision 206 determines whether data is to be backed up. Here, the decision 206 is determining whether data residing on the mobile device should be backed up at the host device (e.g., host computer). When the decision 206 determines that data on the mobile device should be backed up at the host device, backup data is received 208 from the mobile device. The backup data is then stored 210 at the host device. On the other hand, when the decision 206 determines that backup data is not to be stored at the host device, the blocks 208 and 210 are bypassed. Following the block 210, or its being bypassed, the data transfer process 200 ends.

The media device utilized in accordance with the present invention can store a large number of media assets. These media assets can be of the same type or different type of media asset. For example, one type of media asset is audio files, such as music (songs), audiobooks or podcasts. Another type of media assets are images, such as photos. Still another type of media asset is video files, such as movies or music videos. The media device includes a data storage device (e.g., memory) that is able to store media assets that have been copied to the media device. However, media storage to the data storage device is limited at the media device. Hence, it is not always possible to store within the data storage device all of the media assets that are to be copied (e.g., from a host device) to the media device. As a result, in one embodiment of the invention, different priority levels can be used to prioritize which of the media assets should be stored to the media memory.

One aspect of the invention pertains to synchronization of media data (e.g., media assets) for a media device. Synchronization can be between a host device (e.g., host computer) and the media device. Preference settings can be established at either the host device or the media device and utilized to control or influence the synchronization process.

Figure 3:
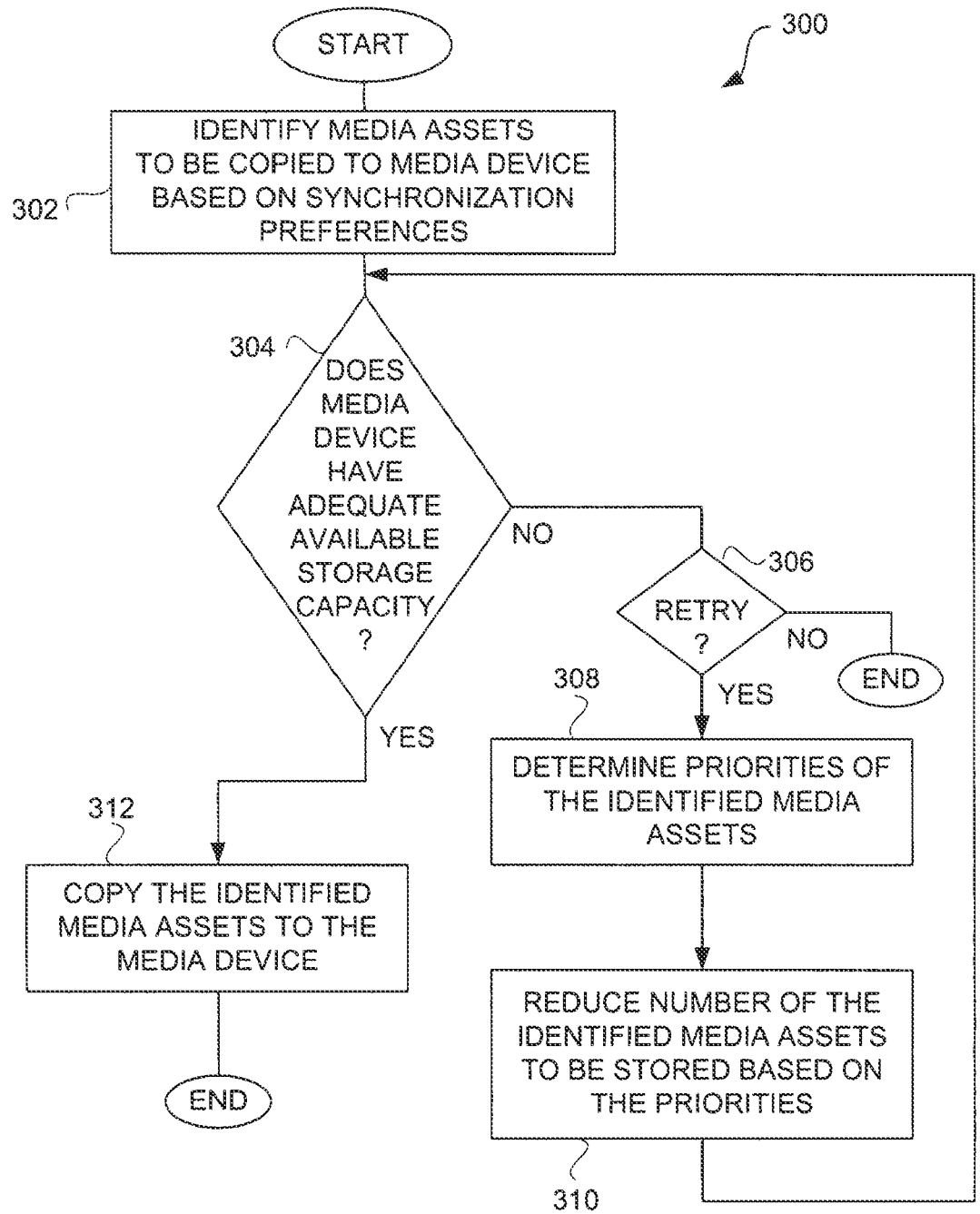
FIG. 3 is a flow diagram of a synchronization process according to another embodiment of the invention.

FIG. 3 is a flow diagram of a synchronization process 300 according to one embodiment of the invention. The synchronization process 300 is, for example, performed by a host computer, such as the host computer 102 illustrated in FIG. 1A or the host computer 152 illustrated in FIG. 1B.

The synchronization process 300 initially identifies 302 media assets to be copied to a media device. The media assets being identified 302 can be dependent on one or more synchronization preferences. A decision 304 then determines whether the media device has adequate available storage capacity to store all the identified media assets. In one embodiment, the available storage capacity for the media device can be determined by media device capabilities provided by the media device. For example, the media device might indicate that it has ten gigabytes of free space and five gigabytes of previously stored media assets. The available storage capacity can then be considered ten gigabytes or fifteen gigabytes depending upon user preference or depending on whether the presently stored media assets necessarily need to be maintained.

In any case, when the decision 304 determines that the media device does not have adequate available storage capacity, a decision 306 determines whether additional processing is desired to attempt to reduce the amount of storage capacity required. When the decision 306 determines that such additional processing is not desired, then the synchronization process 300 is complete and ends with no synchronization being performed. Alternatively, when the decision 306 determines that the additional processing is to be performed, priorities of the identified media assets are determined 308. Each of the identified media assets can have a priority or can be associated with a priority. Then, the number of the identified media assets can be reduced 310 based on the priorities of the identified media assets. The priorities can depend on various different criteria, such as media type, usage status (watched/unwatched), rating, time (recently purchased), device type, etc. Following the operation 310, the synchronization process 300 returns to repeat the decision 304 and subsequent operations so that the decision 304 can again evaluate whether the media device now has adequate available storage capacity can be reevaluated.

Once the decision 304 determines that the media device has adequate available storage capacity, the identified media assets are copied 312 to the media device. Typically, when the identified media assets are copied 312, media information pertaining to the identified media assets can also copied from the host computer to the media device. Typically, the media information would be stored to a media database (e.g., media database 172) provided within the media device. Thereafter, the synchronization process 300 is complete and ends with synchronization having been performed, at least to the extent of available storage capacity.

Figure 4A:
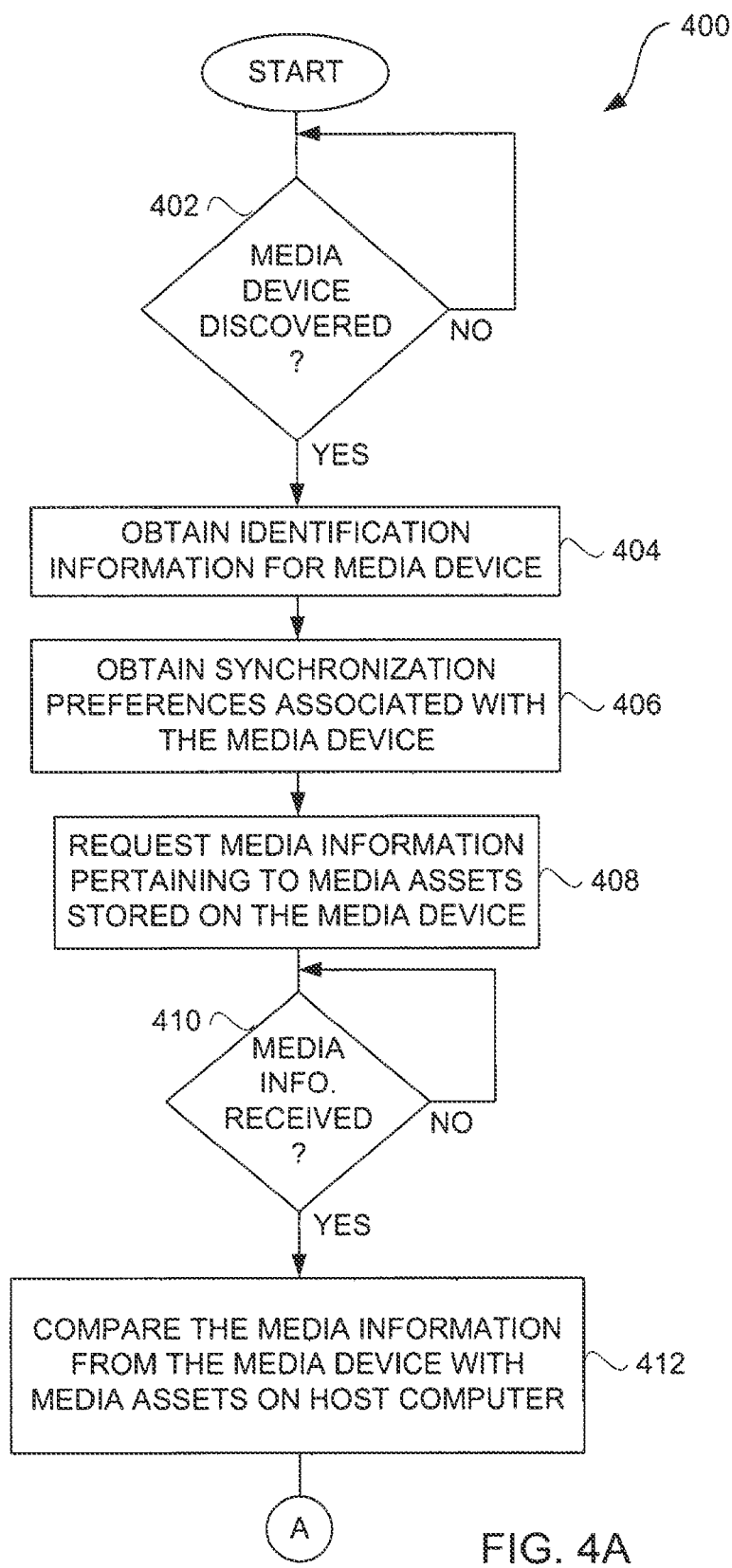
FIGS. 4A-4C are flow diagrams of a detailed synchronization process according to one embodiment of the invention.
Figure 4B:
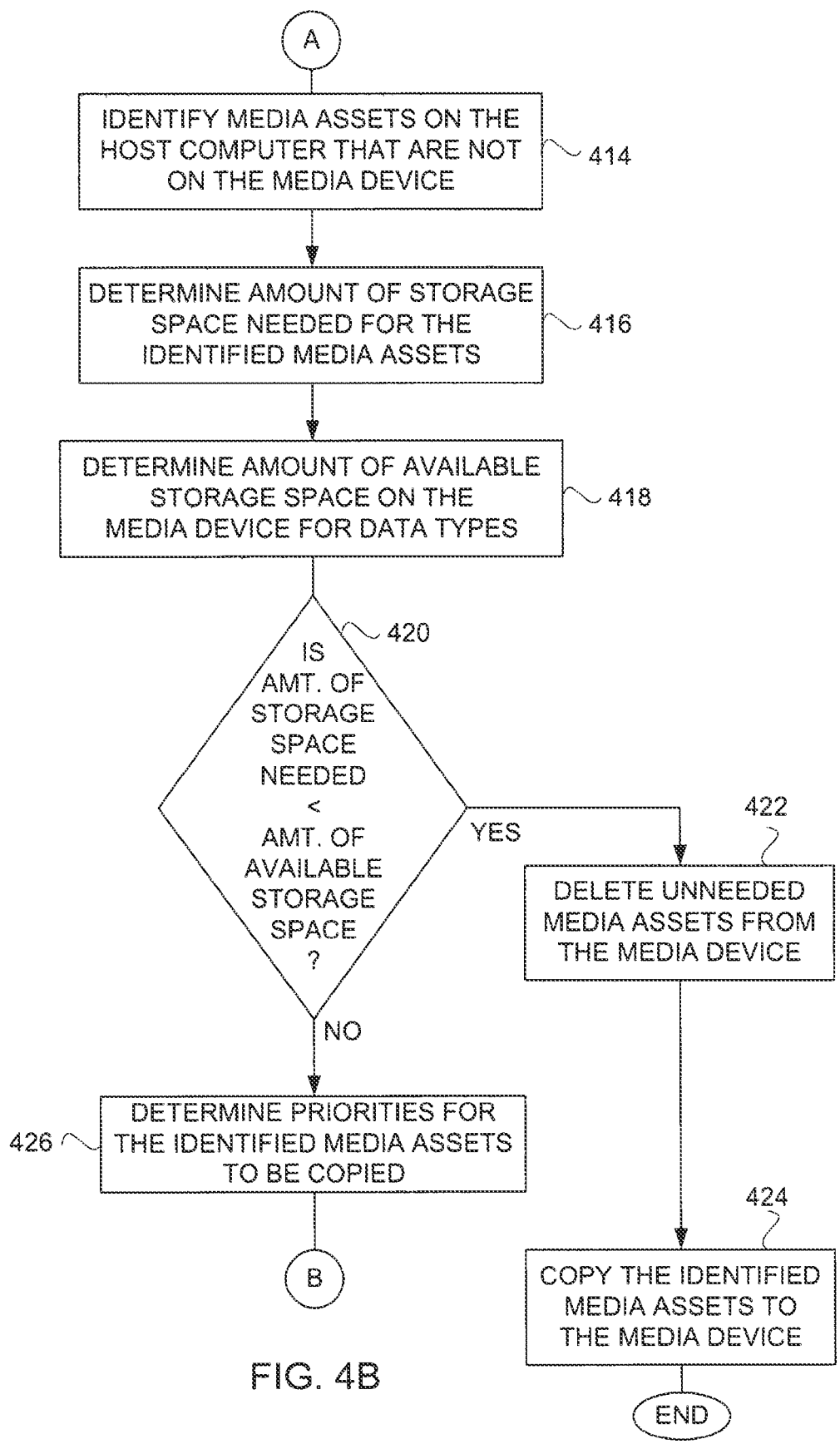
Figure 4C:
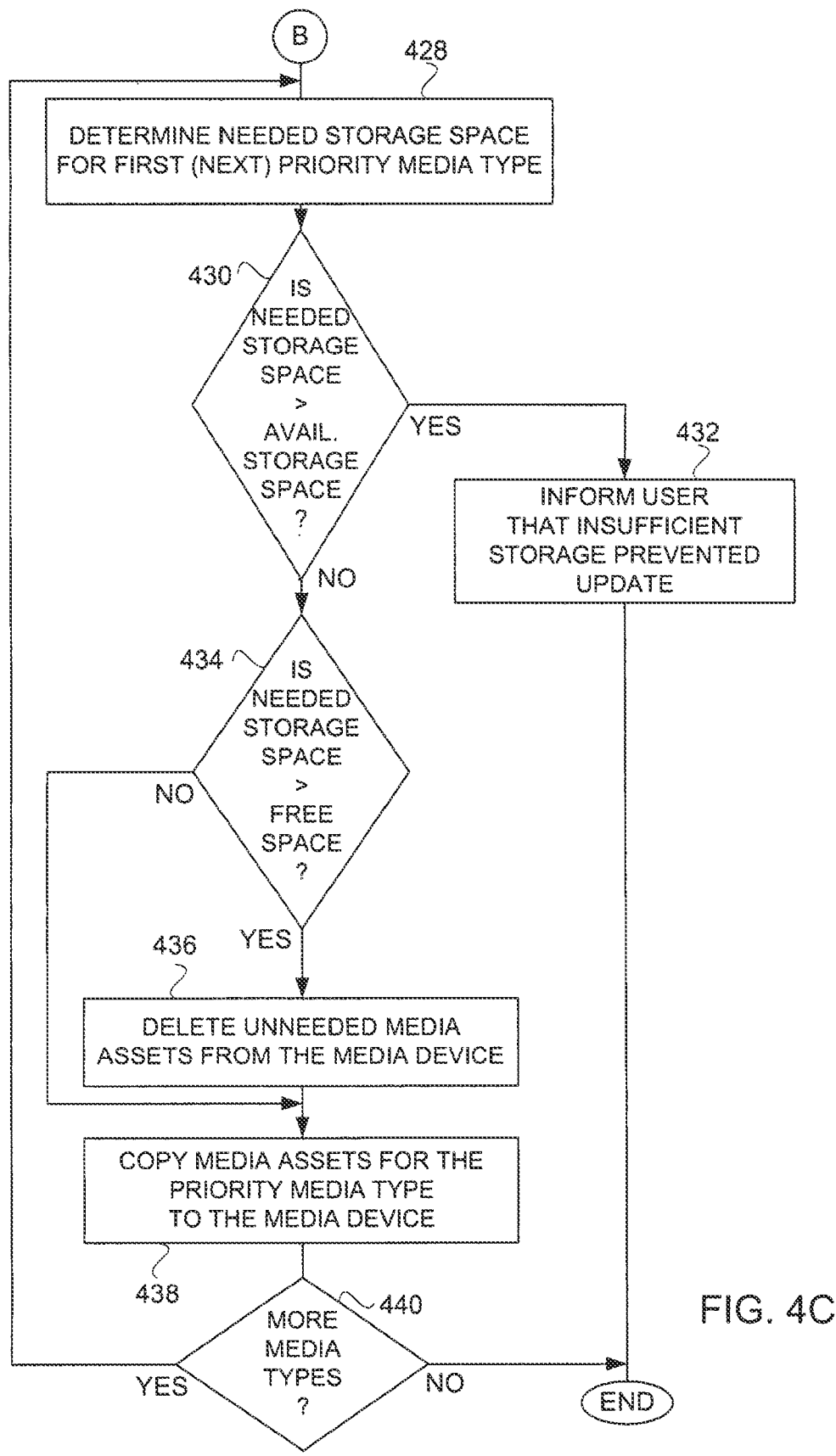

FIGS. 4A-4C are flow diagrams of a detailed synchronization process 400 according to one embodiment of the invention. The detailed synchronization process 400 is, for example, performed by a host computer, such as the host computer 102 illustrated in FIG. 1A or the host computer 152 illustrated in FIG. 1B.

The synchronization process 400 begins with decision 402 that determines whether a media device has been discovered. For example, upon connection of a media device to the host computer, the host computer can detect or discover the presence of the media device. In such case, the host computer can automatically initiate a synchronization process. Hence, when the decision 402 determines that a media device has been discovered, the synchronization process 400 continues. In other words, the synchronization process 400 can be deemed invoked once a media device has been discovered.

When the synchronization process 400 continues, identification information for the media device is obtained 404. The identification information pertains to an identifier stored on the media device that can be read by a host computer. The identifier for the media device server to identify at least the type of media device but may also uniquely identify the specific media device. Next, synchronization preferences associated with the media device can be obtained 406. Here, the synchronization preferences can be associated with the media device. In one implementation, the synchronization preferences are transferred from the media device that stores them to the host computer that performs the synchronization process 400. In another implementation, the synchronization preferences are obtained from the host computer itself based on the identifier for the media device. Since the host computer can support multiple media device, the identifier serves to enable the host computer to locate and retrieve the appropriate synchronization preferences. The synchronization preferences are typically set in advance at the host computer by a user selection or setting with respect to a media management application. The media device may also or alternatively enable a user to set synchronization preferences. The synchronization preferences can be provided in relation to various different criteria, such as media type, usage status (watched/unwatched), device type, etc., which impact what media assets are to be synchronized.

Then, media information pertaining to media assets stored on the media device is requested 408. Typically, each of the media assets is associated with a media type. Examples of media types can include music, movies, TV shows, podcasts and photos. A decision 410 determines whether media information has been received from the media device. Once the media information from the media device has been received, the media information from the media device is compared 412 with media information on the host computer. In one embodiment, the media information includes media attributes of the media assets which can be compared to determine which media assets are to be transferred. In one example, the media attributes include at least a title and an artist name for media assets that are audio files. In another example, the media attributes include an identifier, a modification date and a size for media assets that are image files. Additional information on comparison of media attributes is provided in U.S. application Ser. No. 10/118,069. Based on the comparing 412, media assets on the host computer that are not on the media device can be identified 414.

Next, an amount of storage space needed for the identified media assets is determined 416. In one embodiment, the size of the media assets are known or predetermined so that the amount of storage space required for the identified media assets can be computed at the host computer. In addition, an amount of available storage space on the media device is determined 418. This determination may be assisted by media device capabilities obtained from the media device. For example, the media device capabilities might indicate the amount free memory storage on the media device.

In any case, a decision 420 then determines whether the amount of storage space needed to store the identified media assets is less than the amount of available storage space on the media device. When the amount of storage space needed is less than the amount of available storage space, the synchronization can be immediately performed. Namely, any unneeded media assets can be deleted 422 from the media device, and the identified media assets can be copied 424 to the media device. It is not necessary that unneeded media assets be deleted 422, particularly when the memory device has sufficient free memory capacity to store the identified media assets without removing any of the previously stored media assets. After the identified media assets have been copied 424, the synchronization process 400 is complete and ends with the synchronization having been performed.

On the other hand, when the decision 420 determines that the amount of storage space needed is not less than the amount of available storage space, priorities for the identified media assets to be copied are determined 426. In one implementation, it is assumed that the identified media assets can be grouped into types of media assets (i.e., media types), and that the different media types can have a different priority associated therewith. In one embodiment, the order of priority for the different media types can be set from either the host computer 152 and/or the media device 170. As explained in detail below with respect to FIG. 4C, the synchronization continues by synchronizing media assets in accordance with an order of priority for the different media types. As an example, an order of priority for the following media types could be set as follows: movies, TV shows, music, podcasts and photos. In such as example, movies would be the highest priority and photos would be the lowest priority.

Next, needed storage space for the priority media type is determined 428. A decision 430 then determines whether the needed storage space for the first priority media type is greater then the available storage space at the media device. When the needed storage space exceeds the available storage space, then the identified media assets of the priority media type are not able to be copied to the media device. In such case, the user can be informed 432 that insufficient storage prevented update (or further update). Thereafter, the synchronization process is complete and ends given that inadequate available storage space exists on the media device. It should be noted that the available storage space on the media device can consider previously stored media assets (of at least certain media types) to be part of the available storage space.

Alternatively, when the decision 430 determines that the needed storage space for storage of the first priority media type is not greater than the available storage space on the media device, a decision 434 determines whether the needed storage space is greater the amount of free space on the media device. When the decision 434 determines that the needed storage space exceeds free space, then any unneeded media assets can be deleted 436 from the media device to free up additional available storage space. Optionally, prior to such deletion 436, a user warning or dialog can be presented to a user and enable the user to abort the synchronization process 400. Alternatively, when the needed storage space does not exceed the free space, the operation 436 can be bypassed so that unneeded media assets need not necessarily be deleted 436 from the media device.

Following the operation 436, or its being bypassed, media assets for the priority media type are copied 438 to the media device. Thereafter, a decision 440 determines whether more media types are to be similarly processed. When the decision 440 determines that more media types are to be processed, then the synchronization process 400 returns to repeat the operation 428 and subsequent operations so that a next priority media type can be similarly processed. Alternatively, when the decision 440 determines that there are no more media types to be processed, the synchronization process 400 is complete and ends.

Further, as discussed below, the media assets within each of the media types can be copied in accordance with a priority (or order). Hence, in another embodiment, those of the media assets within a media type that are able to be stored on the media device can be copied in accordance with the priority (or order).

Figure 5A:
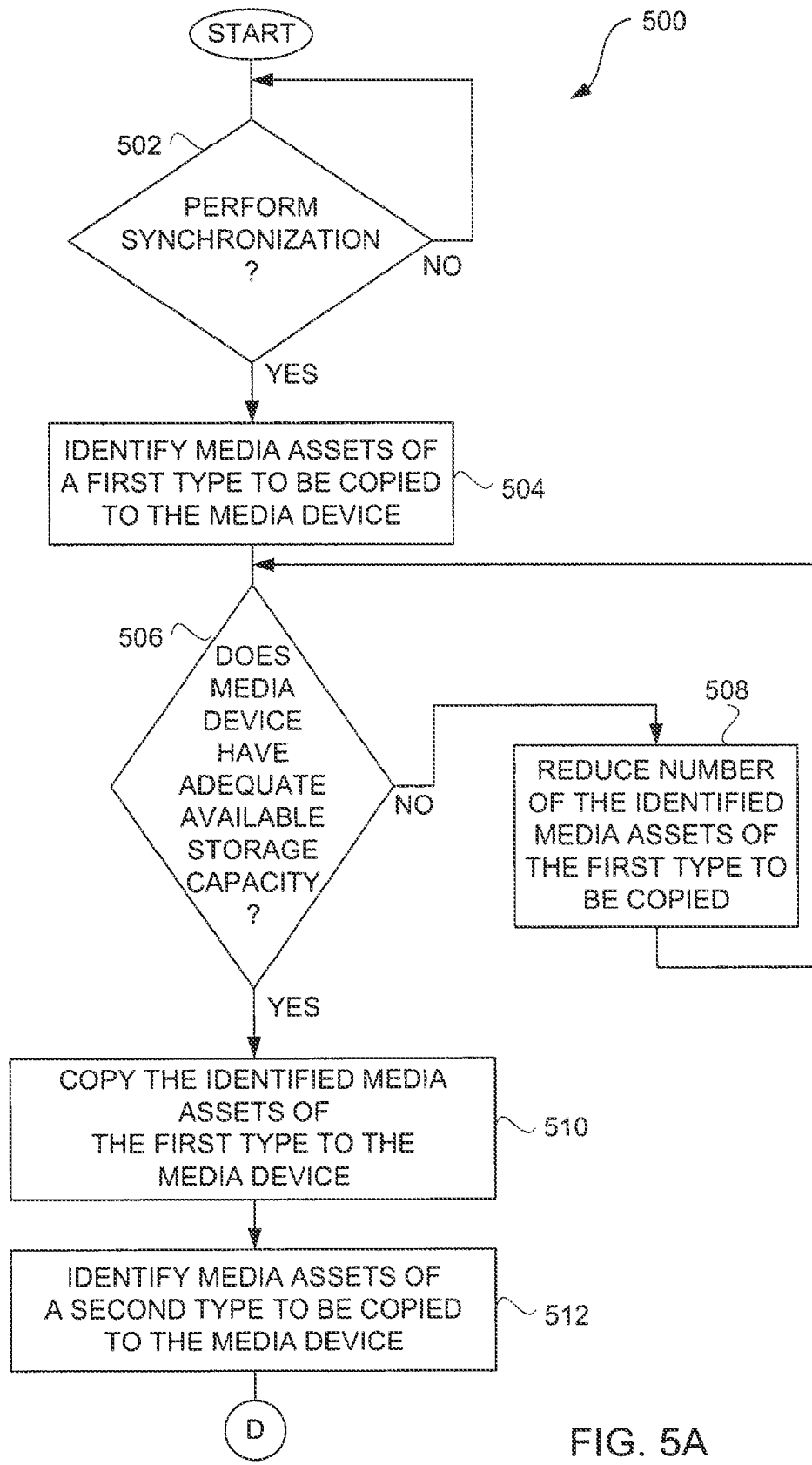
FIGS. 5A and 5B are flow diagrams of a multiple media synchronization process according to one embodiment of the invention.
Figure 5B:
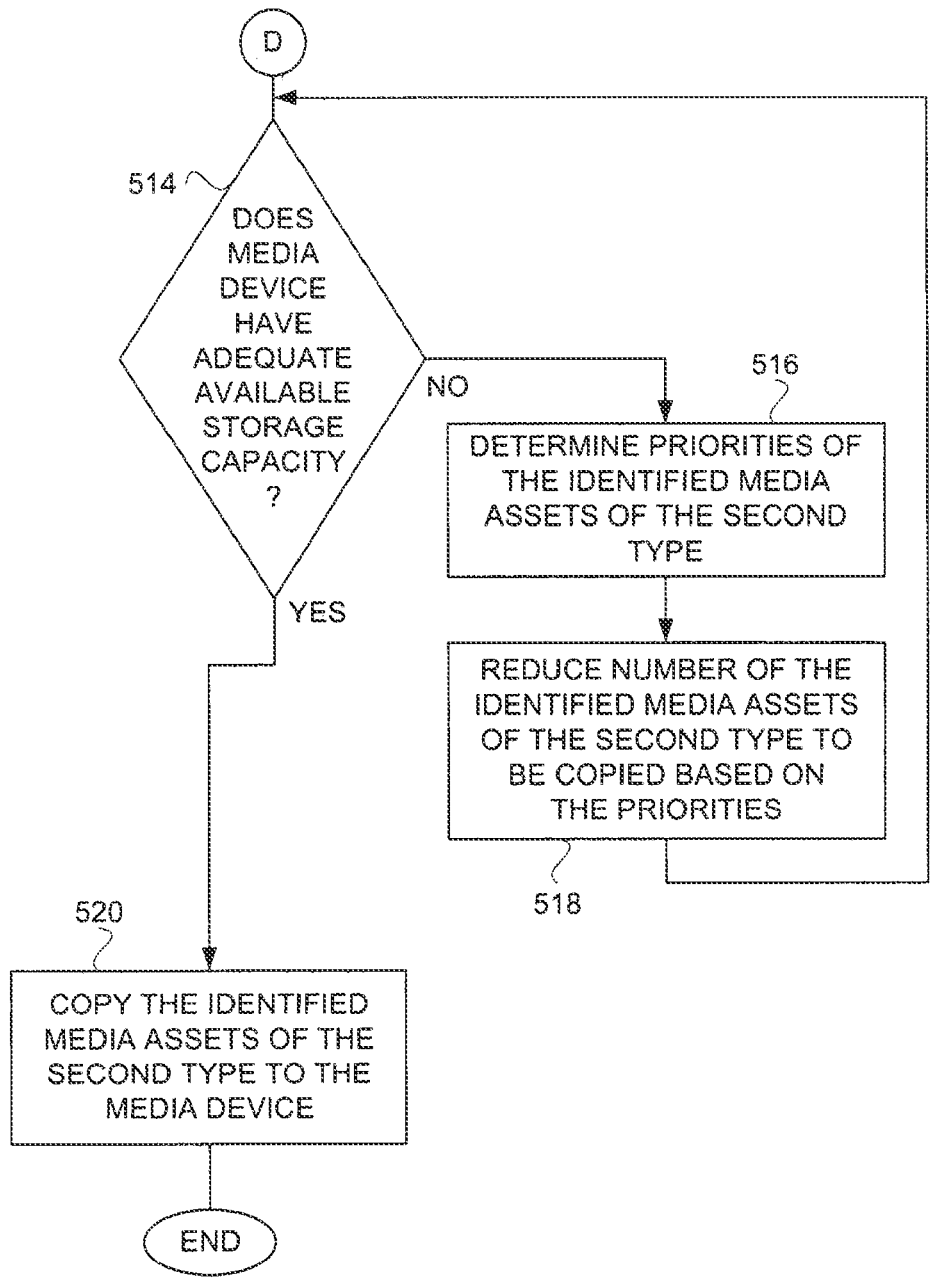

FIGS. 5A and 5B are flow diagrams of a multiple media synchronization process 500 according to one embodiment of the invention. The multiple media synchronization process 500 is, for example, performed by a media manager of a host computer, such as the media manager 154 illustrated in FIG. 1B. Here, the multiple media can pertain to different types of media assets. For example, one type of media assets can be audio files, such as songs, another type of media assets can pertain to images, such as photos, and another type of media asset can pertain to video, such as movies.

The multiple media synchronization process 500 begins with a decision 502 that determines whether synchronization is to be performed. Synchronization can be requested by a user or can be initiated automatically by the host computer. When the decision 502 determines that synchronization is not to be performed, the multiple media synchronization process 500 awaits the need for synchronization. In other words, the multiple media synchronization process 500 can be deemed to be activated when synchronization is to be performed.

Once synchronization is to be performed, media assets of a first type that are to be copied from the host computer to the media device are identified 504. A decision 506 then determines whether the media device has adequate available storage capacity. The available storage capacity at the media device includes at least free space of the storage memory within the media device but can also include storage capacity associated with previously stored media assets that can be deleted. In any case, when the decision 506 determines that the media device does not have adequate available storage capacity, the number of the identified media assets of the first type to be copied can be reduced 508. Following the reduction 508, the multiple media synchronization process 500 returns to repeat the decision 506 to reconsider whether there is now adequate available storage capacity. Once the decision 506 determines that the media device has adequate available storage capacity, the identified media assets of the first type are copied 510 to the media device. Additionally, the host computer and the media device can also include media databases, and when media assets are copied, associated database information (e.g., metadata) for such media assets can also copied.

Next, media assets of a second type to be copied from the host computer to the media device are identified 512. A decision 514 then determines whether the media device has adequate available storage capacity. It should be noted that the available storage capacity of the media device considered at the decision 514 can consider all previously stored media assets of the second and lower priority types as being available. If such storage space is needed, the previously stored media assets of the second and lower priority types can be deleted from the memory storage of the media device.

In any case, when the decision 514 determines that the media device does not have adequate available storage capacity, priorities of the identified media assets of the second type are determined 516. Then, the number of the identified media assets of the second type that are to be copied can be reduced 518 based on the priorities. The effect of the reduction 518 can be that the number of media assets to be copied to the media device is reduced. Here, given that the media assets of the first type have already been copied to the media device, the media device offers less available storage capacity to store media assets of the second type. Hence, it is possible that the media device is unable to store any of the identified media assets of the second type. Further, it should be noted that the media assets of the second type can be grouped into collections, and that the reduction 518 of the number of the identified media assets of the second type can be performed in accordance with a collection so that the reduction process eliminates identified media assets on a collection basis. In any case, following the operation 518, the multiple media synchronization process 500 returns to repeat the decision 514 so that the determination of whether the media device has adequate available storage capacity can be reexamined. If further reduction is needed, blocks 518 can again be performed.

In any event, once the decision 514 determines that the media device has adequate available storage capacity, the identified media assets for the second type can be copied 520 to the media device. Any associated database information can also be copied to the media device. Following the operation 520, the multiple media synchronization process 500 can end.

As previously noted, synchronization is a form of media management. The ability to automatically initiate synchronization was also previously discussed. However, the synchronization between devices can be restricted so as to prevent automatic synchronization when the host computer and media device do not recognize one another. Accordingly, in one embodiment, when a media device is first connected to a host computer (or even more generally when matching identifiers are not present), the user of the media device can be queried as to whether the user desires to affiliate, assign or lock the media device to the host computer. When the user of the media device elects to affiliate, assign or lock the media device with the host computer, then a pseudo-random identifier can be obtained and stored in either the media database or a file within both the host computer and the media device. In one implementation, the identifier is an identifier associated with (e.g., known or generated by) the host computer or its management module and such identifier is sent to and stored in the media device. In another implementation, the identifier is associated with (e.g., known or generated by) the media device and is sent to and stored in a file or media database of the host computer.

Figures 1, 6A:
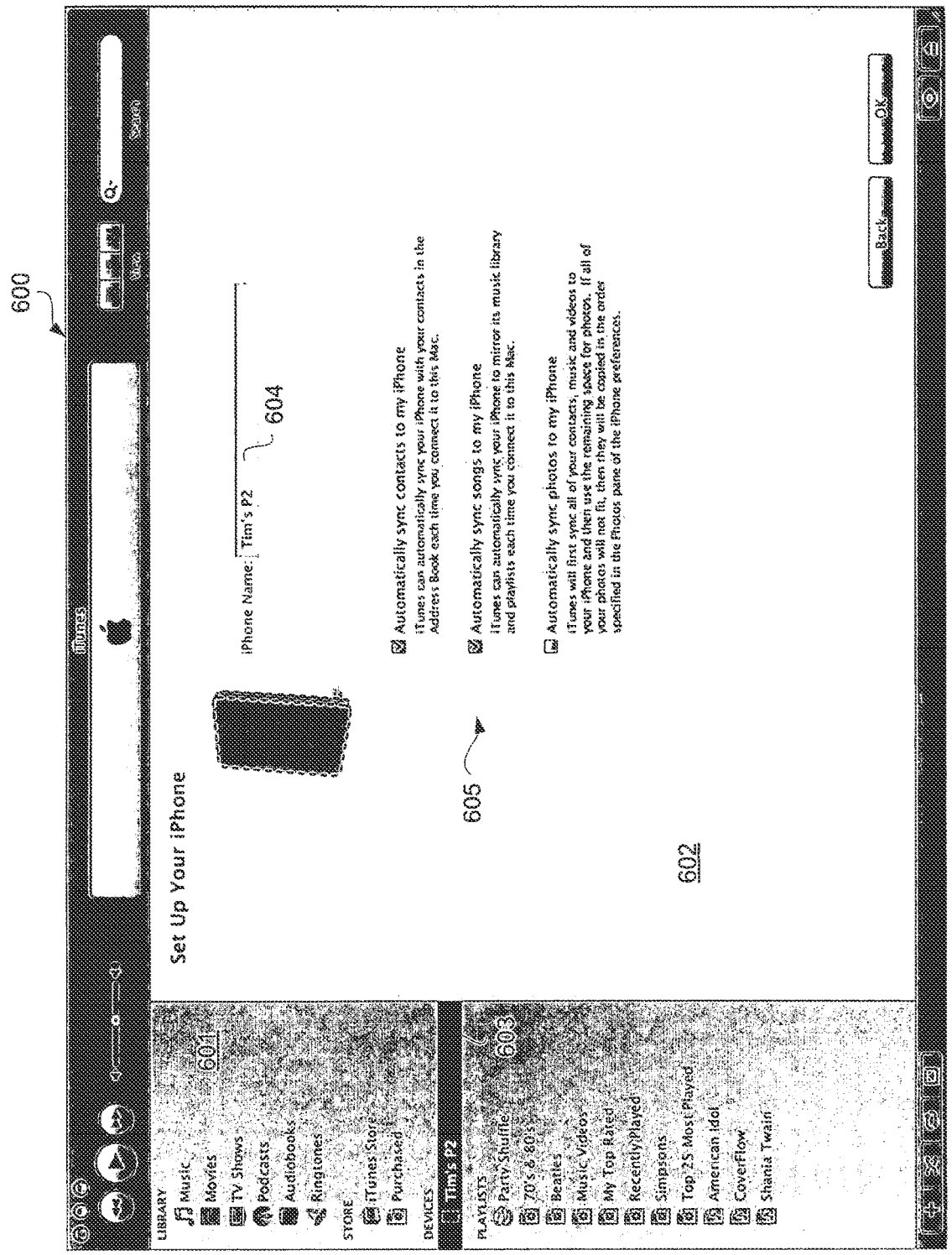
FIG. 6A-1 is a synchronization setup screen according to one embodiment of the invention.
Figures 2, 6A:
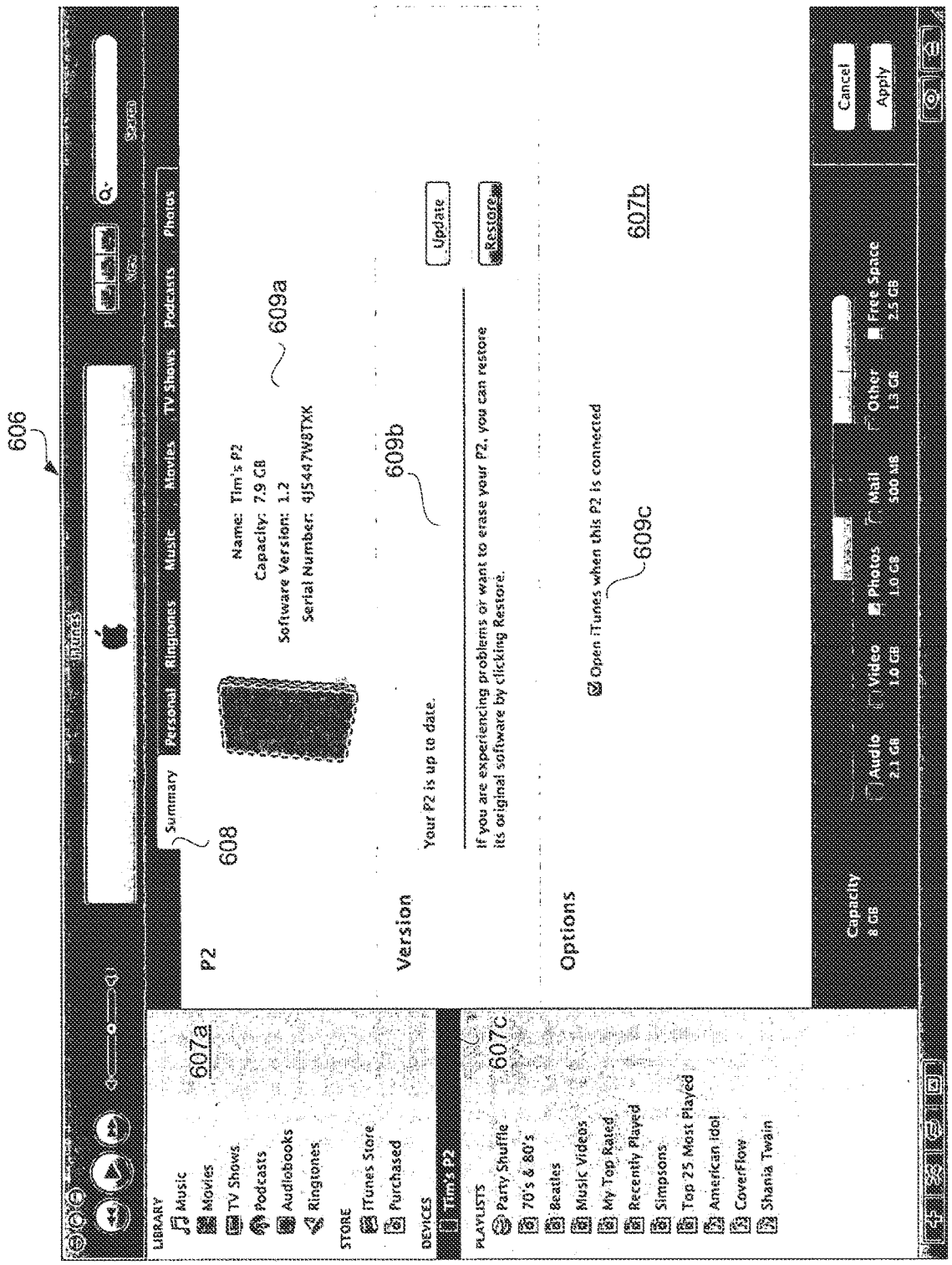

According to one aspect of the invention, a graphical user interface can be presented to assist a user to set of one or more preferences to be utilized during synchronization. In one embodiment, the preferences for synchronization can be set differently for different devices. FIGS. 6A-1 and 6A-2 are exemplary screenshots suitable for use in configuring a mobile device for automatic synchronization. FIGS. 6B-6H are exemplary screenshots suitable for use for setting preferences for a plurality of different types of media assets. These exemplary screenshots are used to set preferences, namely, synchronization preferences, for a particular mobile device. However, multiple separate sets of such exemplary screenshots can be used to set preferences for multiple mobile devices. The multiple mobile devices can be the same or different mobile devices. These exemplary screenshots are presented on a host device, such as a personal computer, that can operate a media management application. However, alternatively, similar or simplified screenshots can be used on a mobile device.

FIG. 6A-1 is a synchronization setup screen 600 according to one embodiment of the invention. The synchronization setup screen 600 includes a source region 601 that specifies various media sources that can be selected, and an information region 602 that displays information pertaining to a selected media source. Here, a particular device from the source region 601 is selected as indicated by a visual designator 603. When the particular device is so selected, the information region 602 can display setup information that facilitates a user in configuring automatic synchronization with respect to the particular device. More specifically, the information region 602 provides a device name text box 604 where the user can provide a name for the particular device, and a plurality of user selectable controls 605 that serve to configure synchronization operations for the particular device. In the particular example illustrated in FIG. 6A-1, the user selectable controls 605 enable the user to separately enable or disable automatic synchronization for different types of data assets, such as contacts, songs and photos. The automatic nature of synchronization refers to the automatic performance of such synchronization without user participation once a device is connected to a personal computer.

FIG. 6A-2 is a summary synchronization screen 606 according to one embodiment of the invention. The summary synchronization screen 606 includes a source region 607*a* that specifies various media sources that can be selected, and an information region 607*b* that displays information pertaining to a selected media source. Here, a particular device from the source region 607*a* is selected as indicated by a visual designator 607*c*. Here, the particular device is labeled "Tim's P2" which is a mobile device that can connect to and exchange data (e.g., media data, backup data, etc.) with a host device (e.g., host computer). In one embodiment, the mobile device can be a multi-function device supporting at least media playback and wireless voice communications. The summary synchronization preference screen 606 indicates a summary tab 608 being selected. When the particular device is so selected in the source region 607*a*, the information region 607*b* can display device information 609*a* about the particular device, version information 609*b* (software version) for the particular device, and option setting(s) 609*c*.

Figures 1, 6B:
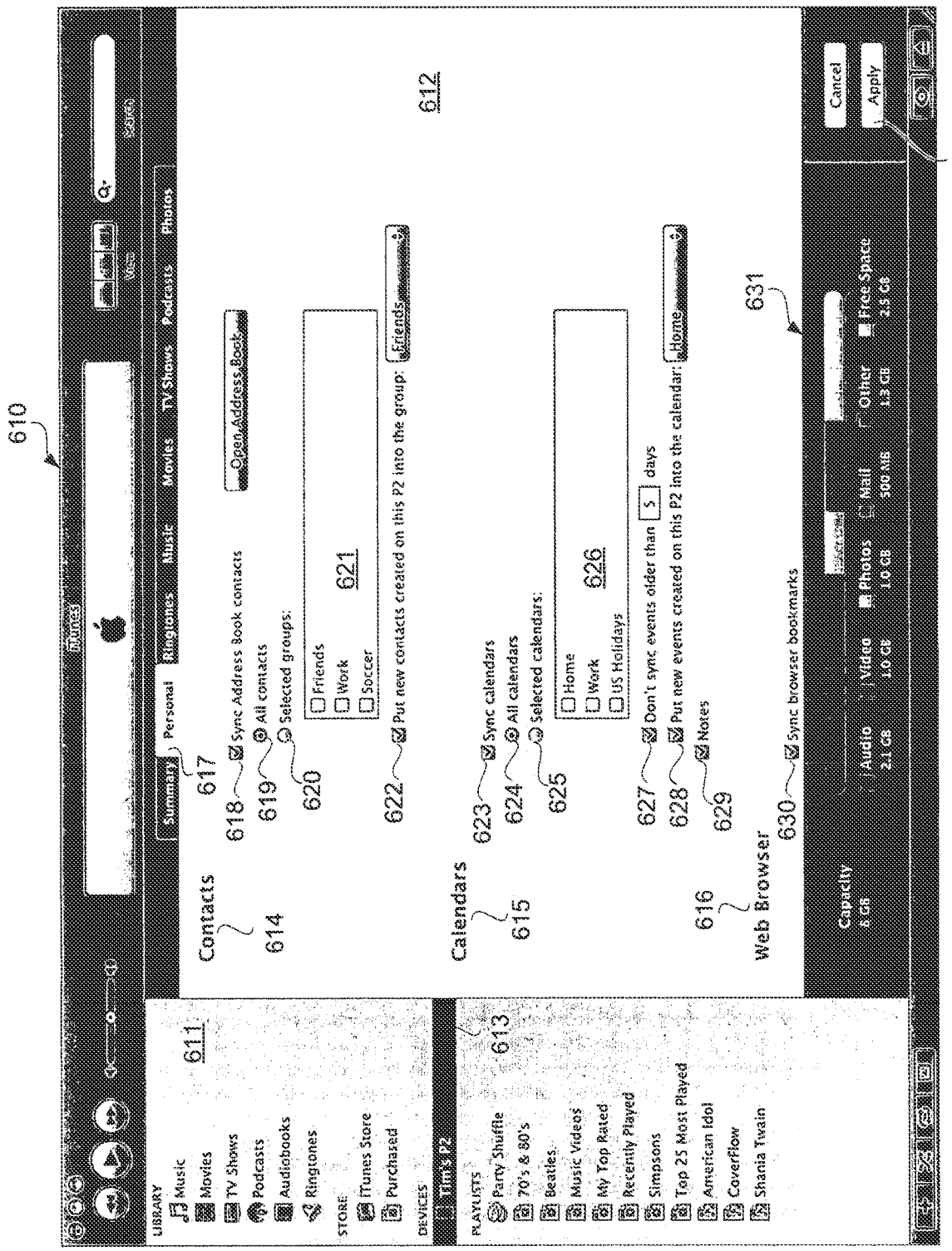
Figures 2, 6B:
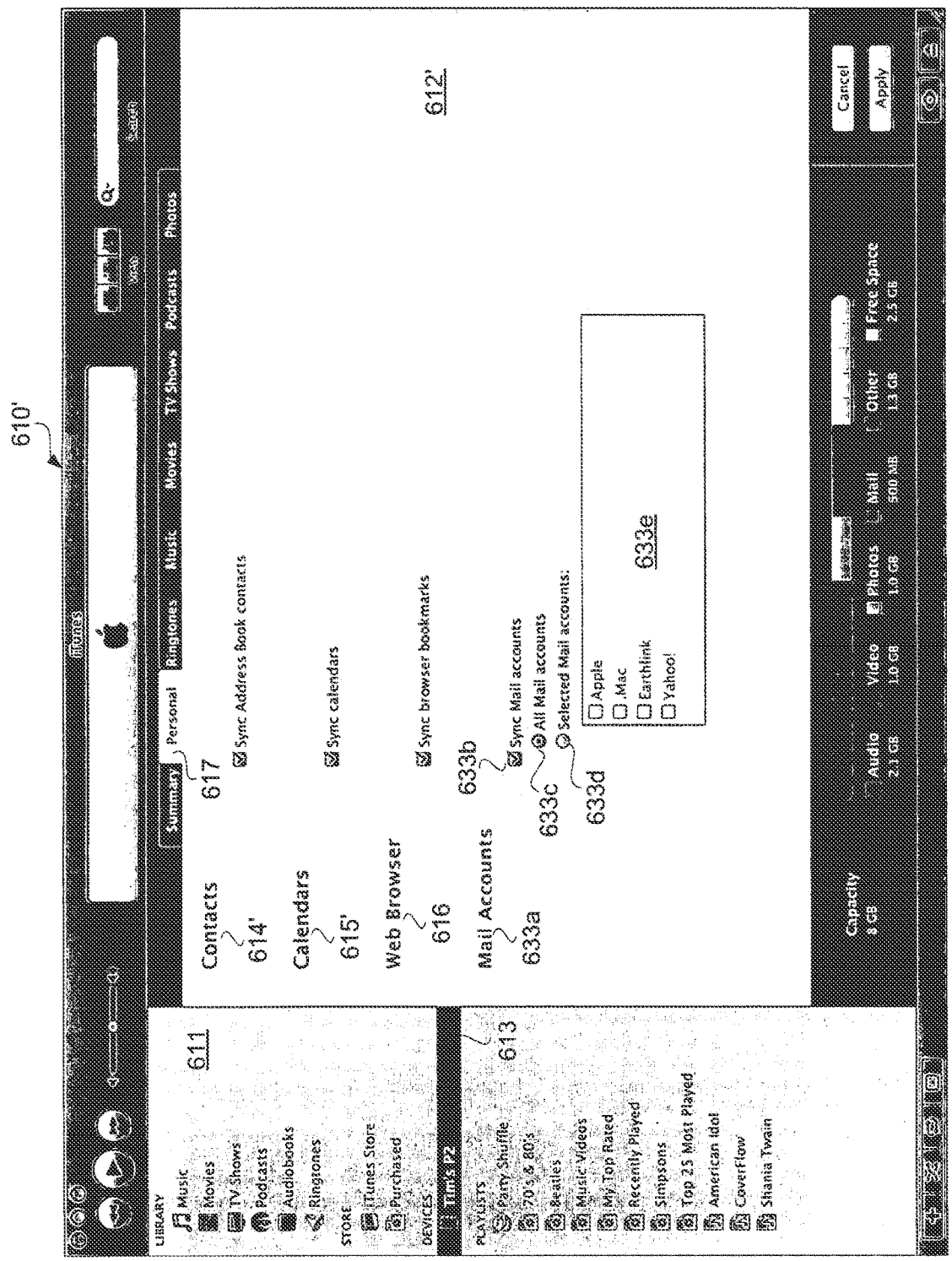

FIG. 6B-1 is a personal synchronization preference screen 610 according to one embodiment of the invention. The personal synchronization preference screen 610 indicates a personal tab 617 being selected. The personal synchronization preference screen 610 includes a source region 611 that specifies various media sources that can be selected, and a preference setting region 612 that assists a user in making one or more selections to influence synchronization of personal information with respect to a selected media source. Here, a particular device from the source region 611 is selected as indicated by a visual designator 613. When the particular device is so selected, the preference setting region 612 can display a graphical user interface that facilitates the user in setting synchronization preferences to be used when synchronizing personal information with respect to the particular device and a host device (e.g., personal computer). More particularly, the information region 612 includes a contacts section 614, a calendars section 615, and a web browser section 616.

In the contacts section 614, a user can make one or more selections to influence synchronization of contacts. Specifically, a check box 618 can be used to request (e.g., enable or disable) synchronization of contacts. When synchronization of contacts is requested, a selector 619 can be used to request that all contacts be synchronized, and a selector 620 can be used to request that selected contacts be synchronized. The selector 620, when selected, enables a user to selected one or more available groups from a list 621 being displayed. The contacts section 614 can also include a check box 622 that can be used to request that any new contacts created on the particular device be placed into a designated contact group.

In the calendars section 615, a user can make one or more selections to influence synchronization of calendars. Specifically, a check box 623 can be used to request synchronization of calendars. When synchronization of calendars is requested, a selector 624 can be used to request that all calendars be synchronized, and a selector 625 can be used to request that selected calendars be synchronized. The selector 625, when selected, enables a user to selected one or more available calendars from a list 621 being displayed. The calendars section 615 can also include a check box 727 to exclude from synchronization events older than a predetermined number of days, and a check box 628 that can be used to request that any new events created on the mobile device be placed into a designated calendar. Still further, the calendars section 615 can also include a check box 629 that can be used to request that notes, which are associated with calendars, be synchronized.

In the web browser section 616, a user can make one or more selections to influence synchronization of web browser attributes. Specifically, a check box 630 can be used to request synchronization of bookmarks from a web browser.

Further, in one embodiment, a storage capacity graphic 631 can be provided at a lower portion of the personal synchronization preference screen 610. The personal synchronization preference screen 610 can indicate storage capacity utilized by different types of media stored on a device. The storage capacity graphic 631 can also indicate available free storage capacity. More particularly, the storage capacity graphic 631 illustrates how eight (8) gigabytes (GB) of storage capacity is distributed between audio, video, photos, mail, other and free space. By selecting an "Apply" button 632, the user preference settings that have been set with respect to the personal synchronization preference screen 610 can be applied. As an example, applying the synchronization preferences can initiate a synchronization operation or can simply store the synchronization preferences to memory for use with subsequent synchronization operations.

FIG. 6B-2 is a personal synchronization preference screen 610' according to another embodiment of the invention. The personal synchronization preference screen 610' is generally similar to the personal synchronization preference screen 610 illustrated in FIG. 6B-1, except that the preference setting region 612 is different. A preference setting region 612' assists a user in making one or more selections to influence synchronization of personal information with respect to a selected media source. The preference setting region 612' can display a graphical user interface that facilitates the user in setting synchronization preferences to be used when synchronizing personal information with respect to the particular device and a host device (e.g., personal computer). More particularly, the information region 612' includes a contacts section 614', a calendars section 615', the web browser section 616, and a mail accounts section 633*a*. In the contacts section 614', a user can make one or more selections to influence synchronization of contacts. Specifically, a check box can be used to request (e.g., enable or disable) synchronization of contacts. In the calendars section 615', a user can make one or more selections to influence synchronization of calendars. Specifically, a check box can be used to request synchronization of calendars. In the web browser section 616, a user can make one or more selections to influence synchronization of web browser attributes. Specifically, a check box can be used to request synchronization of bookmarks from a web browser.

In the mail accounts section 633*a*, a user can make one or more selections to influence synchronization of electronic mail accounts. Specifically, a check box 633*b* can be used to request (e.g., enable or disable) synchronization of mail accounts. When synchronization of mail accounts is requested, a selector 633*c* can be used to request that all mail accounts be synchronized, and a selector 633*d* can be used to request that selected mail accounts be synchronized. The selector 633*d*, when selected, enables a user to selected one or more available mail accounts from a list 633*e* being displayed.

Figure 6C:
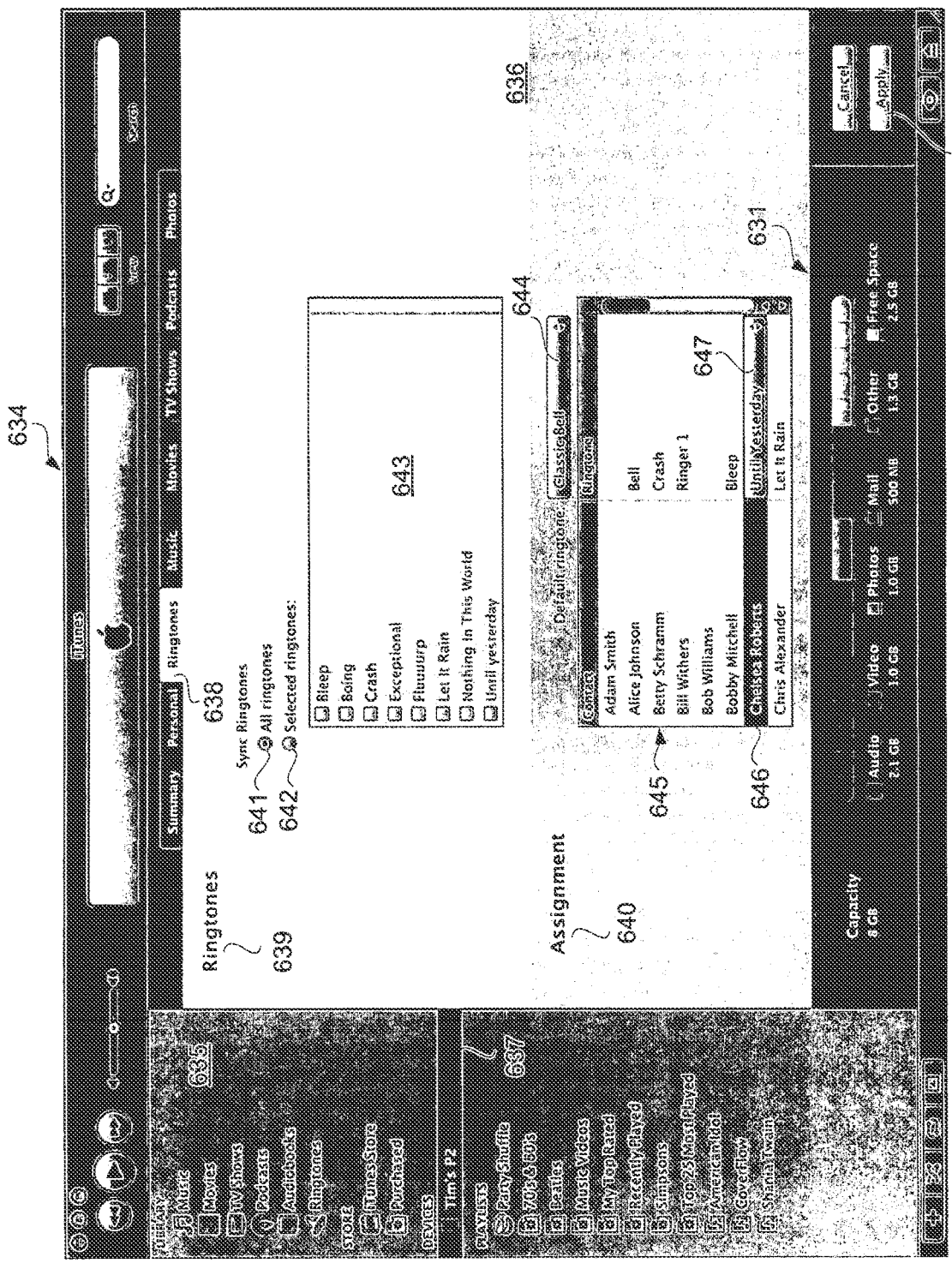
FIG. 6C is a ringtone synchronization preference screen according to one embodiment of the invention.

FIG. 6C is a ringtone synchronization preference screen 634 according to one embodiment of the invention. The ringtone synchronization preference screen 634 indicates a ringtone tab 638 being selected. The ringtone synchronization preference screen 634 includes a source region 635 that specifies various media sources that can be selected, and a preference setting region 636 that assists a user in making one or more selections to influence synchronization of ringtones with respect to a selected media source. Here, a particular device from the source region 635 is selected as indicated by a visual designator 637. When the particular device is so selected, the preference setting region 636 can display a graphical user interface that facilitates the user in setting synchronization preferences to be used when synchronizing ringtones with respect to the particular device (e.g., a mobile telephone) and a host device (e.g., personal computer). More particularly, the information region 636 includes a ringtones section 639 and an assignment section 640. The ringtones synchronization preference screen 634 can also include the lower portion 631 as discussed above.

In the ringtones section 639, a user can make one or more selections to influence synchronization of ringtones. The ringtones section 639 includes a selector 641 that can be used to request that all ringtones be synchronized, and a selector 642 that can be used to request that selected ringtones be synchronized. The selector 642, when selected, enables a user to selected one or more available ringtones from a list 643 being displayed. Although not illustrated in FIG. 6C, the ringtones section 639 could also include a check box to allow a user to enable or disable synchronization of ringtones.

In the assignment section 640, a user can make one or more selections to influence assignment of ringtones. These assignments can then be synchronized or sent to the particular device. The assignment section 640 includes a selection box 644 that enables a user to select a default ringtone. The assignment section 640 also includes an interactive ringtone assignment table 645. The interactive ringtone assignment table 645 displays a list of contacts and an associated ringtone, if any, for each of the contacts. A user can interact with the interactive ringtone assignment table 645 to specify a particular contact 646 and then select an available ringtone to be associated with the particular contact using a selection box 647. Although not illustrated in FIG. 6C, the assignment section 640 could also include a check box to allow a user to enable or disable synchronization of ringtone assignments.

Figure 6D:
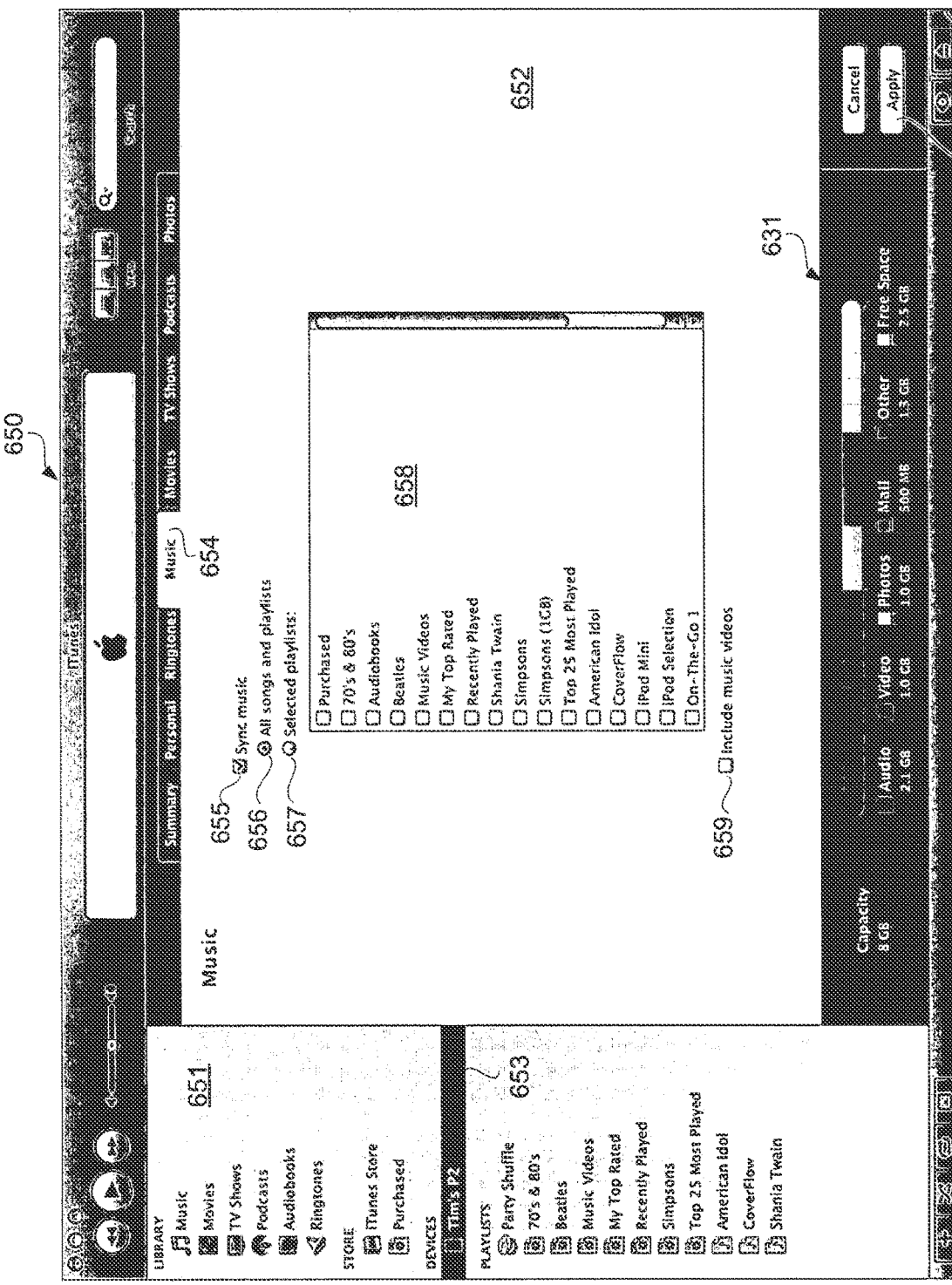
FIG. 6D is a music synchronization preference screen according to one embodiment of the invention.

FIG. 6D is a music synchronization preference screen 650 according to one embodiment of the invention. The music synchronization preference screen 650 indicates a music tab 654 being selected. The music synchronization preference screen 650 allows a user to make one or more selections to influence synchronization of music. The music synchronization preference screen 650 includes a source region 651 that specifies various media sources that can be selected, and a preference setting region 652 that assists a user in making one or more selections to influence synchronization of music with respect to a selected media source. Here, a particular device from the source region 651 is selected as indicated by a visual designator 653. When the particular device is so selected, the preference setting region 652 can display a graphical user interface that facilitates the user in setting synchronization preferences to be used when synchronizing music with respect to the particular device (e.g., a media player) and a host device (e.g., personal computer). More particularly, the music synchronization preference screen 650 includes a check box 655 that can be used to request (e.g., enable or disable) synchronization of music. When synchronization of music is requested, a selector 656 can be used to request that all songs and playlists be synchronized, and a selector 657 can be used to request that selected playlists be synchronized. The selector 657, when selected, enables a user to select one or more available playlists from a list 658 being displayed. Upon synchronization, the synchronization preferences associated with the music synchronization preference screen 650 can be utilized with respect to music. The preference setting region 652 can also include a check box 659 that can be used to request that music videos be included when synchronizing music. For example, synchronizing a song from the host device to the particular device, can copy not only the audio file for the song but also the video file for an associated music video. The music synchronization preference screen 650 can also include the lower portion 631 as discussed above.

Figure 6E:
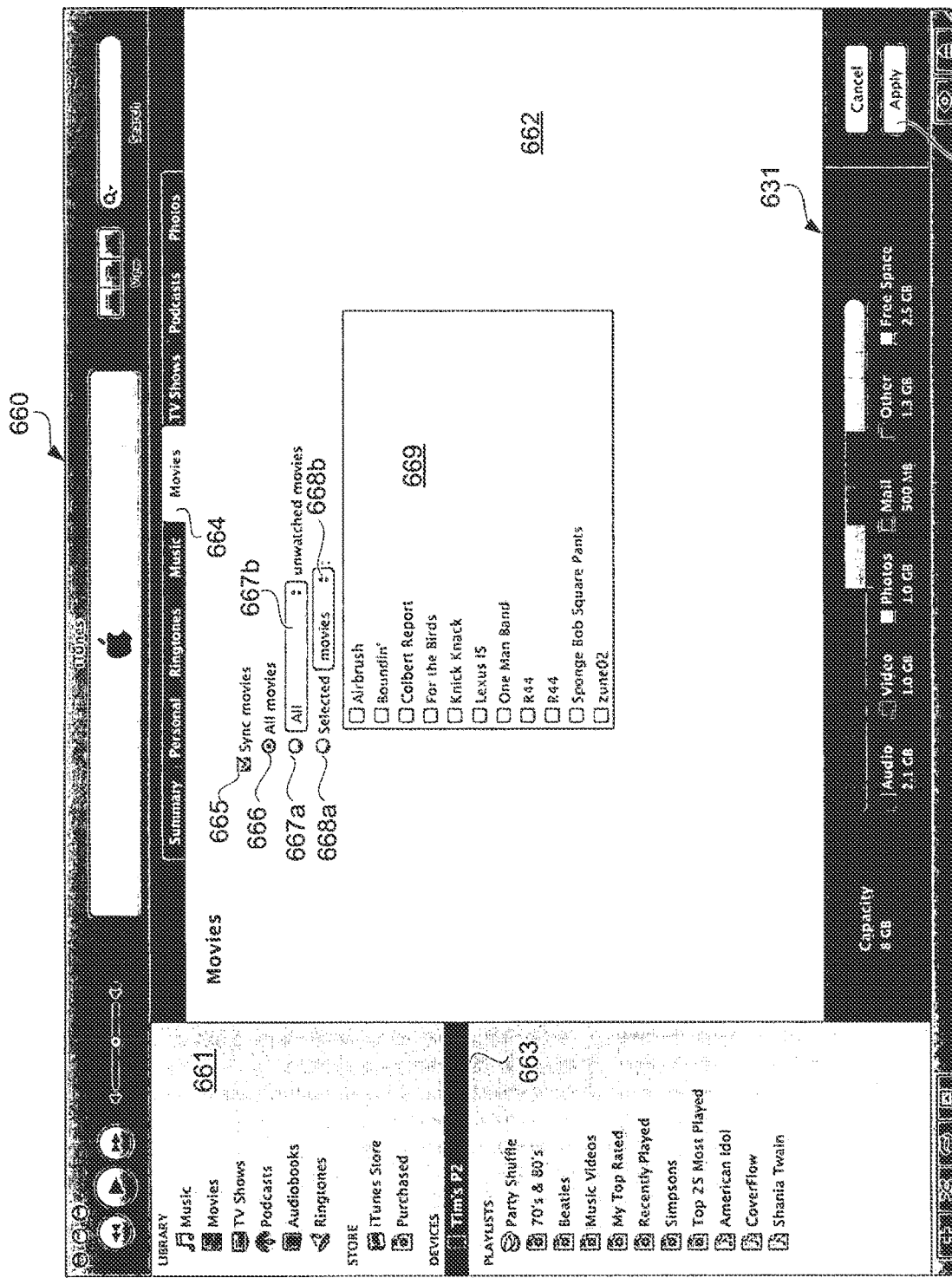
FIG. 6E is a movie synchronization preference screen according to one embodiment of the invention.

FIG. 6E is a movie synchronization preference screen 660 according to one embodiment of the invention. The movie synchronization preference screen 660 indicates a movie tab 664 being selected. The movie synchronization preference screen 660 allows a user to make one or more selections to influence synchronization of movies. The movie synchronization preference screen 660 includes a source region 661 that specifies various media sources that can be selected, and a preference setting region 662 that assists a user in making one or more selections to influence synchronization of movies with respect to a selected media source. Here, a particular device from the source region 661 is selected as indicated by a visual designator 663. When the particular device is so selected, the preference setting region 662 can display a graphical user interface that facilitates the user in setting synchronization preferences to be used when synchronizing movies with respect to the particular device (e.g., a media player) and a host device (e.g., personal computer). More particularly, the movie synchronization preference screen 660 includes a check box 665 that can be used to request (e.g., enable or disable) synchronization of movies. When synchronization of movies is requested, a selector 666 can be used to request that all movies be synchronized. Alternatively, synchronization of certain movies can be requested by selectors 667*a* and 668*a*. The selector 667*a* can be used to specify certain unwatched movies to be synchronized. A selection box 667*b* can be used to specify which certain unwatched movies are to be synchronized. For example, the selection box 667*b* can facilitate user selection of the following options: all unwatched or x most recent unwatched (where x is an integer). The selector 668*a* can be used to request that selected movies (or playlists) be synchronized. A selection box 668*b* can be used to select a media type, such as movies or playlists. The selector 668*a*, when selected, enables a user to selected one or more available movies (or playlists) from a list 669 being displayed. The user can then select one or more of the movies (or playlists) being displayed in the displayed list 669. Upon synchronization, the synchronization preferences associated with the movie synchronization preference screen 660 can be utilized with respect to movies. The movie synchronization preference screen 660 can also include the lower portion 631 as discussed above.

In an alternative embodiment for the movie synchronization preference screen 650, the selector 667*a* could instead be used to specify certain watched or unwatched movies to be synchronized, and the selection box 667*b* could be used to specify which certain movies (watched or unwatched) are to be synchronized. For example, the selection box 667*b* can facilitate user selection of the following options: all, all unwatched, x most recent or x most recent unwatched (where x is an integer).

Figure 6F:
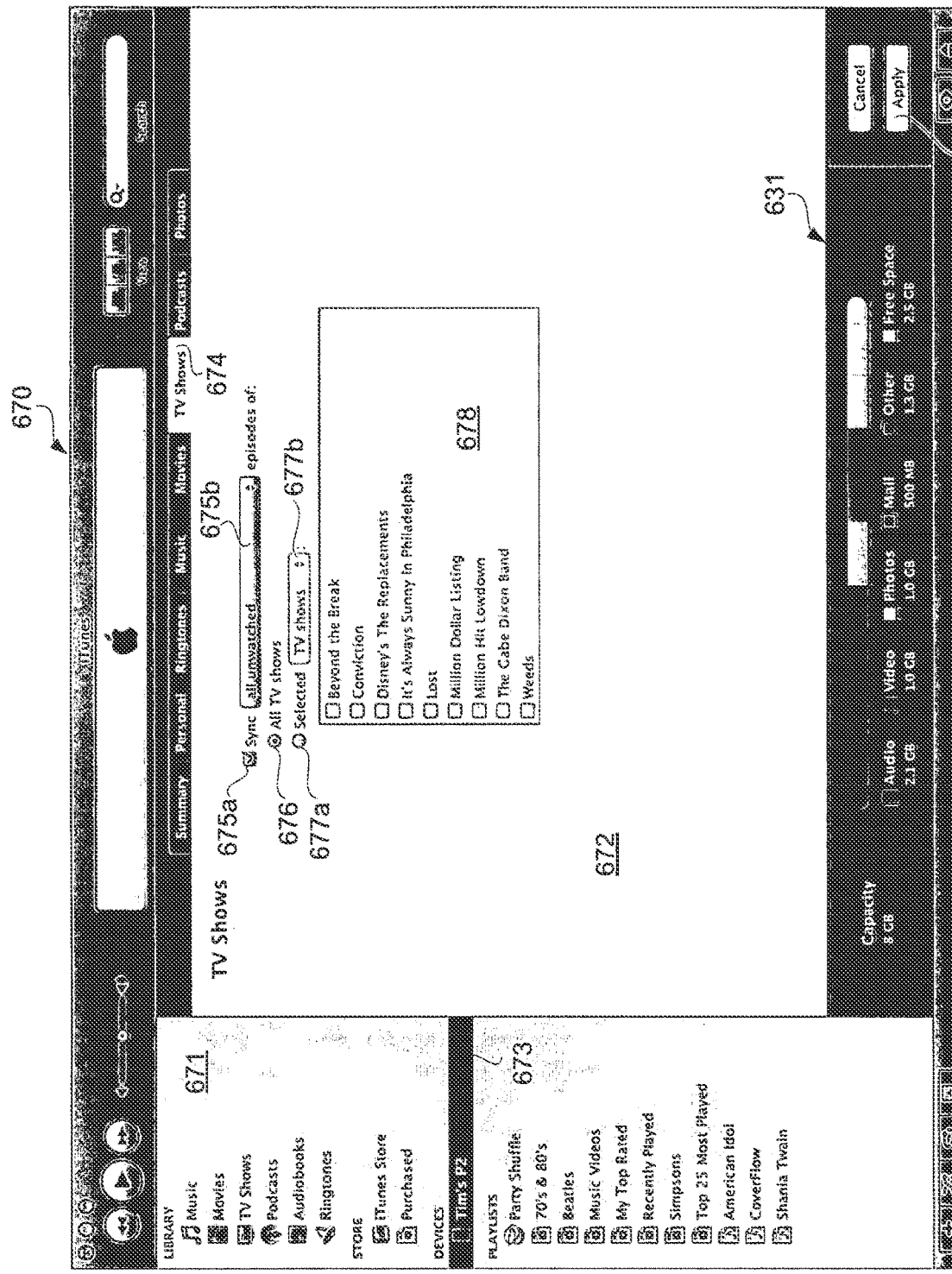
FIG. 6F is a television (TV) show synchronization preference screen according to one embodiment of the invention.

FIG. 6F is a television (TV) show synchronization preference screen 670 according to one embodiment of the invention. The TV show synchronization preference screen 670 indicates a TV shows tab 674 being selected. The TV show synchronization preference screen 670 allows a user to make one or more selections to influence synchronization of TV shows. The TV show synchronization preference screen 670 includes a source region 671 that specifies various media sources that can be selected, and a preference setting region 672 that assists a user in making one or more selections to influence synchronization of TV shows with respect to a selected media source. Here, a particular device from the source region 671 is selected as indicated by a visual designator 673. When the particular device is so selected, the preference setting region 672 can display a graphical user interface that facilitates the user in setting synchronization preferences to be used when synchronizing TV shows with respect to the particular device (e.g., a media player) and a host device (e.g., personal computer). More particularly, the TV show synchronization preference screen 670 includes a check box 675*a* that can be used to request (e.g., enable or disable) synchronization of TV shows, namely, synchronization of certain episodes of TV shows. When synchronization of TV shows is requested, a selection box 675*b* can be used to specify which certain episodes of TV shows are to be synchronized. For example, the selection box 675*b* can facilitate user selection of the following options: all, x most recent, all unwatched or x most recent unwatched (where x is an integer). A selector 676 can be used to request that the certain episodes of all TV shows be synchronized. Alternatively, synchronization of the certain episodes of only certain TV shows can be requested by selector 677*a*. The selector 677*a* can be used to specify certain selected TV shows (or playlists) to be synchronized. A selection box 677*b* can be used to select a media type, such as TV shows or playlists. The selector 677*a*, when selected, enables a user to selected one or more available TV shows (or playlists) from a list 678 being displayed. The user can then select one or more of the TV shows (or playlists) being displayed in the displayed list 678. Upon synchronization, the synchronization preferences associated with the TV show synchronization preference screen 670 can be utilized with respect to TV shows. The TV show synchronization preference screen 670 can also include the lower portion 631 as discussed above.

Figure 6G:
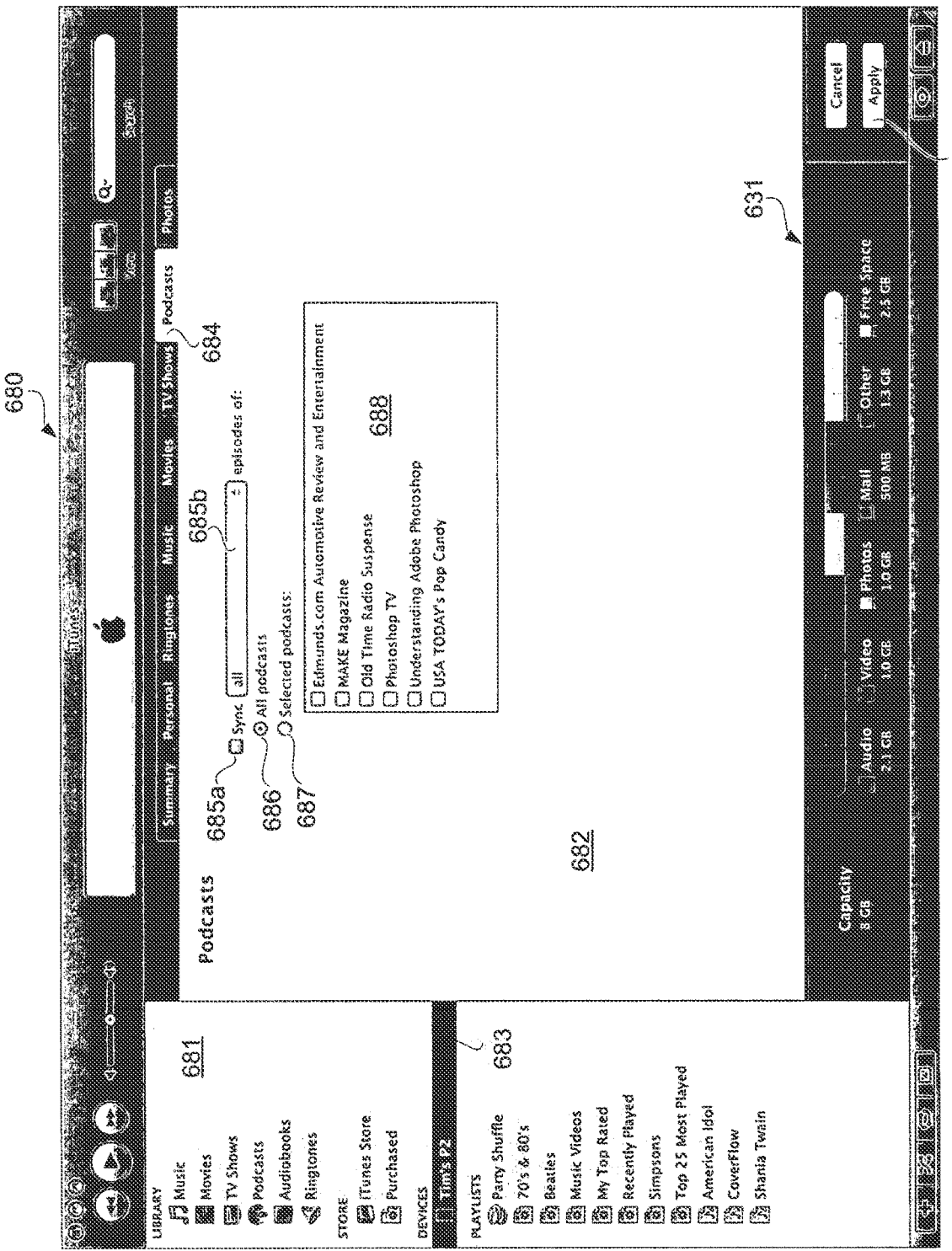
FIG. 6G is a podcast synchronization preference screen according to one embodiment of the invention.

FIG. 6G is a podcast synchronization preference screen 680 according to one embodiment of the invention. The podcast synchronization preference screen 680 indicates a podcast tab 684 being selected. The podcast synchronization preference screen 680 allows a user to make one or more selections to influence synchronization of podcasts. The podcast synchronization preference screen 680 includes a source region 681 that specifies various media sources that can be selected, and a preference setting region 682 that assists a user in making one or more selections to influence synchronization of podcasts with respect to a selected media source. Here, a particular device from the source region 681 is selected as indicated by a visual designator 683. When the particular device is so selected, the preference setting region 682 can display a graphical user interface that facilitates the user in setting synchronization preferences to be used when synchronizing podcasts with respect to the particular device (e.g., a media player) and a host device (e.g., personal computer). More particularly, the podcast synchronization preference screen 680 includes a check box 685*a* that can be used to request (e.g., enable or disable) synchronization of podcasts, namely, synchronization of certain episodes of podcasts. When synchronization of podcasts is requested, a selection box 685*b* can be used to specify which certain episodes of podcasts are to be synchronized. For example, the selection box 685*b* can facilitate user selection of the following options: all, x most recent, all unplayed or x most recent unplayed (where x is an integer). A selector 686 can be used to request that the certain episodes of all podcasts be synchronized. Alternatively, synchronization of the certain episodes of certain podcasts can be requested by selector 687. The selector 687 can be used to specify certain selected podcasts to be synchronized. The selector 687, when selected, enables a user to select one or more available podcasts from a list 688 being displayed. The user can then select one or more of the podcasts being displayed in the displayed list 688. Upon synchronization, the synchronization preferences associated with the podcast synchronization preference screen 680 can be utilized with respect to podcasts. The podcast synchronization preference screen 680 can also include the lower portion 631 as discussed above.

Figure 6H:
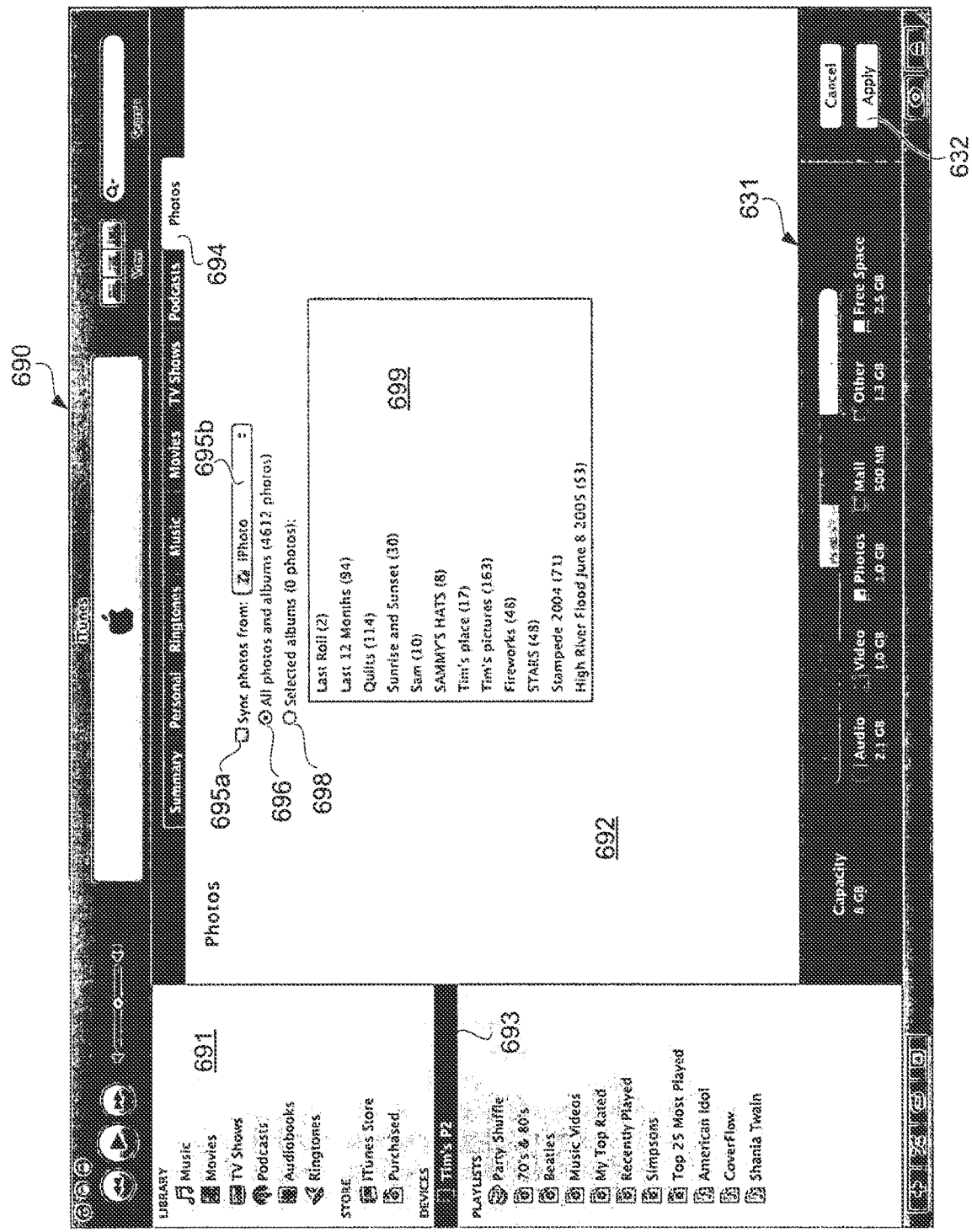
FIG. 6H is a photo synchronization preference screen according to one embodiment of the invention.

FIG. 6H is a photo synchronization preference screen 690 according to one embodiment of the invention. The photo synchronization preference screen 690 indicates a photos tab 694 being selected. The photo synchronization preference screen 690 allows a user to make one or more selections to influence synchronization of photos. The photo synchronization preference screen 690 includes a source region 691 that specifies various media sources that can be selected, and a preference setting region 692 that assists a user in making one or more selections to influence synchronization of photos with respect to a selected media source. Here, a particular device from the source region 691 is selected as indicated by a visual designator 693. When the particular device is so selected, the preference setting region 692 can display a graphical user interface that facilitates the user in setting synchronization preferences to be used when synchronizing photos with respect to the particular device (e.g., a media player) and a host device (e.g., personal computer). More particularly, the photo synchronization preference screen 690 includes a check box 695*a* that can be used to request (e.g., enable or disable) synchronization of photos. When synchronization of photos is requested, a selection box 695*b* can be used to specify a source (e.g., source folder or application) of photos that are to be synchronized. A selector 696 can be used to request that all photos and albums (i.e., photo albums) be synchronized. Alternatively, synchronization of certain albums (i.e., photo albums) can be requested by selector 698. The selector 698 can be used to specify certain selected albums to be synchronized. The selector 698, when selected, enables a user to select one or more available albums from a list 699 being displayed. The user can then select one or more of the albums being displayed in the displayed list 699. Upon synchronization, the synchronization preferences associated with the photo synchronization preference screen 690 can be utilized with respect to photos. The podcast synchronization preference screen 631 can also include the lower portion 631 as discussed above.

Additionally, it should be noted that there can also be an order of priority for the different types of media assets. The order of priority can affect synchronization if storage capacity at the device receiving the media assets is insufficient. In one embodiment, the order of priority can be the order of media type tabs (left-to-right) in synchronization preference screens illustrated in FIGS. 6B-6H, whereby the priority highest to lowest is personal, ringtones, music, movies, TV shows, podcasts and photos. The existence of the different media type tabs can be dependent on the type of device for which the synchronization preferences are being set. For example, since video playback is needed for movies and TV shows, if the mobile device does not support video playback, then these types of media assets need not be presented in the synchronization preference screens.

Figure 7A:
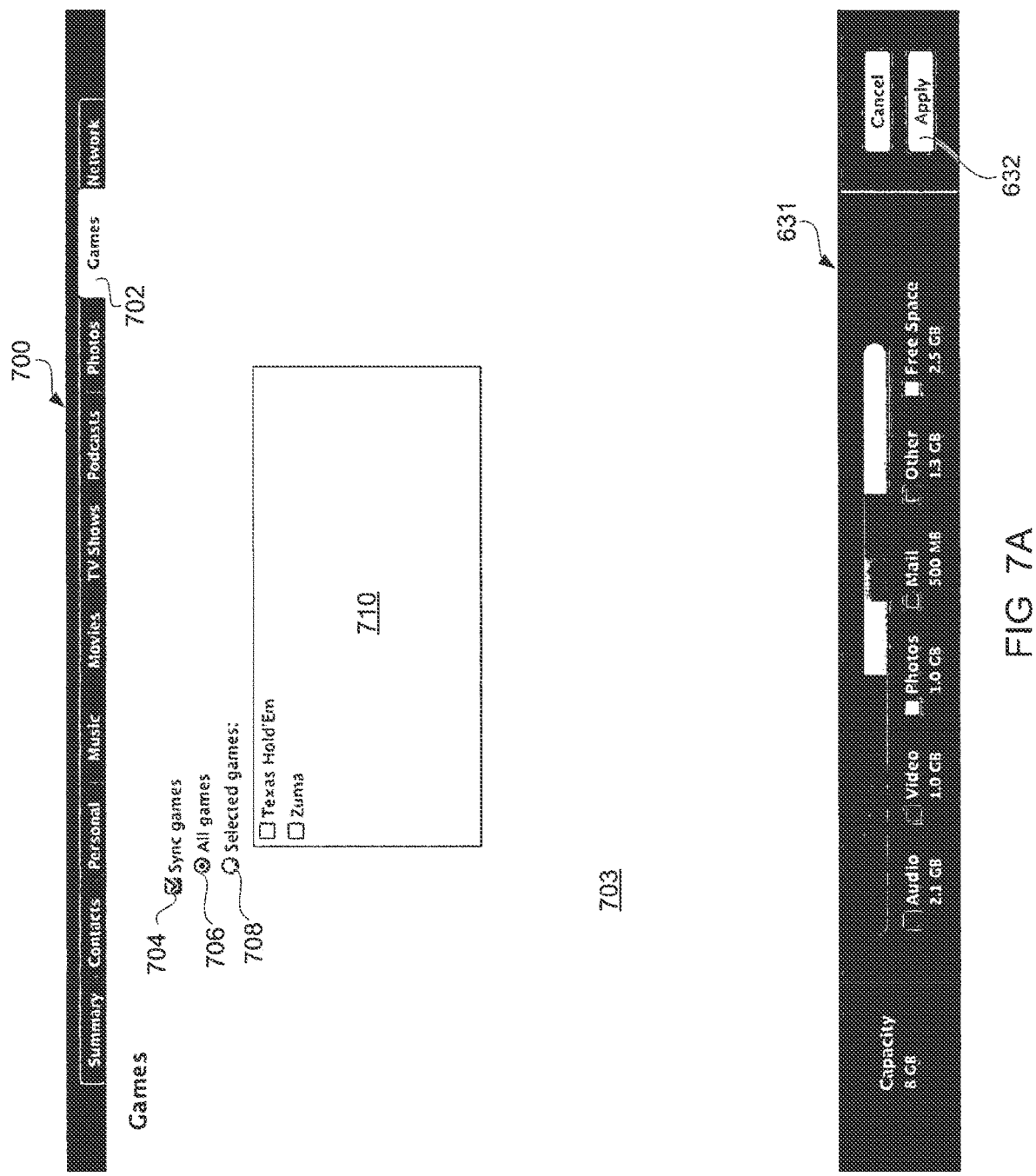
FIGS. 7A and 7B are additional exemplary screenshots suitable for use for setting preferences for a plurality of different types of media assets.
Figure 7B:
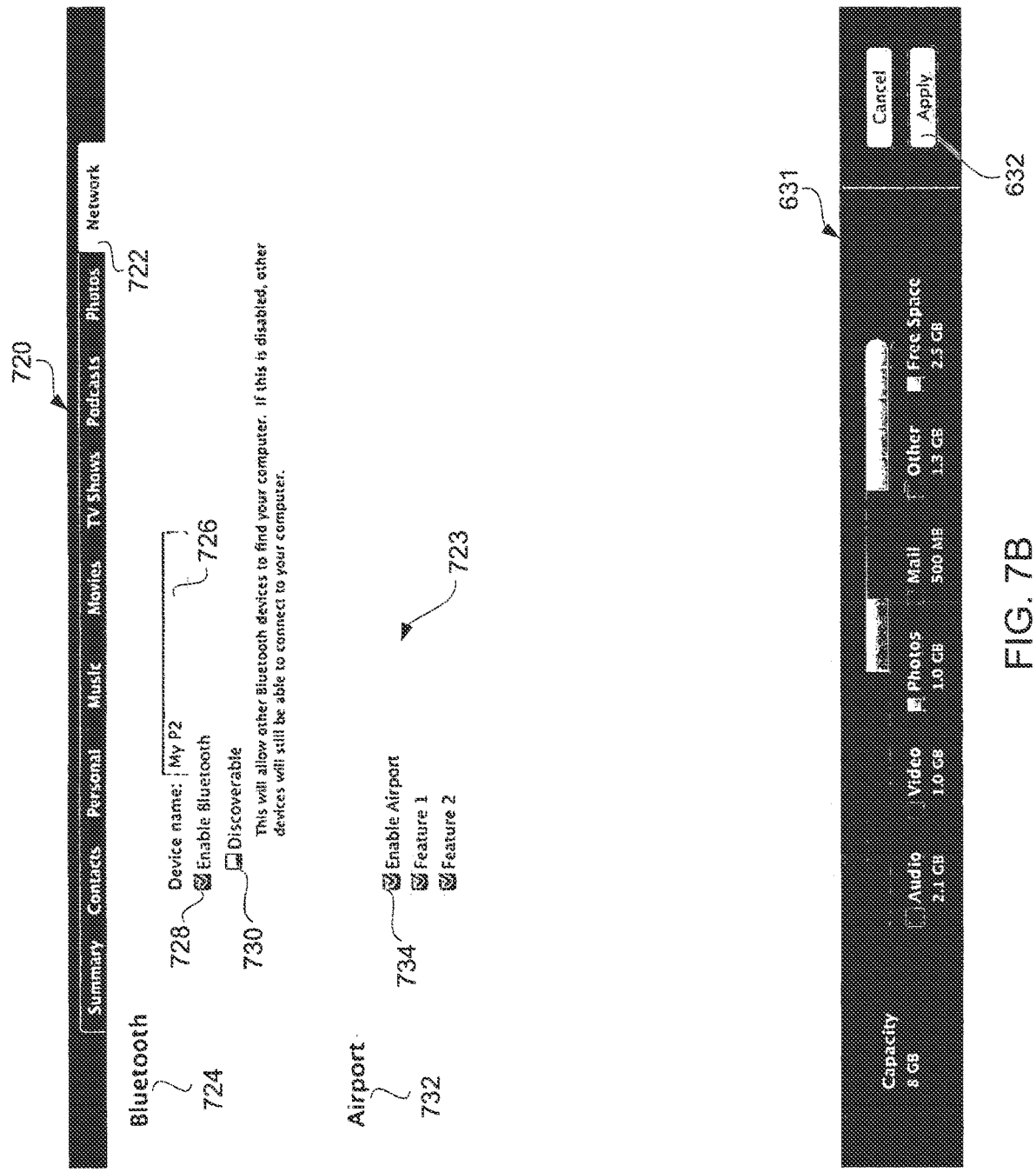

FIGS. 7A and 7B are additional exemplary screenshots suitable for use for setting additional preferences. FIG. 7A concerns setting preferences to be applied to games (e.g., game applications). FIG. 7B concerns setting preferences for network connections. Games are considered one type of media asset. These exemplary screenshots are used to set preferences for a particular mobile device. However, multiple separate sets of such exemplary screenshots can be used to set preferences for multiple mobile devices. The multiple mobile devices can be the same or different mobile devices. These exemplary screenshots are presented on a host device, such as a personal computer, that can operate a media management application. However, alternatively, similar or simplified screenshots can be used on a mobile device.

FIG. 7A is a game synchronization preference screen 700 according to one embodiment of the invention. The game synchronization preference screen 700 indicates a game tab 702 being selected. The game synchronization preference screen 700 allows a user to make one or more selections to influence synchronization of games. In one embodiment, the synchronization of games involves synchronization of game data (e.g., game play data, etc). However, the synchronization of games can also involve synchronization of game applications, such as game software, game modules, game levels, etc. Although not illustrated, the game synchronization preference screen 700 can also include a source region that specifies various media sources that can be selected. However, the game synchronization preference screen 700 pertains to a preference setting region 703 that provides a graphical user interface that assists a user in making one or more selections to influence synchronization of games. The preference setting region 703 includes a check box 704 that can be used to request (e.g., enable or disable) synchronization of games. When synchronization of games is requested, a selector 706 can be used to request that all games be synchronized, and a selector 708 can be used to request that selected games be synchronized. The selector 708, when selected, enables a user to select one or more available games from a list 710 being displayed. Upon synchronization, the synchronization preferences associated with the game synchronization preference screen 700 can be utilized with respect to games. The game synchronization preference screen 700 can also include the lower portion 631 as discussed above.

FIG. 7B is a network configuration preference screen 720 according to one embodiment of the invention. The network configuration preference screen 720 indicates a network tab 722 being selected. The network configuration preference screen 720 allows a user to make one or more selections to influence network configuration with respect to a mobile device. Although not illustrated, the network configuration preference screen 720 can include a source region that specifies various media sources that can be selected. However, the network configuration preference screen 720 pertains to a preference setting region 723 that provides a graphical user interface that assists a user in making one or more selections to influence network configurations. The preference setting region 723 includes a first section 724 pertain to a Bluetooth network (i.e., local wireless network). In the first section 724, a text entry box 726 enables a user to enter a device name for the associated mobile device. Further, a check box 728 can be used to enable or disable Bluetooth operation on the associated mobile device. When enabled, a check box 730 can be used to enable or disable discoverability of the associated mobile device on a Bluetooth network. In addition, the preference setting region 723 includes a second section 732 that pertains to an Airport network (i.e., local wireless network). In the second section 732, a check box 734 enables a user to enable or disable Airport operation on the associated mobile device, and other check boxes to enable or disable certain features. The network configuration preference screen 720 can also include the lower portion 631 as discussed above.

As noted above, the data involved in synchronization can involve widgets or data associated with widgets. Widgets created at either a mobile device or a host device can be exchanged. Widgets as, more generally, small computer programs. For example, widgets are special purpose applications that marry a very simple pre-configured user interface with dynamic data drawn from other sources. In one embodiment, widgets can include information and one or more tools (e.g., applications) that let the user perform common tasks and provide fast access to information.

Widgets have become very popular on the Mac OSX operating system and are sometimes denoted as Applets. For example, widgets have been used for stock quotes, weather, picture galleries, games, and a host of other data-types. A widget author can creates a basic user interface and provides code that permits a user to select parameters and make other configuration choices. Once these choices are made, the widget can automatically update its display to show real-time or dynamic data drawn from a source external to the widget itself. Most popularly, the data is located on a wide area network, such as the World Wide Web (WWW). This application model is extensible and has led to a proliferation of widgets now widely available on the WWW. Because widgets provide access to dynamic data in a small and simple user interface, they are suitable for mobile phones, media players, PDAs, and other portable devices that have access to remote data located on the network, but may have limited user interfaces and limited screen real estate to display the data in complex ways. Through synchronization preferences or other user settings, a program (e.g., management program) described herein permits a user to select one or more widgets of interest for synchronization, such as from the host device to the mobile device or vice versa. Either device can also operate programs that enable a user to configure or create widgets prior to synchronizing them to the device. For example, the user may enter the stock symbols of interest on the host device to configure a widget because the host device (e.g., personal computer) offers a larger display, keyboard and perhaps access to other tools and data (such as a user's bank records or document) may make this a simpler task than if the widget were configured solely on the mobile device.

Another aspect of the invention pertains to backup of data for a mobile device. Backup data from a mobile device is provided to and stored on a host device (e.g., host computer). Preference settings can be established at either the host device or the media device and utilized to control or influence the backup process.

Figure 7C:
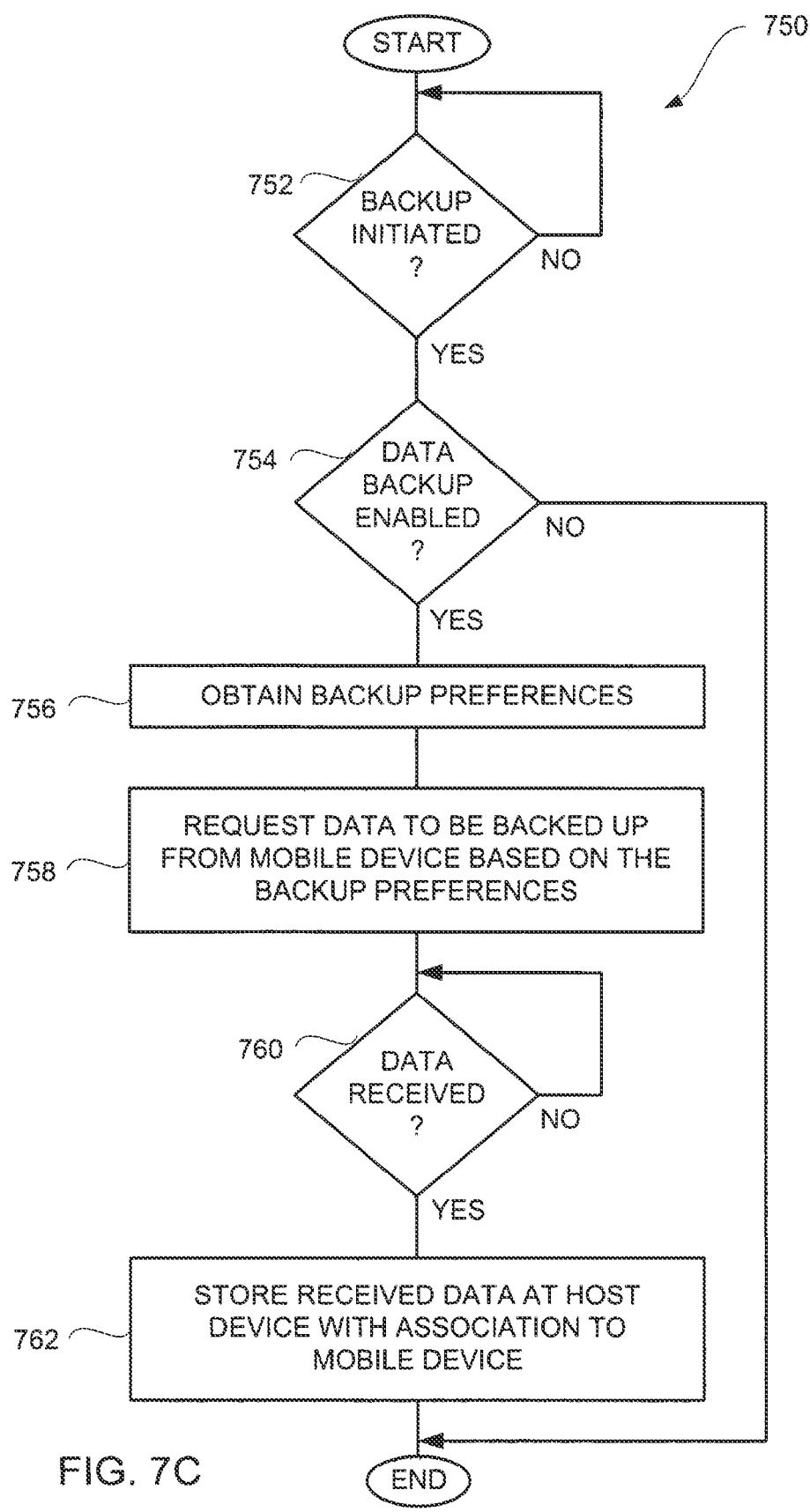
FIG. 7C is a flow diagram of a backup process according to one embodiment of the invention.

FIG. 7C is a flow diagram of a backup process 750 according to one embodiment of the invention. The backup process 750 is, for example, performed by a host device, such as the host computer 102 illustrated in FIG. 1A or the host computer 152 illustrated in FIG. 1B. The backup process 750 serves to backup data from a mobile device (e.g., media device) to the host computer.

The backup process 750 begins with a decision 752. The decision 752 determines whether a backup has been initiated. If the decision 752 determines that a backup has not been initiated, the backup process 750 waits to perform a backup. In one implementation, a backup can be initiated (e.g., periodically on event, on command or periodically) by either the host device or the mobile device. In another implementation, a backup can be initiated automatically on connection of the mobile device to the host device. On the other hand, when the decision 752 determines that a backup has been initiated, the backup process 750 continues.

Once the decision 752 determines that backup is initiated, a decision 754 determines whether data backup has been enabled. Here, user preferences or settings can be utilized to enable a user of either the host device or the mobile device to enable or disable data backup. These user settings or preferences can be associated with a particular mobile device. Hence, when the decision 754 determines that data backup is enabled, backup preferences are obtained 756. The backup preferences can be obtained 756 from the host device. The backup preferences can, for example, specify one or more types or categories of data to be backed up.

Next, data to be backed up from the mobile device can be requested 758. For example, the host device can request the data to be backed up from the mobile device. The data being requested 758 can be based on the backup preferences. The backup preferences can specify one or more types or categories of data to be backed up.

Following the request 758 for the data to be backed up, a decision 760 determines whether the requested data has been received. When the decision 760 determines that the requested data has not been received, then the backup process 750 can await receipt of the requested data. On the other hand, once the decision 760 determines that the requested data has been received, the received data can be stored 762 at the host device. Here, the received data is backup data from the mobile device. Hence, when the backup data is stored by the host device for backup purposes, the backup data is stored such that it is associated with the mobile device. After the received data has been stored 762, the backup process 750 can end. Here, the backup process 750 has successfully stored certain data to be backed up for the mobile device. In one implementation, the storage of the backup data stores not only the data being backed up but also information on where the corresponding data is stored on the mobile device. This information, namely, storage location information, can be later utilized when restoring data back onto the mobile device so that the restored data is stored to the proper location within the mobile device.

Figure 8A:
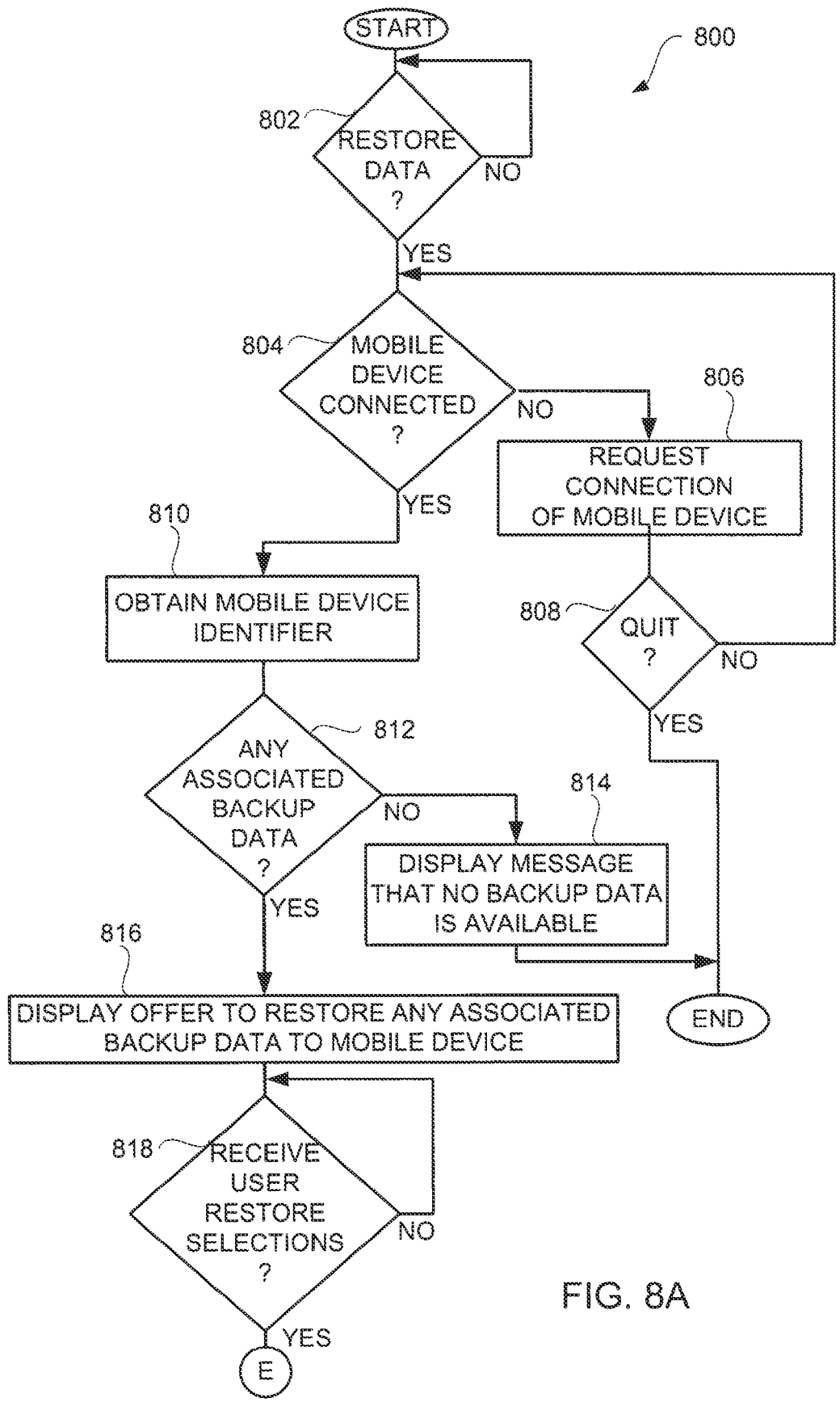
FIGS. 8A and 8B are flow diagrams of a restore process according to one embodiment of the invention.
Figure 8B:
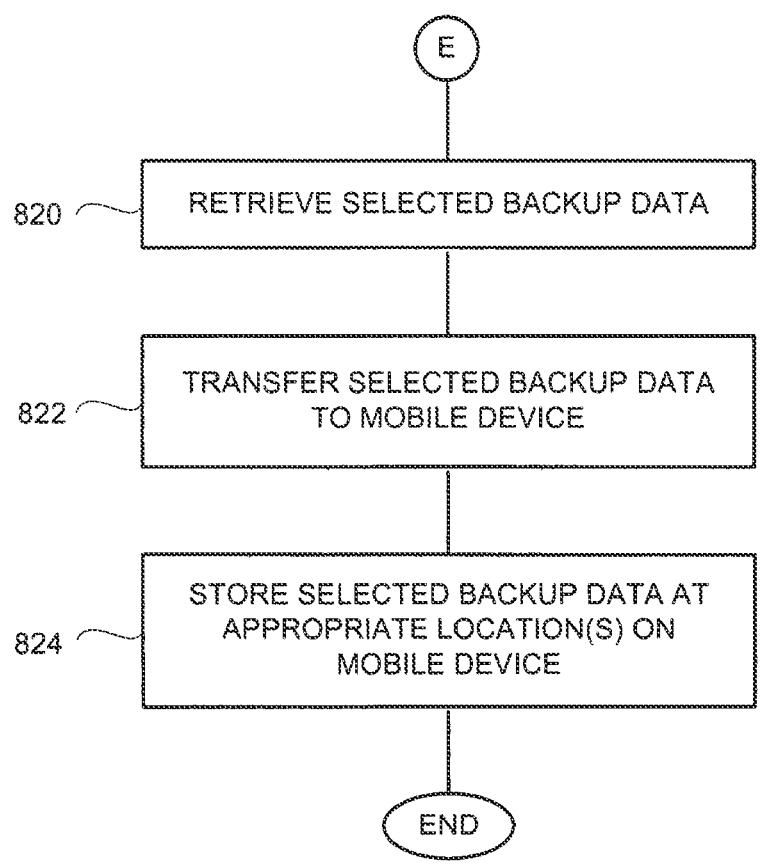

FIGS. 8A and 8B are flow diagrams of a restore process 800 according to one embodiment of the invention. The restore process 800 is, for example, performed by a host device, such as a host computer. The restore process 800 operates to restore data that has been previously backed up at the host device for the benefit of a particular mobile device. Typically, the data being backed up will not be needed by the mobile device. However, in certain situations, there will be a need for restoration of the backup data to a mobile device. For example, if the mobile device fails or for some reason has its data erased, there will be need to restore previously backed up data to the mobile device. As another example, if the user of the mobile device acquires a new mobile device that is to replace the former mobile device, then it can be advantageous for the user to restore data previously residing on the former mobile device onto the new mobile device. Also, if the user loses their mobile device and obtains a replacement mobile device, it can be advantageous for the user to be able to restore data previously residing on the former mobile device.

The restore process 800 begins with a decision 802. The decision 802 determines whether data is to be restored to a mobile device. When the decision 802 determines that data is not to be restored, then the restore process 800 awaits the need to restore data. In other words, the restore process 800 is effectively invoked when data is to be restored.

When the decision 802 determines that data is to be restored, a decision 804 determines whether a mobile device is connected to the host device. The connection can be wired or wireless. In one implementation, the connection is provided by a Universal Serial Bus (USB) cable that connects the mobile device to the host device. In another implementation, the connection is provided over a short range wireless network (e.g., Bluetooth network). When the decision 804 determines that a mobile device is not connected, connection with a mobile device can be requested 806. A decision 808 can then determine whether the restore process 800 should end. When the decision 808 determines that the restore process 800 should end, then the restore process 800 ends. Alternatively, when the decision 808 determines that the restore process 800 should not end, the restore process 800 returns to repeat the decision 804 and subsequent blocks to again determine whether a mobile device has been connected.

Once the decision 804 determines that a mobile device is connected to the host device, a mobile device identifier can be obtained 810. A decision 812 then determine whether there is any associated backup data for the particular mobile device. When the decision 812 determines that there is no associated backup data available, then a message can be displayed 814 indicating that there is no backup data available for the mobile device. Following display 814 of the message, the restore process 800 can end with no data restoration performed.

On the other hand, when the decision 812 determines that there is associated backup data available, an offer to restore any associated backup data to the mobile device can be displayed 816. Next, a decision 818 determines whether one or more user restore selections have been received. When the decision 818 determines that no user restore selections have been received, the restore process 800 can await such selections. Once the decision 818 determines that one or more user resource selections have been received, selected backup data can be retrieved 820. The selected backup data can then be transferred 822 to the mobile device. Thereafter, the selected backup data can be stored 824 at appropriate locations on the mobile device. For example, when the backup data was acquired from the mobile device initially, the appropriate locations (i.e., storage location information) for the data were noted, such that when storing 824 the selected backup data backed on the mobile device, the data can be stored at the same locations. Following the block 824, the restore process 800 ends.

Figure 9:
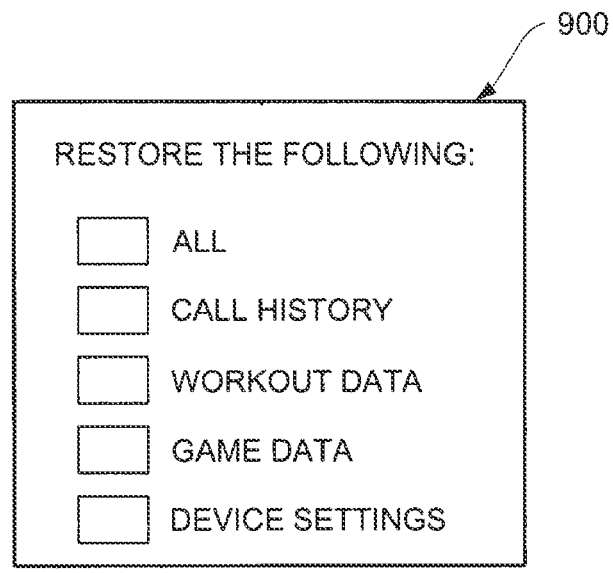
FIG. 9 is an exemplary restore availability screen according to one embodiment of the invention.

FIG. 9 is an exemplary restore availability screen 900 according to one embodiment of the invention. The restore availability screen 900 is, for example, suitable for display by the block 816 of the restore process 800. The restore availability screen 900 enables a user to select one or more types (or categories) of data to be restored to a mobile device. In one implementation, the options being made available for data restoration are those data items that have been previously backed up. In the example illustrated in FIG. 9, the user is given the option to select to back up all available backup data or to specifically select one or more types (or categories) of data, such as call history, workout data, game data and device settings.

Figure 10:
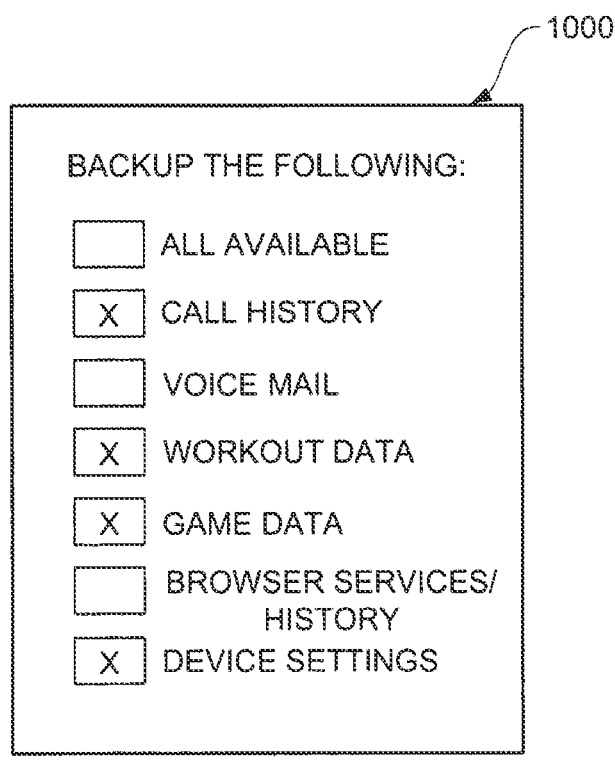
FIG. 10 is an exemplary backup preferences screen according to one embodiment of the invention.

FIG. 10 is an exemplary backup preferences screen 1000 according to one embodiment of the invention. The backup preferences screen 1000 is, for example, suitable for display on a host device to assist a user in setting backup preferences. As an example, the backup preferences can be used at block 756 of the backup process 750. The backup preferences screen 1000 enables a user to select types (or categories) of data to be backed up. The backup preferences screen 1000 can be utilized in advance of a backup process and stored to a preferences file for subsequent use. In any case, the backup preferences screen 1000 illustrated in FIG. 10 allows the user to select to backup all available data or to select specific types of data, such as call history, voice mail, workout data, game data, browser settings/history and device settings.

Another aspect of the invention pertains to synchronization of media data (e.g., media assets) with respect to a media device. Media data from a host device (e.g., host computer) can be provided to and stored on the media device, and vice versa. Preference settings can be established at either the host device or the media device and utilized to control or influence the synchronization process.

Figure 11A:
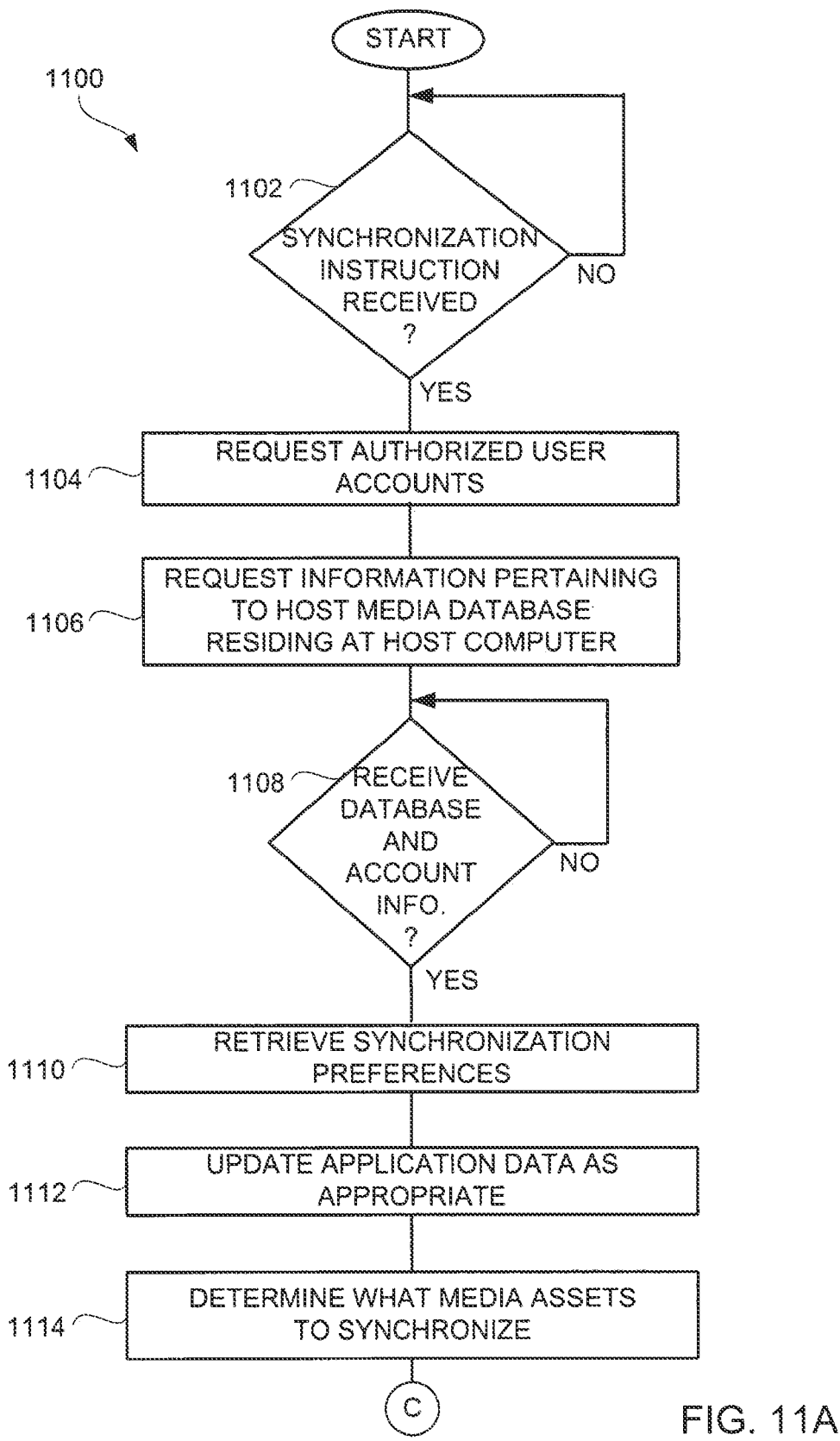
FIGS. 11A and 11B are flow diagrams of a synchronization process according to one embodiment of the invention.
Figure 11B:
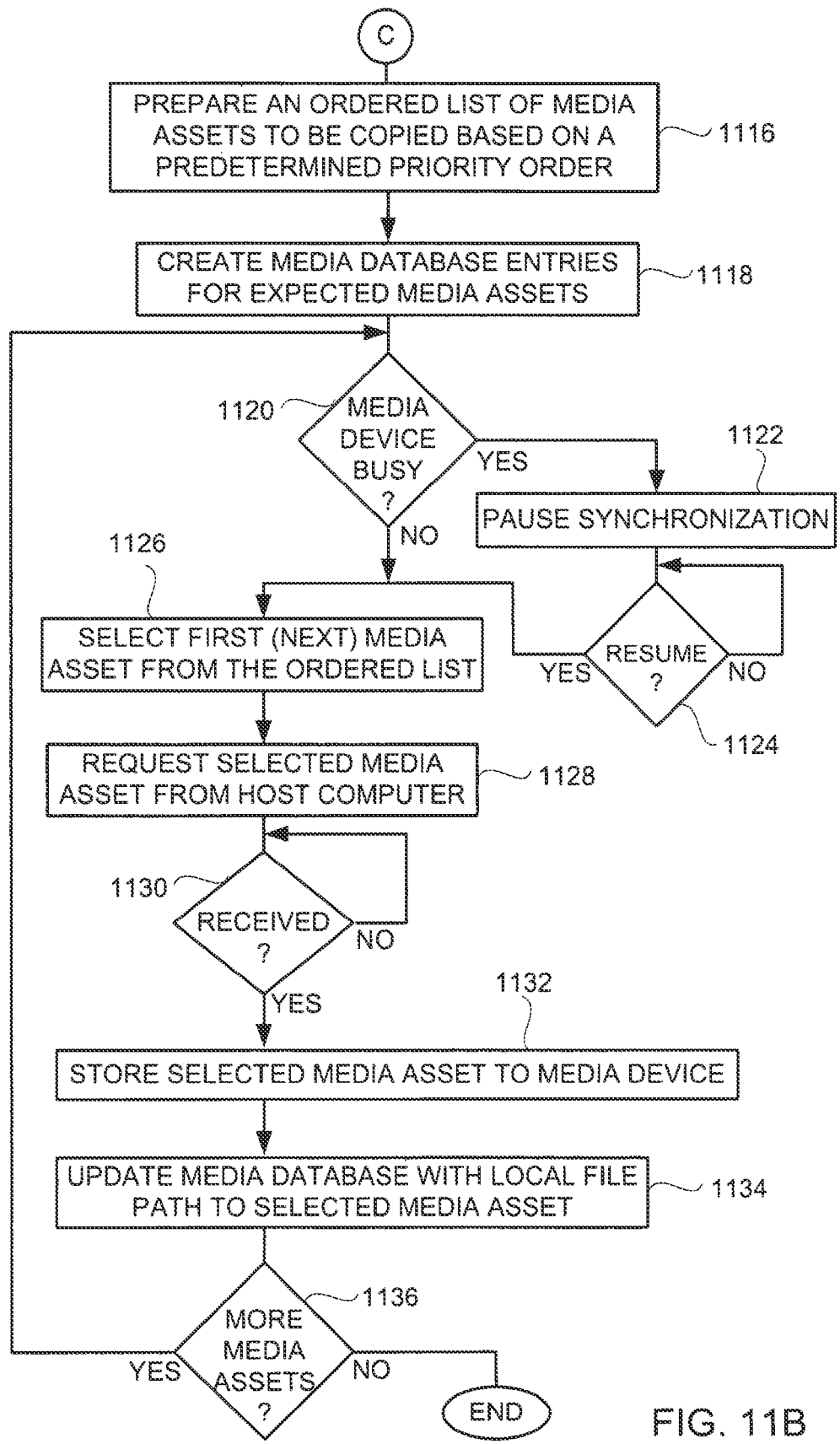

FIGS. 11A and 11B are flow diagrams of a synchronization process 1100 according to one embodiment of the invention. The synchronization process is, for example, performed by a media device. The media device is connected (in a wired or wireless manner) to a host device, such as a host computer. The synchronization process 1100 operates to primarily copy media items and associated media information from the host device to the media device.

The synchronization process 1100 begins with a decision 1102. The decision 1102 determines whether a synchronization instruction has been received. In this embodiment, the synchronization process 1100 is initiated by a synchronization instruction, such as a command, that is provided to the media device by the host device. When the decision 1102 determines that a synchronization instruction has not been received, the synchronization process 1100 awaits such an instruction. In other words, the synchronization process 110 begins when a synchronization instruction has been received. Once the decision 1102 determines that a synchronization instruction has been received, authorized user accounts can also be requested 1104. In addition, information pertaining to a host media database residing on the host computer can be requested 1106.

A decision 1108 then determines whether database and account information as requested has been received. When the decision 1108 determines that the requested database and account information have not yet been received, the synchronization process 1100 awaits such information. On the other hand, when the decision 1108 determines that database and account information have been received, synchronization preferences are retrieved 1110. Typically, the synchronization preferences are those preferences that have been configured specifically for the media device or for a type of device corresponding to the media device. In one embodiment, the synchronization preferences were previously configured at the host computer. In another embodiment, the synchronization preferences were previously configured at the media device. In still another embodiment, the synchronization preferences were previously configured at the media device and at the host computer. Application data, such as data pertaining to a media-based application operating on at least the media device can be updated 1112 as appropriate. Application data can correspond to parameters, values, etc. used or monitored by an application program. Examples of application data for a media playback application are play counts or ratings corresponding to media assets. Application data can be maintained at both the media device and the host computer. Hence, the update 1112 to the application data can be associated with application data at either the media device or the host computer. In such cases, the application data being updated 1112 can be provided in either directions from one of the devices to another. In any case, after the synchronization preferences have been retrieved 1110, the synchronization process 1100 determines 1114 what media assets to synchronize.

After the media assets to be synchronized have been determined 1112, an ordered list of media assets to be copied can be prepared 1116 based on a predetermined priority order. Further, media database entries are created 1118 for expected media assets. That is, for each of the media assets within the order list that is to be copied to the media device, the media database residing in the media device is modified to created 1118 database entries for each of the expected media assets to be copied to the media device. These media database entries can initially contain metadata information as well as a network address to a corresponding media asset file.

Next, a decision 1120 determines whether a media device is busy. When the decision 1120 determines that media device is busy, synchronization can be paused 1122. For example, the media devices may be performing other tasks that are to be performed promptly. In such cases, synchronization can be deferred. Next, a decision 1124 determines whether synchronization should resume. When the decision 1124 determines that synchronization should not resume, the synchronization process 1100 waits to resume. Once the decision 1124 determines that the synchronization process should resume, the synchronization process 1100 continues. Likewise, wherein the decision 1120 determines that the media device is not busy, the synchronization process 1100 continues.

When the synchronization process 1100 continues, a first media asset from the ordered list is selected 1126. Then, the selected media asset is requested 1128 from the host computer. Next, a decision 1130 determines whether the selected media asset being requested has been received. When the decision 1130 determines that the selected media asset has not yet been received, the synchronization process 1100 can await its receipt. Alternatively, once the decision 1130 determines that the selected media asset has been received, the selected media asset is stored 1132 to the media device. In one embodiment, the selected media asset being stored 1132 includes metadata and the storage 1132 of the selected media asset also serves to update or store such metadata. In addition, the media database can be updated 1134 to specify a local file path for the selected media asset. The local file path is a file path associated with the file system within the media device. In other words, the selected media asset is now stored locally within the media device and the media database contains a pointer directed it local storage location.

Next, a decision 1136 determines whether there are more media assets to be processed. When the decision 1136 determines that there are more media assets to be processed, the synchronization process 1100 returns to repeat the decision 1120 and subsequent blocks. At block 1126, a next media asset is selected from the order list and similarly processed. Alternatively, when the decision 1136 determines that there are no more media assets to be processed, the synchronization process 1100 can end.

Figure 12A:
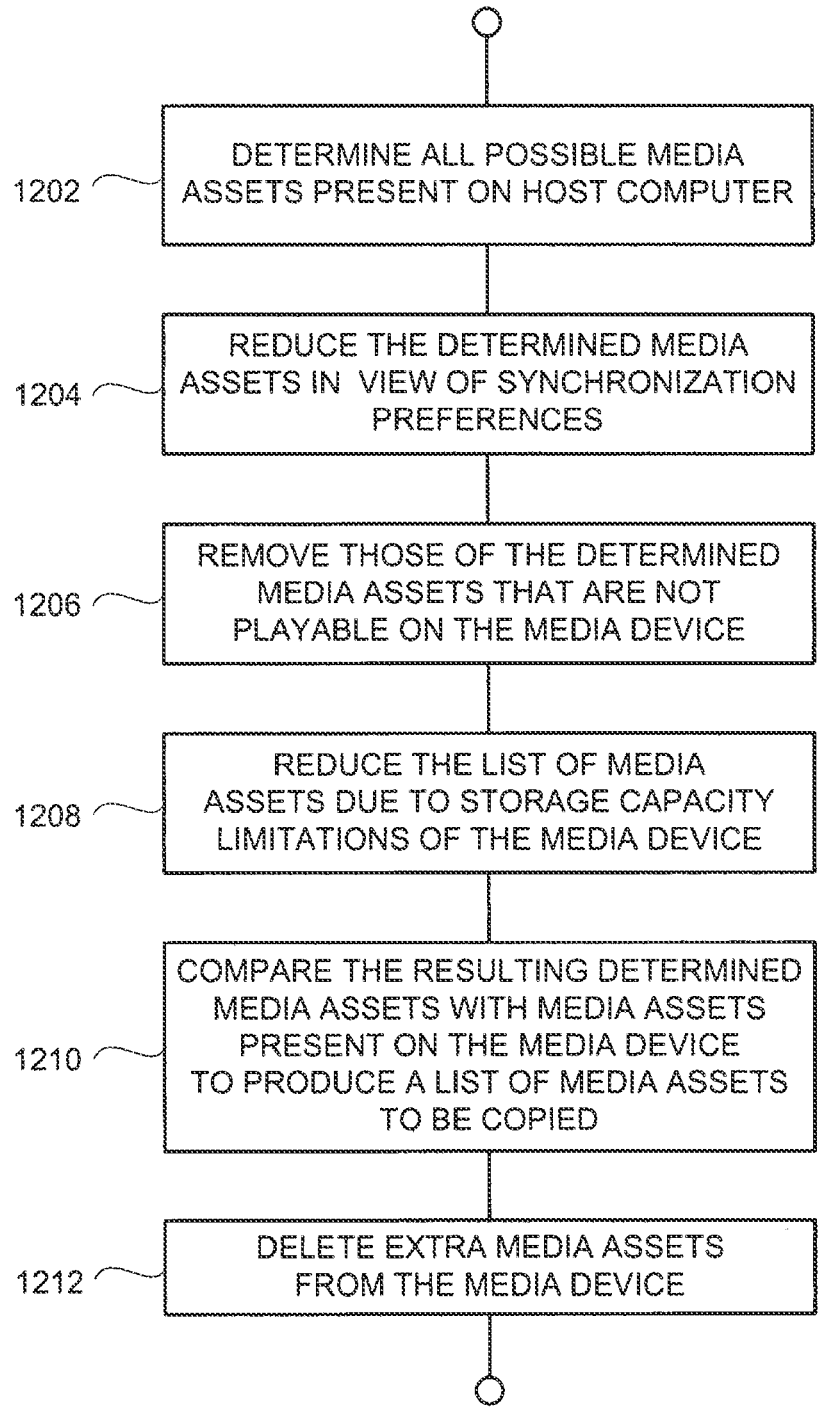
FIG. 12A is a flow diagram of a media asset determination process according to one embodiment of the invention.

FIG. 12A is a flow diagram of a media asset determination process 1200 according to one embodiment of the invention. The media asset determination process 1200 is, for example, processing associated with the block 1114 illustrated in FIG. 11A.

The media asset determination process 1200 can initially determine 1202 all possible media assets present on the host computer. Next, the determined media assets can be reduced 1204 in view of the synchronization preferences. For example, the determined media assets may include a plurality of different types of media assets. The synchronization preferences can, for example, exclude certain types, classes or groups of media assets from being included in a synchronization process. Hence, the determined media assets can be reduced 1204 in many cases in view of the synchronization preferences. Next, those of the determined media assets that are not playable on the media device can be removed 1206. Often, the media device supports only a limited number of media formats for playback. Hence, in the case in which some of the determined media assets are not compatible with the playback capabilities of the media device, such media assets can be removed from the determined media assets.

Furthermore, in one embodiment, the list of media assets can be reduced 1208 due to storage capacity limitations of the media device. Hence, in the event that the total storage capacity required by the resulting determined media assets is greater than the available storage capacity of the media device, the resulting determined media assets remaining on the list of media assets can be reduced 1208. In one embodiment, the manner by which the media assets are reduced 1208 can be in accordance with a priority order based on the type of media asset. The priority order can be pre-set and/or user-determined. In one implementation, movies are given the highest priority, then TV shows, then music, then broadcast, and then photos.

The resulting determined media assets can be compared 1210 with media assets present on the media device to produce a list of media assets to be copied. Optionally, the media asset determination process 1200 can delete 1212 extra media assets from the media device. For example, prior to copying the resulting determined media assets to the media device, the media device could delete those media assets already on the media device that are no longer needed on the media device or are no longer present on the host computer. An advantage of deleting certain previously stored media assets from the media device is to free up additional storage capacity for purposes of storing the resulting determined media assets to the media device.

Another embodiment of the invention pertains to prioritization of media assets before being copied from one electronic device to another electronic device. A recipient electronic device typically is provided with data storage that has a deterministic limit. Hence, when copying files to the second electronic device, the amount of media data being copied cannot exceed the storage capacity of the second electronic device. Accordingly, prioritization of the media assets prior to their being copied operates to arrange the media assets in a priority order. Thereafter, upon copying of the media assets to the second electronic device, they can be copied in the established priority order. To the extent that the amount of media data to be copied exceeds the memory capacity of the second electronic device, the remaining media assets of lower priority are not copied to the second electronic device which at that point has no adequate available storage capacity for such media assets.

In one embodiment, the media assets can first be prioritized according to categories. Exemplary categories include movies, TV shows, music (including music videos), podcasts, and photos. In one implementation, the prioritization can be in the order in which the categories are listed. This ordering can be referred to as a default or preset priority order. In another implementation, a user is permitted to re-order the categories to insert a different prioritization. As one example, the categories can be presented on a display in their default priority order, and then a user can, for example, manipulate one or more user interface controls to alter the priority order of the categories. For example, the user interface controls can refer to tabs in one example. In addition, within each category, there can be a prioritization of the media assets. For movies, movies that are specifically selected by a user via a graphical user interface can be copied at a higher priority and can be copied in a sort order (e.g., order listed on a display device). Other movies that are selected by a general grouping (e.g., recently watched movies) can also be copied but at a lower priority. For TV shows, media assets can be prioritized in their sort order (i.e., in the order listed on the display). Episodes pertaining to a particular TV show can in turn be prioritized from most recent episode to least recent episode. For music, media assets (in particular songs) can be prioritized in the order of the playlist in which the songs are contained, with the playlists being prioritized in their sort order (e.g., as displayed on a display). If all songs are selected to be copied, then those songs contained in one or more playlists are given a higher priority than songs that are only contained in the library.

Podcasts are prioritized in their sort order (e.g., in the order listed on the display). Episodes pertaining to a single podcast (i.e., RSS feed) can be prioritized from most recent episode to least recent episode. For photos, photo albums can be prioritized according to their order as being displayed. In one implementation, only complete albums are copied. Hence, in the case in which there is inadequate data storage capacity to copy a complete album, then according to one implementation none of the photos pertaining to the album would be copied.

Figure 12B:
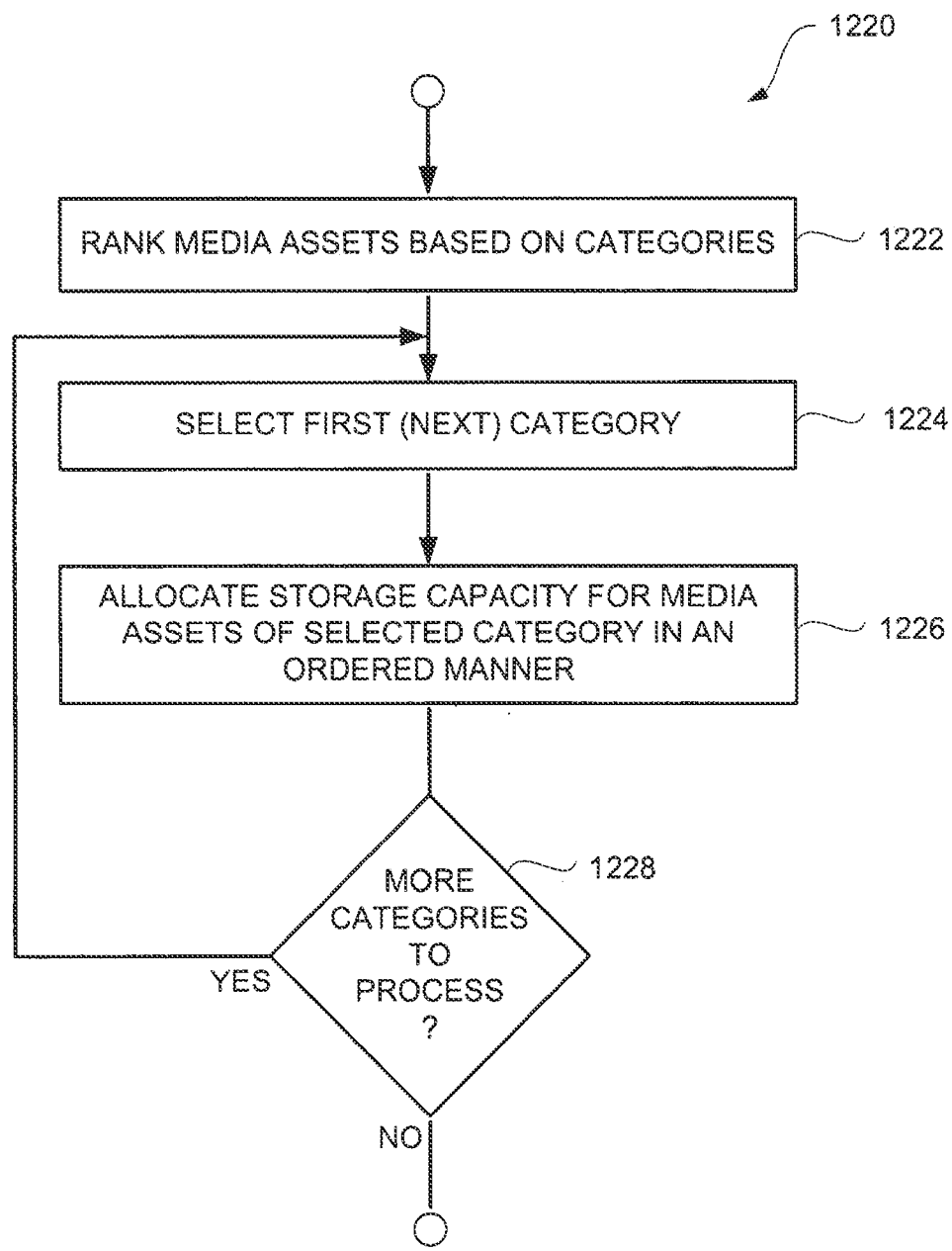
FIG. 12B is a flow diagram of a media asset prioritization process according to one embodiment of the invention.

FIG. 12B is a flow diagram of a media asset prioritization process 1220 according to one embodiment of the invention. The media asset prioritization process 1220 is, for example, processing associated with the block 1116 illustrated in FIG. 11B.

The media asset prioritization process 1220 can begin with ranking 1222 media assets based on categories. Typically, the media assets would be associated with different categories. The categories can have a priority order that is preset or user-determined. For example, in one embodiment, synchronization preferences can be altered by a user to adjust the priority order of the categories. More generally, a category can pertain to a data type. Examples of categories (or data types) include movies, music, television (TV) shows, podcasts, photos, contacts, electronic mail, contacts, calendars, and web browser bookmarks.

After the media assets have been ranked 1222, a first category is selected 1224 to be processed. Next, storage capacity (associated with the recipient electronic device) is allocated 1226 for media assets of the selected category in an ordered manner. For example, if the selected category includes ten different media assets arranged in a priority order, storage capacity for the ten different media assets can be allocated in the priority order. In the event that all ten of the media assets fit within the recipient electronic device, then the allocated 1226 storage capacity pertains to the combined total size of the ten media assets. In the event that the storage capacity required by the media assets of the selected category exceeds the available storage capacity then those of the media assets that can be stored to the recipient electronic device can be allocated storage capacity, with one or more of the media assets deemed unable to be copied to the recipient electronic device.

Next, a decision 1228 determines whether there are more categories to be processed. When the decision 1228 determines that there are more categories to process, the media asset prioritization process 1220 can return to repeat the block 1224 so that a next category can be selected and then storage capacity allocated 1226. Optionally, if the storage capacity for the recipient electronic device has already been completely allocated 1226, the decision 1228 can determine that no additional categories are to be processed. In any event, when the decision 1228 determines that there are no more categories to be processed, the media asset prioritization process 1220 can end. At this point, the media assets available to be copied to the recipient electronic device have been limited, as appropriate, to the storage capacity limitation of the recipient electronic device.

There are various different implementations or embodiments that can be utilized to allocate storage capacity for media assets that are to be copied. Different types (or categories) of media assets can be processed differently if so desired. Rules or policies can also be used to determine how to process the different types (or categories) of media assets.

Figure 12C:
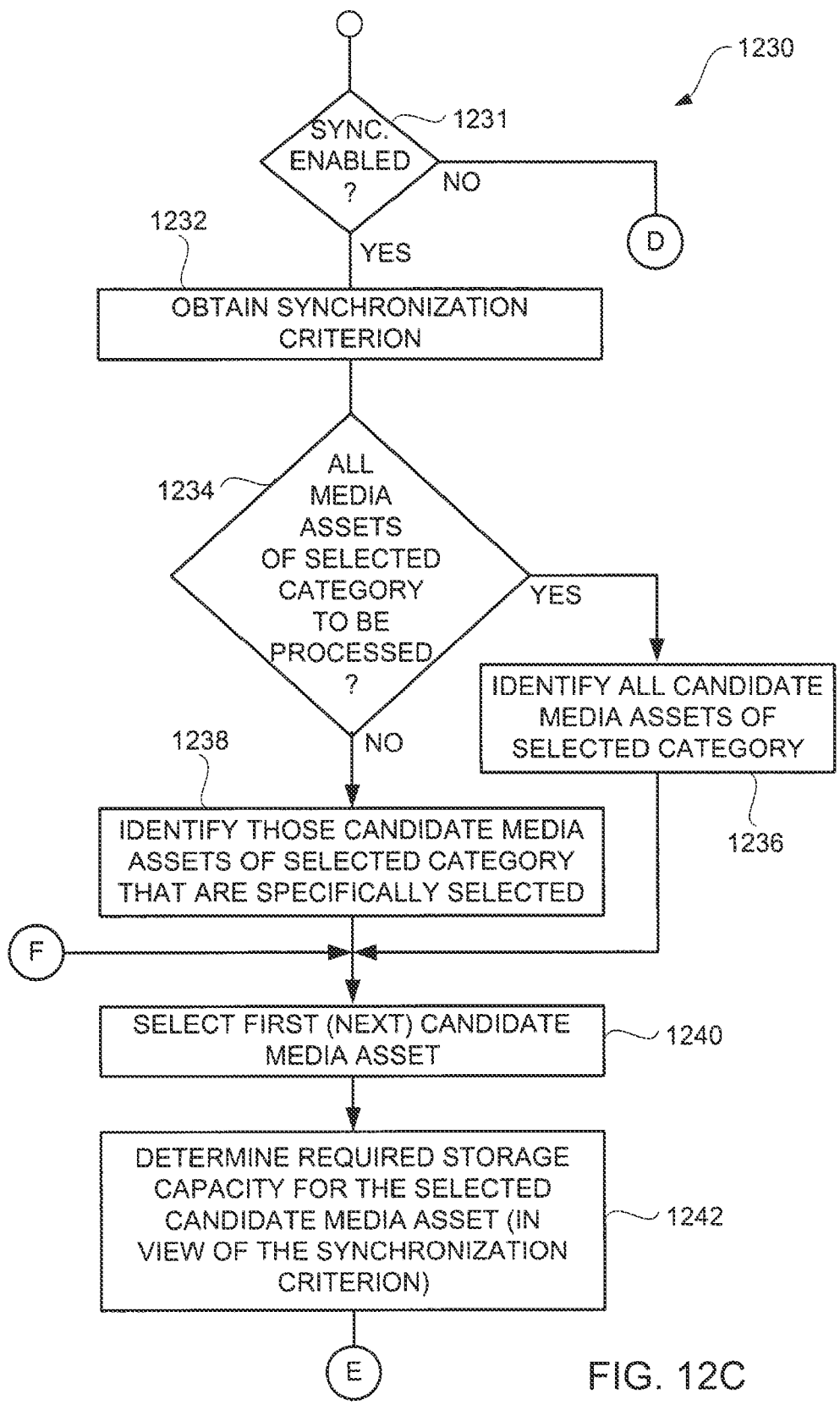
FIGS. 12C and 12D illustrate a first category synchronization process according to one embodiment of the invention.
Figure 12D:
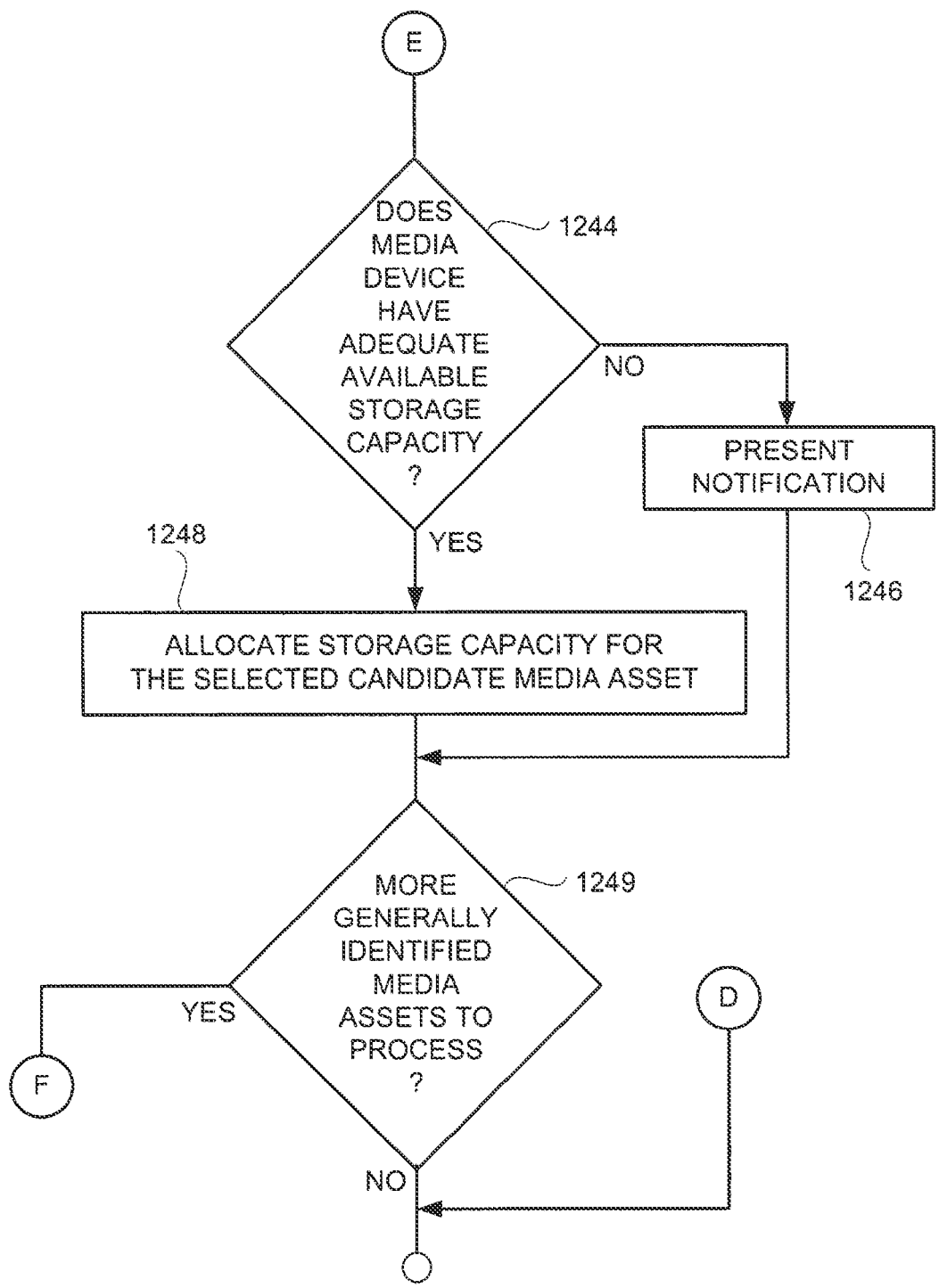

FIGS. 12C and 12D illustrate a first category synchronization process 1230 according to one embodiment of the invention. The first category synchronization process 1230 is, for example, processing associated with the block 1226 illustrated in FIG. 12B.

The first category synchronization process 1230 begins with a decision 1231. The decision 1231 determines whether synchronization is enabled. Here, the first category synchronization process 1230 pertains to synchronization of those media assets within a particular category. The decision 1231 can determine whether synchronization, which is a form of copying, has been enabled for the particular category. When the decision 1231 determines that synchronization for the particular category has not been enabled (i.e., disabled) then the first category synchronization process 1230 skips all synchronization processing for this category and ends. On the other hand, when the decision 1231 determines that synchronization is enabled for the selected category, synchronization criterion can be obtained 1232. The synchronization criterion can pertain to a user selection of criterion or criteria that are used to distinguish media assets within the selected category.

A decision 1234 then determines whether all media assets of the selected category are to be processed. In this embodiment, the first category synchronization process 1230 allows a user to specify whether they would like all media assets of the selected category to be processed or, alternatively, only like those specifically identified media assets of the selected category to be processed. When the decision 1234 determines that all media assets of the selected category are to be processed, then all candidate media assets of the selected category can be identified 1236. On the other hand, when the decision 1234 determines that not all of the media assets of the selected category are to be processed, then those candidate media assets of the selected category that have been specifically selected can be identified 1238. At this point, the candidate media assets to be copied (or synchronized) have been identified and are in an ordered list. The ordered list of media assets can then be processed as follows.

A first candidate media asset is selected 1240. Then, the required storage capacity for the selected candidate media assets can be determined 1242. In one embodiment, the selected candidate media asset pertains to a set or family of one or more episodes of the selected candidate media asset. In such case, the synchronization criterion previously obtained 1232 can be used to designate those of the episodes to be copied, which in some cases limits the quantity of episodes to be copied. A decision 1244 then determines whether the media device has adequate available storage capacity. When the decision 1244 determines that the media device does not have adequate available storage capacity for the selected candidate media asset, then a notification can be presented 1246. For example, the notification can be a visual notification or an audio notification presented to the user of the first electronic device. The notification can, for example, inform the user that the media assets of the particular category being processed are not able to be completely stored to the second electronic device. The notification can also indicate to the user where the synchronization process has ended.

On the other hand, when the decision 1244 determines that the media device does have adequate available storage capacity, storage capacity for the selected candidate media asset is allocated 1248. In the case in which the selected candidate media asset pertains to a set or family of media assets, such as episodes, the episodes can be processed in a priority order as well. For example, if all of the episodes designated to be copied are able to be copied, then the storage capacity is allocated 1248 for all of the episodes.

When the storage capacity is unable to store all of the designated episodes, then according to one embodiment the episodes designated to be copied can be copied in priority order until the storage capacity has been completely allocated.

Following the blocks 1246 and 1248, a decision 1249 determines whether more candidate media assets are to be processed. When the decision 1249 determines that there are more candidate media assets to be processed within the particular category, the first category synchronization process 1230 returns to repeat the decision 1240 and subsequent blocks so that a next candidate media asset can be selected and similarly processed. Once the decision 1249 determines that there are no more media candidate assets to be processed (or when the storage capacity of the second electronic device has already been completely allocated), the first category synchronization process 1230 can end.

Figure 12E:
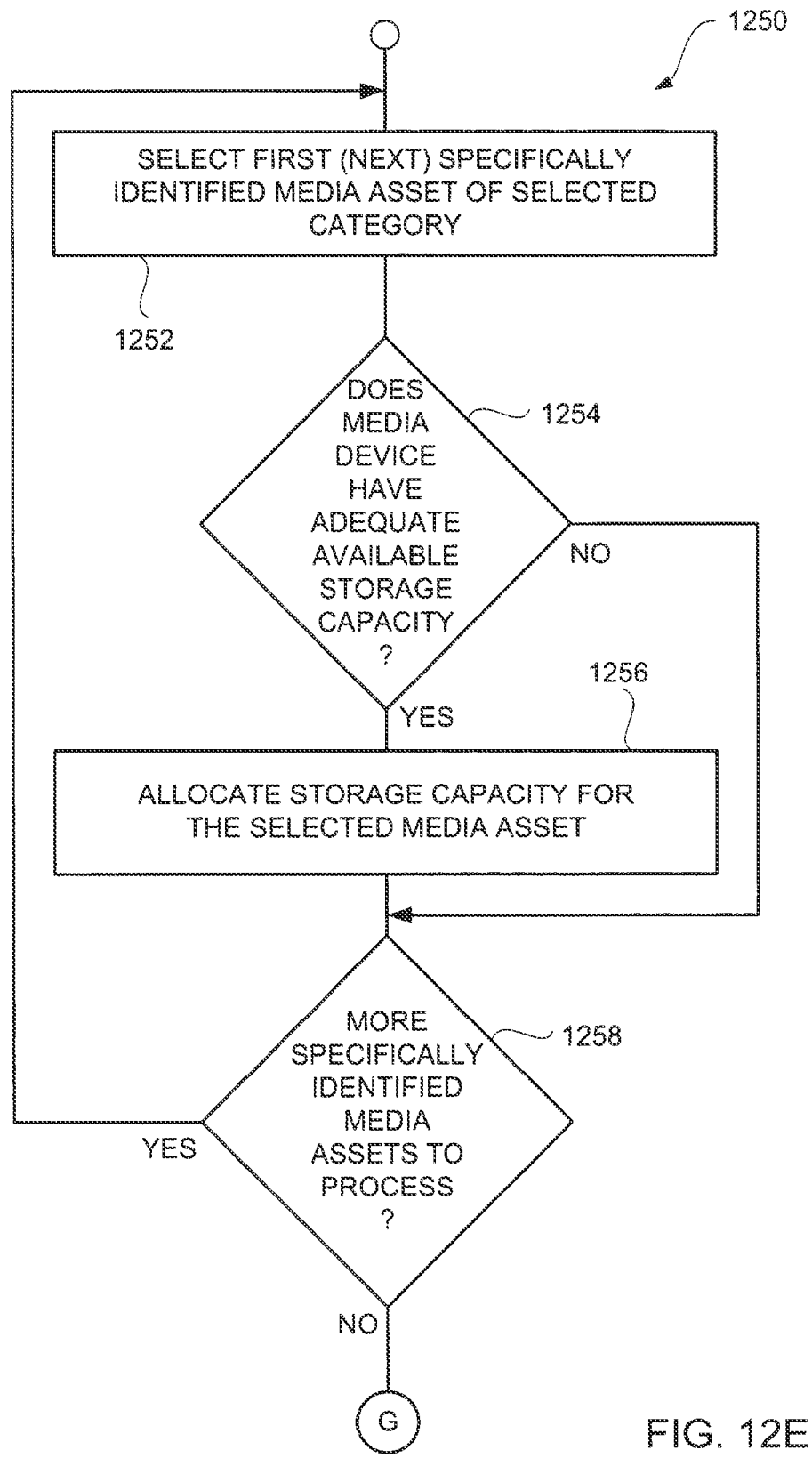
FIGS. 12E and 12F illustrate a flow diagram of a second category synchronization process according to one embodiment of the invention.
Figure 12F:
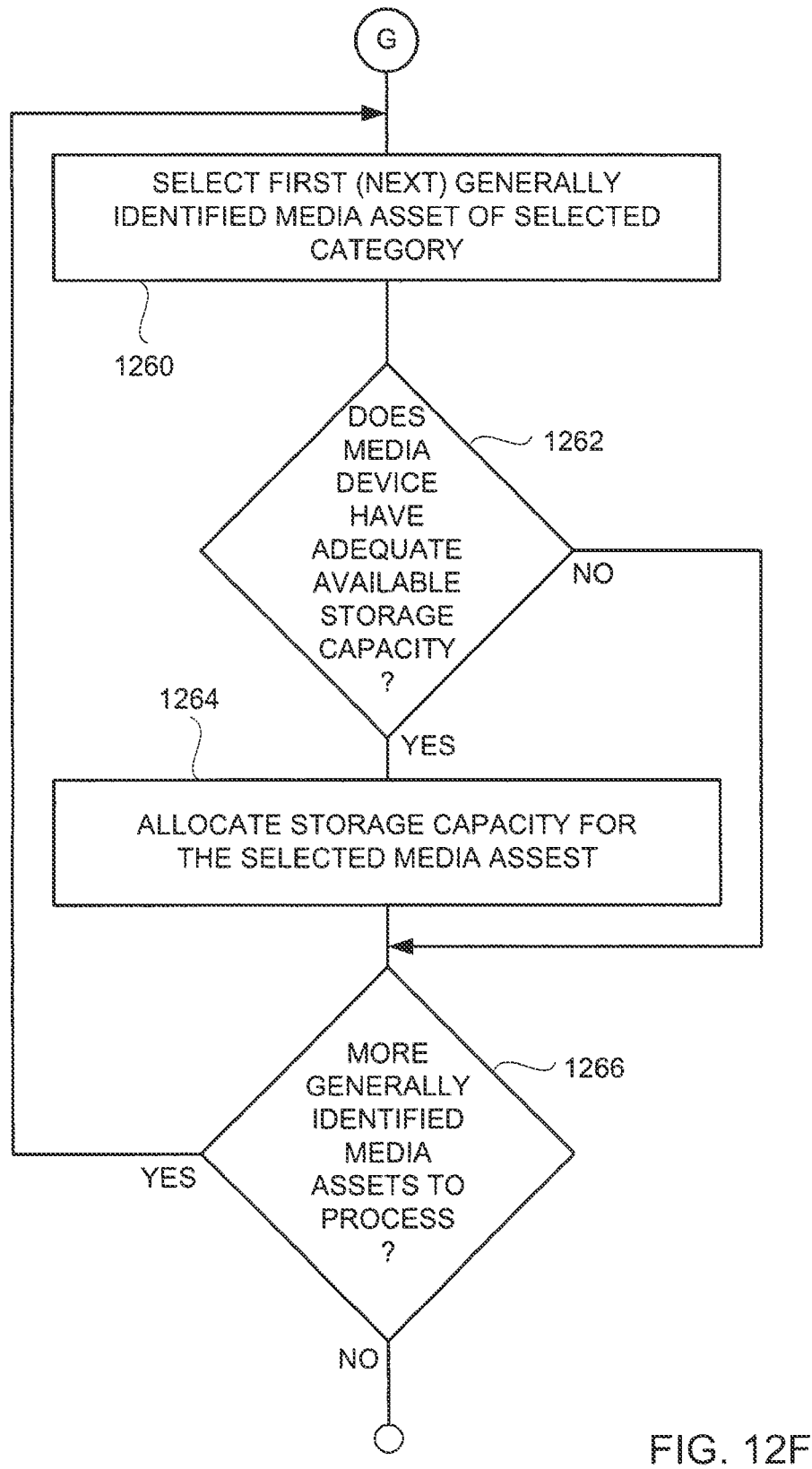

FIGS. 12E and 12F illustrate a flow diagram of a second category synchronization process 1250 according to one embodiment of the invention. The second category synchronization process 1250 is, for example, processing associated with the block 1226 illustrated in FIG. 12B. In this embodiment, the media assets to be synchronized for a given category can be specifically identified or generally identified. Typically, a user can set, alter or modify synchronization preferences that can determine those media assets being specifically identified and those being generally identified. In this embodiment, within a given category, specifically identified media assets are treated with higher priority than generally identified media assets.

The second category synchronization process 1250 can select 1252 a first specifically identified media asset of the selected category. A decision 1254 determines whether the media device (e.g., recipient electronic device) has adequate available storage capacity for the selected media asset. When the decision 1254 determines that the media device does have adequate available storage capacity, storage capacity for the selected media asset can be allocated 1256. Alternatively, when the decision 1254 determines that the media device does not have adequate available storage capacity, the block 1256 is bypassed and no storage capacity is allocated for the selected media asset. Following the block 1256, or it being bypassed, a decision 1258 determines whether there are more specifically identified media assets to be processed. When the decision 1258 determines that there are more specifically identified media assets to be processed, the second category synchronization process 1250 can return to repeat the block 1252 so that a next specifically identified media asset of the selected category can be selected 1252 and similarly processed.

On the other hand, once the decision 1258 determines that there are no more specifically identified media assets to be processed, a first generally identified media asset of the selected category can be selected 1260. A decision 1262 determines whether the media device has adequate available storage capacity for the selected media asset. When the decision 1262 determines that the media device does have adequate available storage capacity for the selected media asset, then storage capacity for the selected media asset is allocated 1264. Alternatively, when the decision 1262 determines that the media device does not have adequate available storage capacity, the block 1264 is bypassed and no storage capacity is allocated for the selected media asset. Following the block 1264, or its being bypassed, a decision 1266 determines whether there are more generally identified media assets to be processed. When the decision 1266 determines that there are more generally identified media assets to be processed, the second category synchronization process 1250 can return to repeat the block 1260 so that a next generally identified media asset of the selected category can be selected and similarly processed. Once the decision 1266 determines that there are no more generally identified media assets to be processed, the second category synchronization process 1250 can end.

Media assets being synchronized between a host computer and a client device are often large electronic files that take some time to copy between devices. Hence, in one embodiment, the copying of media assets for synchronization can be performed at a lower priority than other functions carried out by a client device. For example, a client device (e.g., media device) can be consuming much of its processing resources in playing a media asset or acquiring a media asset from an online media store. Thus, synchronization can be managed so as to not interfere with other potentially more important tasks of the client device.

Figure 13A:
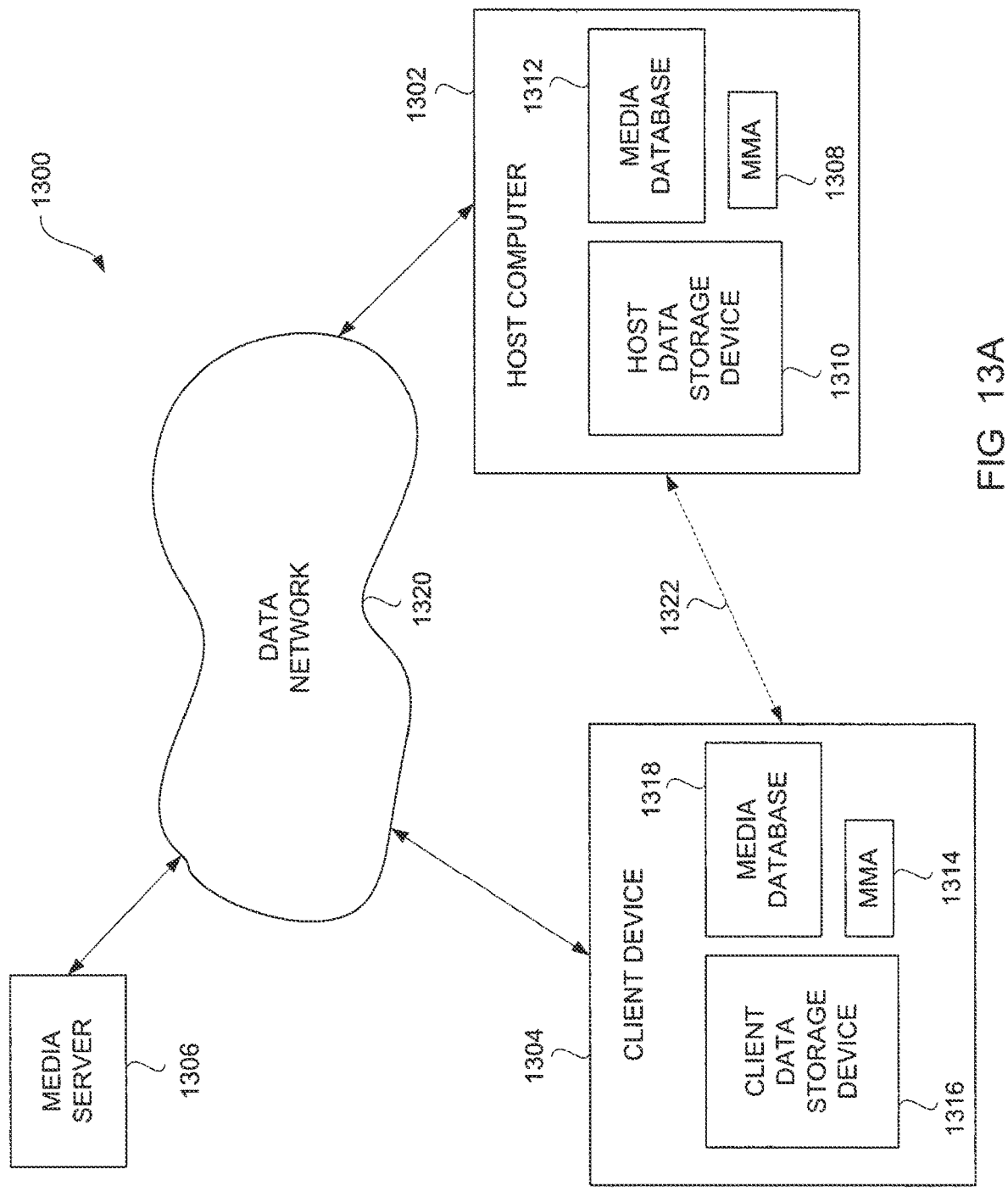
FIG. 13A is a block diagram of a media system according to one embodiment of the invention.

FIG. 13A is a block diagram of a media system 1300 according to one embodiment of the invention. The media system 1300 includes a host computer 1302, a client device 1304 and a media server 1306. The host computer 1302 includes a media management application (MMA) 1308 that operates to manage the storage, search, browse, retrieval, playback, download or transfer of media assets on, to or from the host computer 1302. The host computer 1302 also includes a host data storage device 1310 and a media database 1312. The host data storage device 1310 stores media data (digital data) in electronic files for media assets that are stored on the host computer 1302. The media database 1312 stores metadata pertaining to media assets stored on the host computer 1302.

The client device 1304 includes a media management application (MMA) 1314 that facilitates storage, search, browse, retrieval, playback, download or transfer of media assets with respect to the client device 1304. The client device 1304 also includes a client data storage device 1316 and a media database 1318. The client data storage device 1316 stores media data pertaining to media data (digital data) in electronic files for media assets that are stored on the client device 1304. The media database 1318 stores metadata pertaining to media assets stored on the client device 1304.

Within the media system 1300, the host computer 1302 as well as the client device 1304 can allow users to select and playback media assets that are stored on such devices. In one embodiment, the host computer 1302 can receive media assets from the media server 1306 via a data network 1320. The media server 1306 can host an on-line media store that provides search, browse, purchase and download of media assets. When the host computer 1302 interacts with the media server 1306 to download a media asset, the media asset can be managed by the media management application 1308, including storage of the media asset to the host data storage device 1310 and storage of associated metadata in the media database 1312. A media asset that is stored on the host computer 1302 can also be copied (or transferred) to the client device 1304. Such copying can be part of a synchronization process between the two devices. In one implementation, data being copied for the media asset can be transmitted from the host computer 1302 to the client device 1304 via the data network 1320. In another implementation, data for the media asset being copied can be transferred over a link 1322 established between the host computer 1302 and the client device 1304. As an example, the host computer 1302 and the client device 1304 can include wireless interface circuitry that allows that host computer 1302 and the client device 1304 to communicate in a wireless manner over the link 1322. As an example, the wireless link 1322 could pertain to a piconet, such as a Bluetooth network or other short range network. A user of the host computer 1302 can select and play back a media asset stored within the host data storage device 1310 through use of the media management application 1308. Typically, the host computer 1302 will include or couple to a display device whereby the playback of the media asset can provide visual media output (e.g., display device) and/or audio media output (e.g., a speaker). The display device can also support a graphical user interface that provides menus, user interface (UI) controls, etc. that assist a user in interacting with the host computer 1302 while selecting and playing media assets. Likewise, the playback of a media asset on the client device 1304 can retrieve data for the media asset from the client data storage device 1316 and output audio and/or video media output.

In one embodiment, the host computer 1302 and the client device 1304 interact to copy media assets there between. For example, the client device 1304 can synchronize its stored media assets with those stored media assets at the host computer 1302. In one implementation, the client device 1304 has less available data storage capacity in the client data storage device 1316 than does the host data storage device 1310. Hence, in such an embodiment, preferences, namely, synchronization preferences, can be utilized to intelligently determine which media assets from the host data storage device 1310 should be copied to the client data storage device 1316.

In one embodiment, the client device 1304 may be occupied performing various operations when synchronization with the host computer 1302 is available. In one embodiment, the copying of media assets from the host computer 1302 to the client device 1304 can be performed at a lower priority than the other operations, such as media playback, on the client device 1304. Hence, if the client device 1304, namely the media management application 1314, is operating to playback one or more media assets, any copying of media assets from the host computer 1302 to the client device 1304 can be temporarily suspended while the playback is being performed at the client device 1304. Still further, in one embodiment, the client device 1304, by way of the media database 1318, knows the media assets that are determined to be copied from the host computer 1302 to the client device 1304. However, since the media assets are rather large in size and the client device 1304 may be busy performing other tasks, media data may not have been received at the client data storage device 1316 when a user desires to playback the associated media asset. In such case, the media database 1318 may have already stored the metadata pertaining the media asset, such that the media management application 1314 can enable a user to select the media asset for playback. Once a media asset is selected to be played back, the client device 1304 can determine whether the media asset is stored in the client data storage device 1316. If the media asset is not already stored to the client data storage device 1316, the media management application (MMA) 1314 can determine a remote location for the media data for the media asset through use of the media database 1318. For example, the media database 1318 can store an address location (e.g., address pointer) to a remote location accessible by the client device 1304 by way of the data network 1320 or the link 1322. The media management application 1314 can then access the remote location to retrieve the media asset and have it delivered to the client device 1304 so that the media asset is able to be played on the client device 1304. In one implementation, the media management application 1314 accesses the host computer 1302 over the link 1322 to open a streaming connection such that the media data pertaining to the selected media asset can be streamed from the host computer 1302 to the client device 1304 where it is to be played back.

Figure 13B:
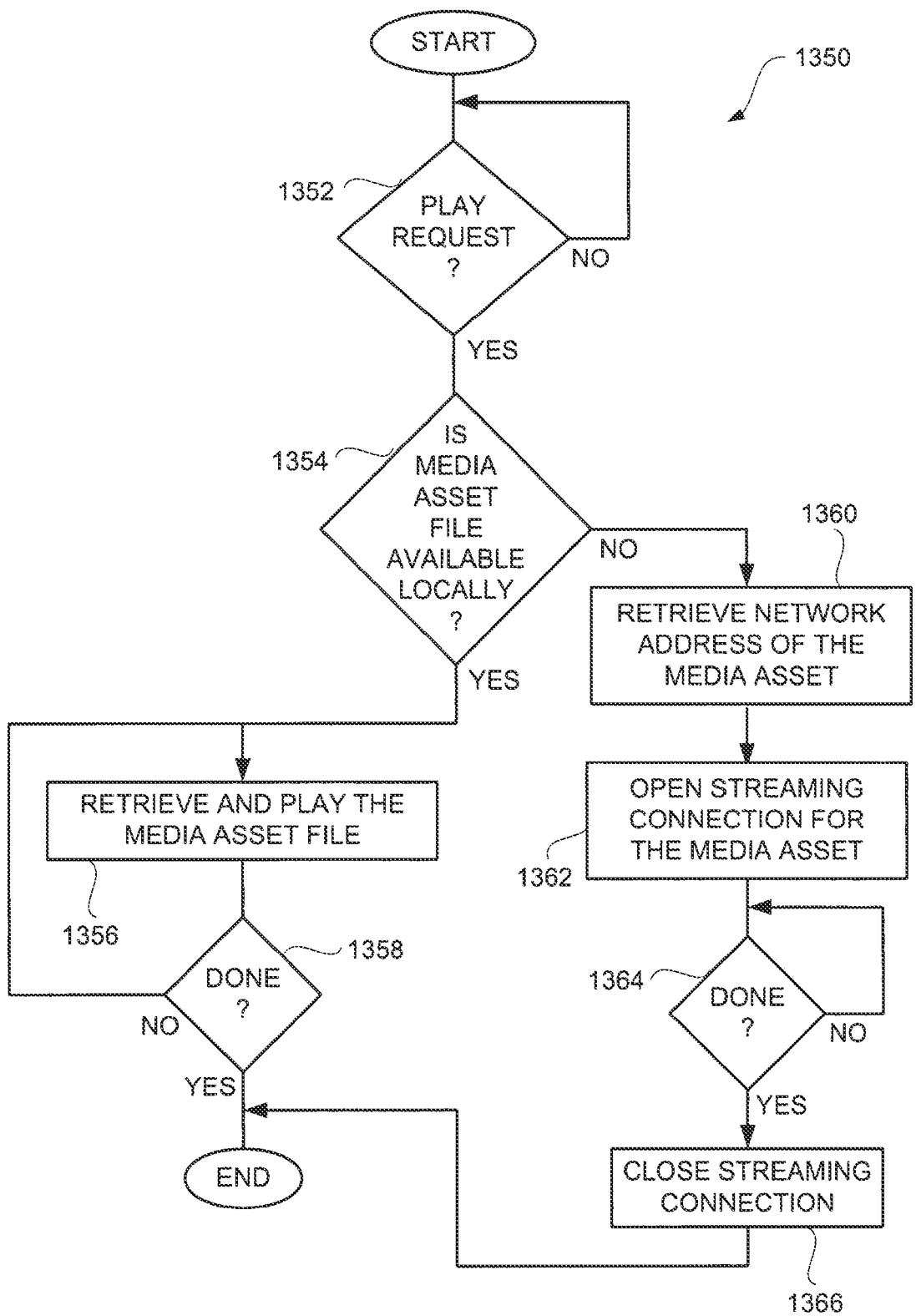
FIG. 13B is a flow diagram of a media asset playback process according to one embodiment of the invention.

FIG. 13B is a flow diagram of a media asset playback process 1350 according to one embodiment of the invention. The media asset playback process 1350 is performed by a media device. For example, the media asset playback process 1350 can be performed by the client device 1304 illustrated in FIG. 13A.

The media asset playback process 1350 begins with a decision 1352. The decision 1352 determines whether a play request has been received. Typically, a play request would be a request initiated by a user to play a particular media asset. When the decision 1352 determines that play request has not been received, the media asset playback process 1350 awaits such a request. In other words, the media asset playback process 1350 is invoked when a play request is received.

Once the decision 1352 determines that a play request has been received, a decision 1354 determines whether the media asset has a media asset file available locally at the media device. When the decision 1354 determines that there is a media asset file available locally, the media asset file can be retrieved and played 1356. A decision 1358 then determines whether the playback of the media asset file has completed. When the decision 1358 determines that the playback has not completed, the media asset playback process 1350 returns to repeat the block 1356 until the playback completes. Once the playback completes, the media asset playback process 1350 can end.

On the other hand, when the decision 1354 determines that there is no media asset file available locally, a network address for the media asset can be retrieved 1360. In one embodiment, the network address for the media asset is retrieved from a media database stored within the media device. After the network address has been retrieved 1360, a streaming connection for the media asset is opened 1362 using the network address. Next, a decision 1364 determines whether the streaming of the media asset has completed. When the decision 1364 determines that the streaming of the media asset has not completed, the streaming continues. Once the decision 1364 determines that the streaming has completed, the streaming connection is closed 1366 and the media asset playback process 1350 can end.

According to an above-noted aspect of the invention, a graphical user interface can be presented to assist a user to set of one or more preferences to be utilized during synchronization. In one embodiment, the preferences for synchronization can be set differently for different devices. FIGS. 14A-14F are exemplary screenshots suitable for use for setting preferences for a plurality of different types of media assets according to another embodiment of the invention. These exemplary screenshots can be used to set preferences, namely, synchronization preferences, for a particular media device. However, multiple separate sets of such exemplary screenshots can be used to set preferences for multiple media devices. The multiple media devices can be the same or different media devices. These exemplary screenshots are presented on a host device, such as a personal computer, that can operate a media management application. However, alternatively, similar or simplified screenshots can be used on a mobile device.

Additionally, it should be noted that there can also be an order of priority for the different types of media assets. The order of priority can affect synchronization if storage capacity at the device receiving the media assets is insufficient. In one embodiment, the order of priority can be the order of media type tabs (left-to-right) in synchronization preference screens illustrated in FIGS. 14B-14F whereby the priority highest to lowest is movies, TV shows, music, podcasts and photos. The existence of the different media type tabs can be dependent on the type of device for which the synchronization preferences are being set.

Figure 14A:
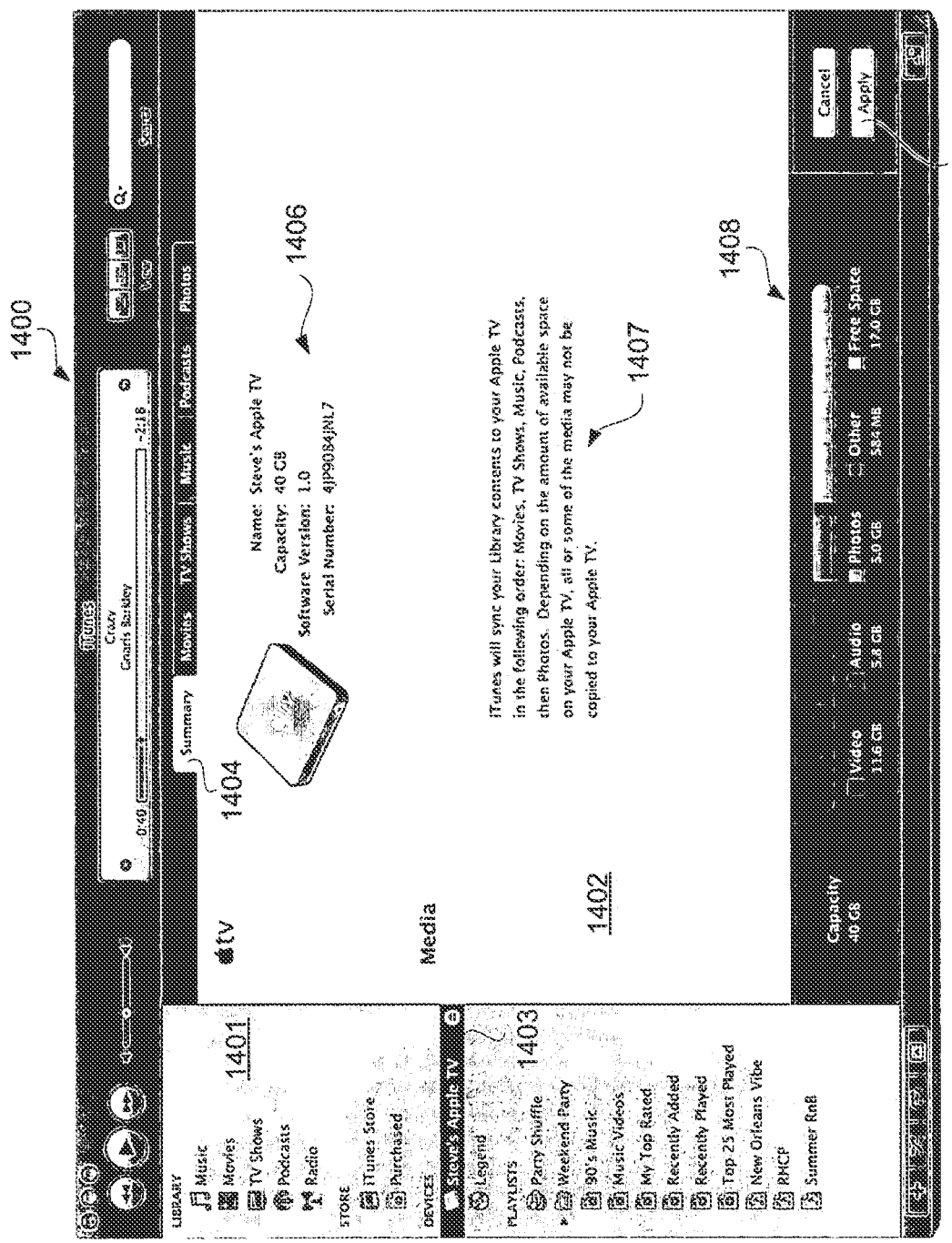
FIGS. 14A-14F are exemplary screenshots suitable for use for setting preferences for a plurality of different types of media assets according to another embodiment of the invention.

FIG. 14A is a summary synchronization screen 1400 according to one embodiment of the invention. The summary synchronization screen 1400 includes a source region 1401 that specifies various media sources that can be selected, and an information region 1402 that displays information pertaining to a selected media source. Here, a particular device from the source region 1401 is selected as indicated by a visual designator 1403. Here, the particular device is labeled "Steve's Apple TV" which is a media device that can connect to and present media on a television or monitor. In one implementation, the media device is a set-top box. The summary synchronization preference screen 1400 indicates a summary tab 1404 being selected. When the particular device is so selected, the information region 1402 can display device information 1406 about the particular device. For example, the device information 1406 can include name, capacity, software version, and/or serial number. The information region 1402 can also include media synchronization information 1407 that, in this example, explains the general priority or ordering used during synchronization of various different types (e.g., categories) of media assets.

Further, in one embodiment, a storage capacity graphic 1408 can be provided at a lower portion of the summary synchronization preference screen 1400. The summary synchronization preference screen 1400 can indicate storage capacity utilized by different types of media stored on a device. The storage capacity graphic 1400 can also indicate available free storage capacity. More particularly, the storage capacity graphic 1408 illustrates how forty (40) gigabytes (GB) of storage capacity is distributed between video, audio, photos, other and free space. By selecting an "Apply" button 1409, the user preference settings that have been set with respect to the summary synchronization preference screen 1400 can be applied. As an example, applying the synchronization preferences can initiate a synchronization operation or can simply store the synchronization preferences to memory for use with subsequent synchronization operations.

Figure 14B:
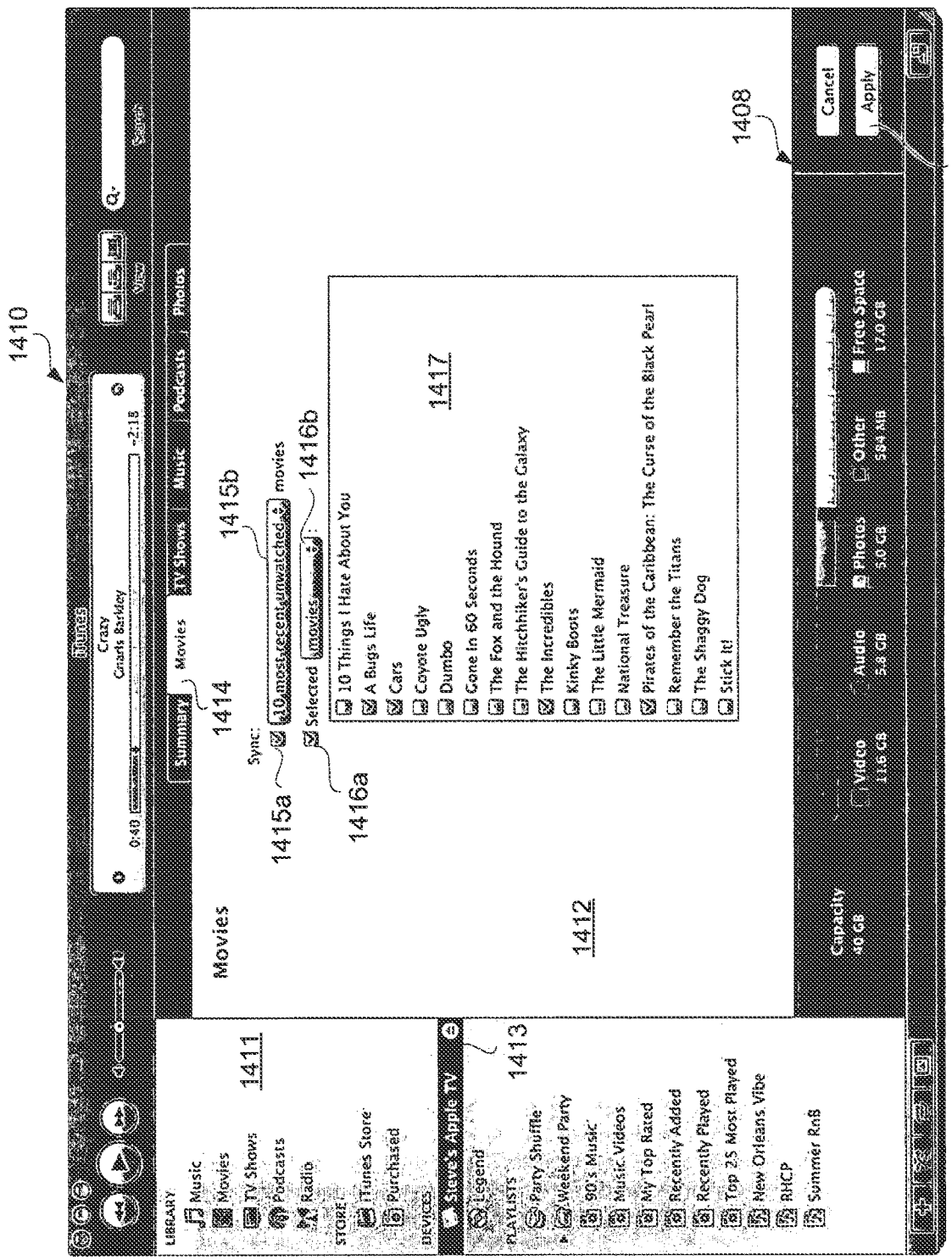

FIG. 14B is a movie synchronization preference screen 1410 according to one embodiment of the invention. The movie synchronization preference screen 1410 indicates a movie tab 1414 being selected. The movie synchronization preference screen 1410 allows a user to make one or more selections to influence synchronization of movies. The movie synchronization preference screen 1410 includes a source region 1411 that specifies various media sources that can be selected, and a preference setting region 1412 that assists a user in making one or more selections to influence synchronization of music with respect to a selected media source. Here, a particular device from the source region 1411 is selected as indicated by a visual designator 1413. When the particular device is so selected, the preference setting region 1412 can display a graphical user interface that facilitates the user in setting synchronization preferences to be used when synchronizing movies with respect to the particular device (e.g., a media device) and a host device (e.g., personal computer). More particularly, the movie synchronization preference screen 1410 includes a check boxes 1415a and 1416a that can be used to request that certain movies be synchronized. The selector 1415a can be used to generally specify certain watched or unwatched movies to be synchronized. A selection box 1415b can be used to specify which certain watched or unwatched movies are to be synchronized. For example, the selection box 1415b can facilitate user selection of the following options: all, x most recent, all unwatched or x most recent unwatched (where x is an integer). The selector 1416a can be used to request that specifically selected movies (or playlists) be synchronized. A selection box 1416b can be used to select a media type, such as movies or playlists. The selector 1416a, when selected, enables a user to selected one or more available movies (or playlists) from a list 1417 being displayed. The user can then select one or more of the movies (or playlists) being displayed in the displayed list 1417. Upon synchronization, the synchronization preferences associated with the movie synchronization preference screen 1410 can be utilized with respect to movies. The movie synchronization preference screen 1410 can also include the lower portion 1408 as discussed above.

Figure 14C:
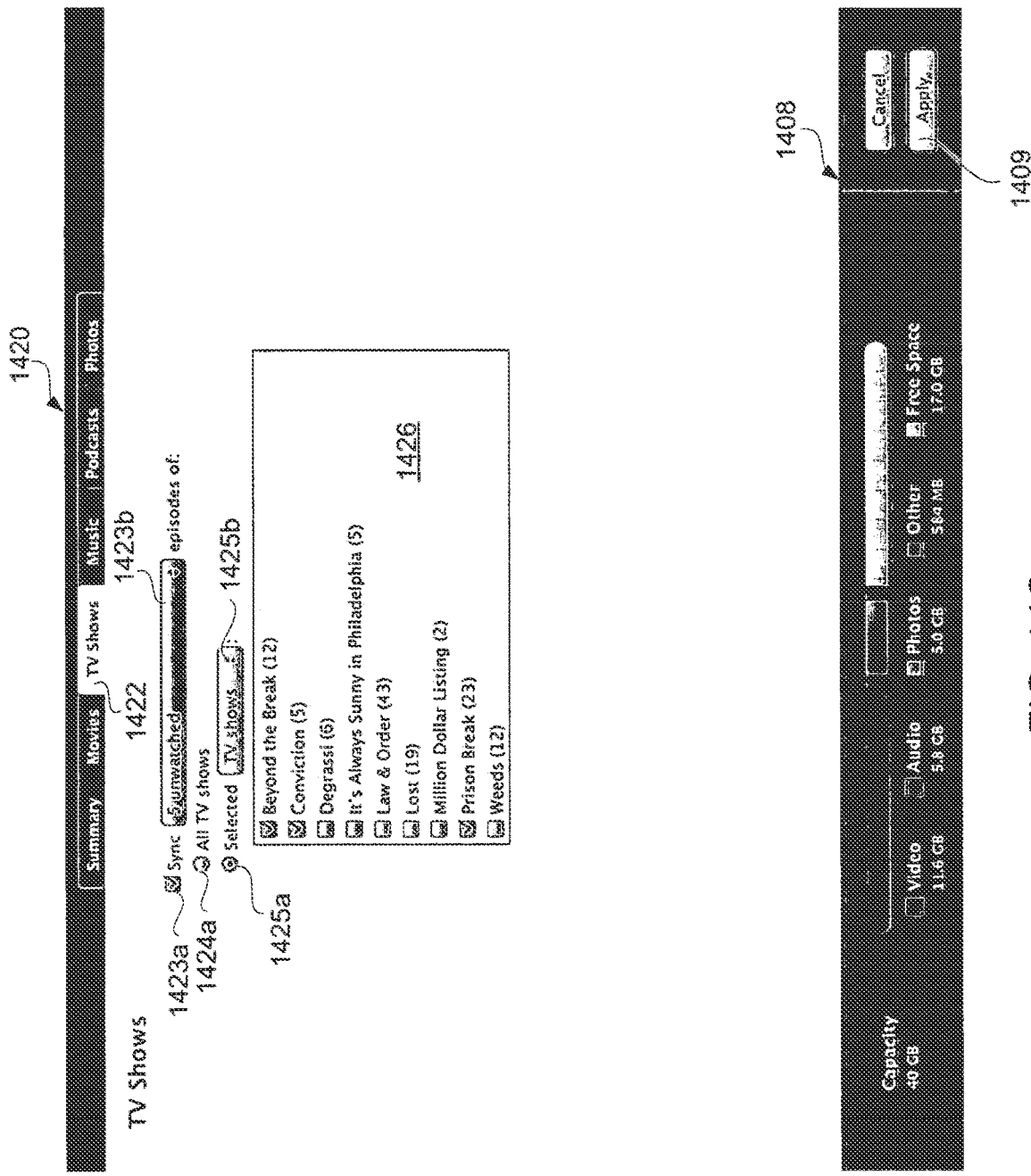

FIG. 14C is a television (TV) show synchronization preference screen 1420 according to one embodiment of the invention. The TV show synchronization preference screen 1420 indicates a TV shows tab 1422 being selected. The TV show synchronization preference screen 1420 allows a user to make one or more selections to influence synchronization of TV shows. Although not illustrated, the TV show synchronization preference screen 1400 can include a source region that specifies various media sources that can be selected. Here, the selected media source is the same particular device as selected in the source region 1413 illustrated in FIG. 14B. When the particular device is so selected, the preference setting region can display a graphical user interface that facilitates the user in setting synchronization preferences to be used when synchronizing TV shows with respect to the particular device (e.g., a media device) and a host device (e.g., personal computer). More particularly, the TV show synchronization preference screen 1420 includes a check box 1423a that can be used to request (e.g., enable or disable) synchronization of TV shows, namely, synchronization of certain episodes of TV shows. When synchronization of TV shows is requested, a selection box 1423b can be used to specify which certain episodes of TV shows are to be synchronized. For example, the selection box 1423b can facilitate user selection of the following options: all, x most recent, all unwatched or x most recent unwatched (where x is an integer). A selector 1424 can be used to request that episodes of all TV shows be considered when synchronized. Alternatively, synchronization of certain TV shows can be requested by selector 1425a. The selector 1425a can be used to specify that episodes of certain selected TV shows (or playlists) be considered when synchronized. A selection box 1425b can be used to select a media type, such as TV shows or playlists. The selector 1425a, when selected, enables a user to selected one or more available TV shows (or playlists) from a list 1426 being displayed. The user can then select one or more of the TV shows (or playlists) being displayed in the displayed list 1426. Upon synchronization, the synchronization preferences associated with the TV show synchronization preference screen 1420 can be utilized with respect to TV shows. The TV show synchronization preference screen 1420 can also include the lower portion 1408 as discussed above.

Figure 14D:
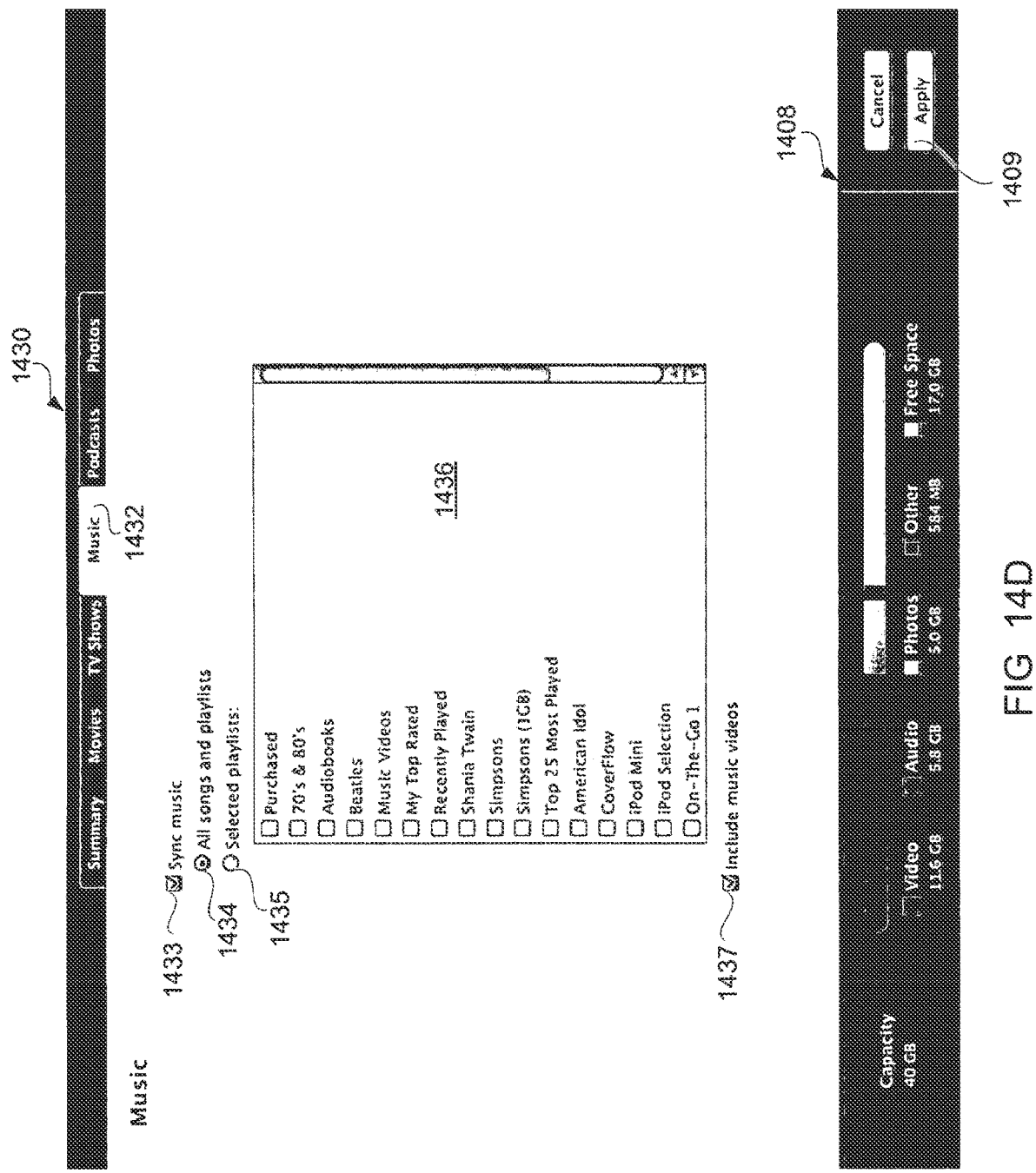

FIG. 14D is a music synchronization preference screen 1430 according to one embodiment of the invention. The music synchronization preference screen 1430 indicates a music tab 1432 being selected. The music synchronization preference screen 1430 allows a user to make one or more selections to influence synchronization of music. Although not illustrated, the music synchronization preference screen 1430 can include a source region that specifies various media sources that can be selected. Here, the selected media source is the same particular device as selected in the source region 1413 illustrated in FIG. 14B. When the particular device is so selected, the preference setting region can display a graphical user interface that facilitates the user in setting synchronization preferences to be used when synchronizing music with respect to the particular device (e.g., a media device) and a host device (e.g., personal computer). More particularly, the music synchronization preference screen 1430 includes a check box 1433 that can be used to request (e.g., enable or disable) synchronization of music. When synchronization of music is requested, a selector 1434 can be used to request that all songs and playlists be synchronized. Alternatively, a selector 1435 can be used to request that certain selected playlists be synchronized. The selector 1435, when selected, enables a user to select one or more available playlists from a list 1436 being displayed. Upon synchronization, the synchronization preferences associated with the music synchronization preference screen 1430 can be utilized with respect to music. The preference setting region can also include a check box 1437 that can be used to request that music videos be included when synchronizing music. For example, synchronizing a song from the host device to the particular device, can copy not only the audio file for the song but also the video file for an associated music video. The music synchronization preference screen 1430 can also include the lower portion 1408 as discussed above.

Figure 14E:
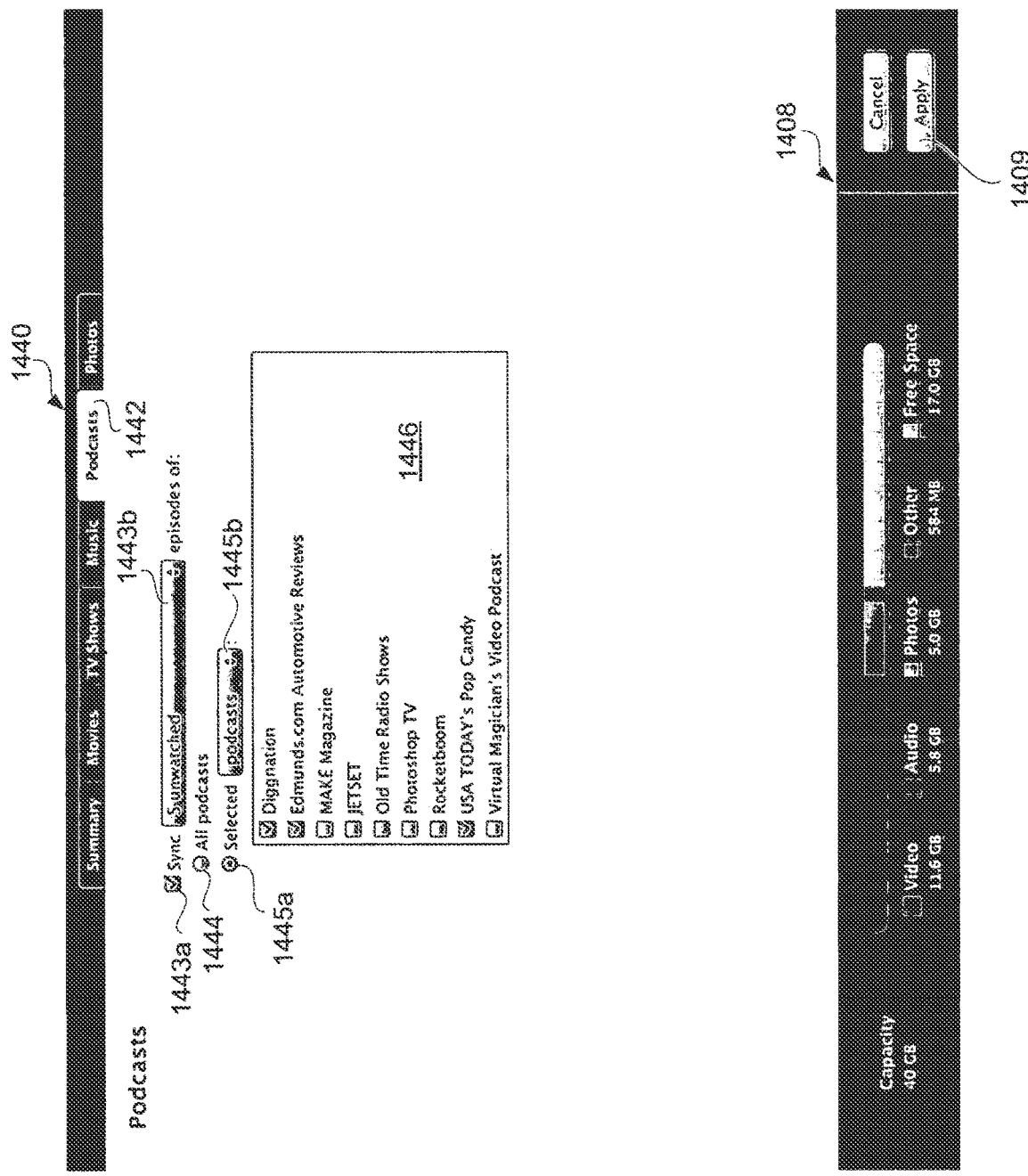

FIG. 14E is a podcast synchronization preference screen 1440 according to one embodiment of the invention. The podcast synchronization preference screen 1440 indicates a podcast tab 1442 being selected. The podcast synchronization preference screen 1440 allows a user to make one or more selections to influence synchronization of podcasts. Although not illustrated, the podcast synchronization preference screen 1440 can include a source region that specifies various media sources that can be selected. Here, the selected media source is the same particular device as selected in the source region 1413 illustrated in FIG. 14B. When the particular device is so selected, the preference setting region can display a graphical user interface that facilitates the user in setting synchronization preferences to be used when synchronizing podcasts with respect to the particular device (e.g., a media device) and a host device (e.g., personal computer). More particularly, the podcast synchronization preference screen 1440 includes a check box 1443a that can be used to request (e.g., enable or disable) synchronization of podcasts, namely, synchronization of certain episodes of podcasts. When synchronization of podcasts is requested, a selection box 1443b can be used to specify which certain episodes of podcasts are to be synchronized. For example, the selection box 1443b can facilitate user selection of the following options: all, x most recent, all unplayed or x most recent unplayed (where x is an integer). A selector 1444 can be used to request that episodes of all podcasts be considered when synchronized. Alternatively, synchronization of certain podcasts can be requested by selector 1445a. The selector 1445a can be used to specify that episodes of certain selected podcasts be considered when synchronized. A selection box 1445b can be used to select a media type, such as podcasts or playlists. The selector 1445a, when selected, enables a user to select one or more available podcasts (or playlists) from a list 1446 being displayed. The user can then select one or more of the podcasts (or playlists) being displayed in the displayed list 1446. Upon synchronization, the synchronization preferences associated with the podcast synchronization preference screen 1440 can be utilized with respect to podcasts. The podcast synchronization preference screen 1440 can also include the lower portion 1408 as discussed above.

Figure 14F:
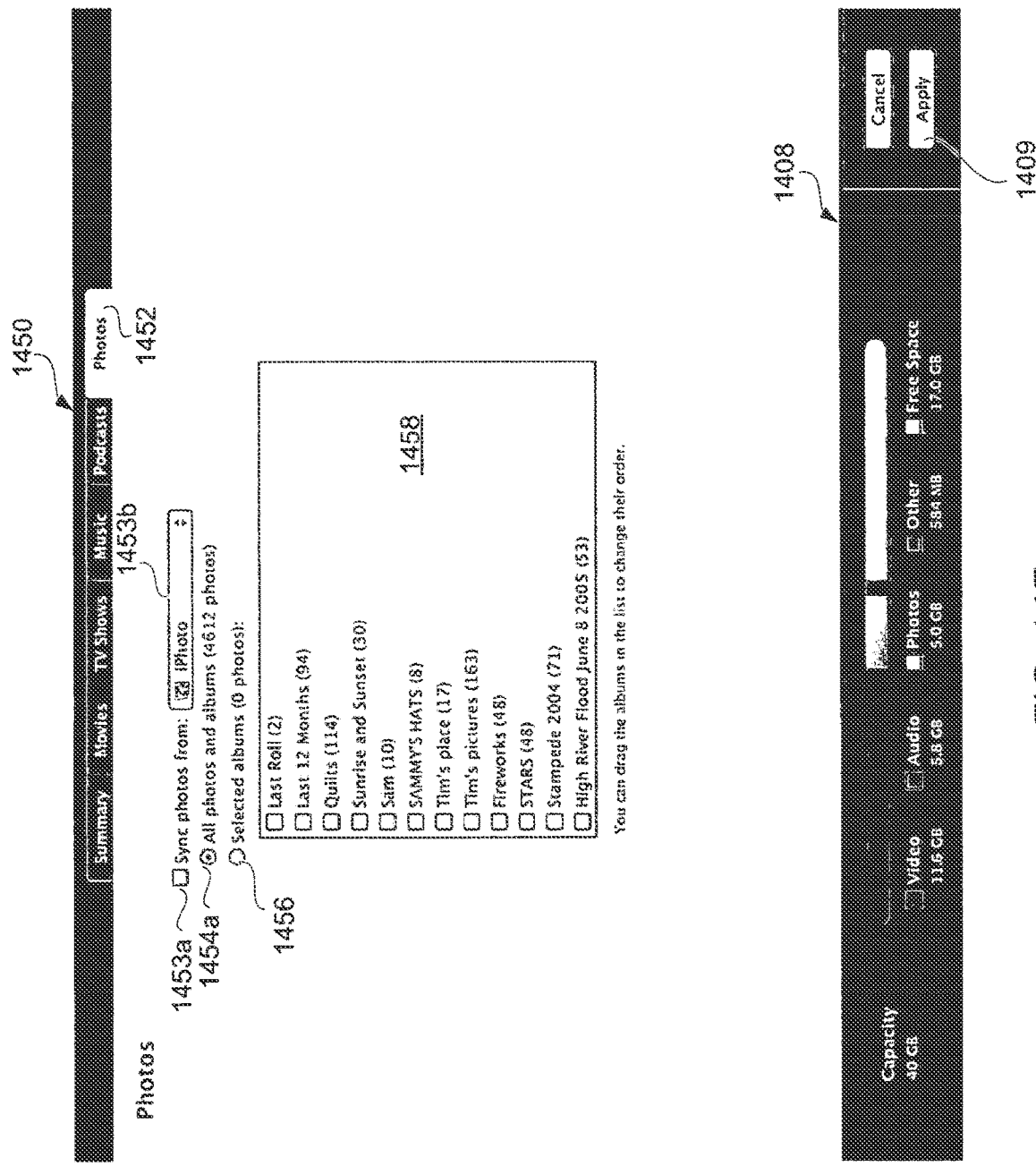

FIG. 14F is a photo synchronization preference screen 1450 according to one embodiment of the invention. The photo synchronization preference screen 1450 indicates a photos tab 1452 being selected. The photo synchronization preference screen 1452 allows a user to make one or more selections to influence synchronization of photos. Although not illustrated, the photo synchronization preference screen 1450 can include a source region that specifies various media sources that can be selected. Here, the selected media source is the same particular device as selected in the source region 1413 illustrated in FIG. 14B. When the particular device is so selected, the preference setting region can display a graphical user interface that facilitates the user in setting synchronization preferences to be used when synchronizing photos with respect to the particular device (e.g., a media player) and a host device (e.g., personal computer). More particularly, the photo synchronization preference screen 1450 includes a check box 1453a that can be used to request (e.g., enable or disable) synchronization of photos. When synchronization of photos is requested, a selection box 1453b can be used to specify a source (e.g., source folder or application) of photos that are to be synchronized. A selector 1454 can be used to generally request that all photos and albums (i.e., photo albums) be synchronized. Alternatively, synchronization of certain albums (i.e., photo albums) can be requested by selector 1456. The selector 1456 can be used when certain selected albums are to be synchronized. The selector 1456, when selected, enables a user to select one or more available albums from a list 1458 being displayed. The user can then select one or more of the albums being displayed in the displayed list 1458. In one implementation, the list 1458 can display the name of the albums as well as provide an indication of the number of photos in the album (e.g., "Firework (48)"). Upon synchronization, the synchronization preferences associated with the photo synchronization preference screen 1450 can be utilized with respect to photos. The podcast synchronization preference screen 1450 can also include the lower portion 1408 as discussed above.

Another aspect of the invention pertains to pairing a media device with a host device (host computer). Once paired data can be transferred between the media device and the host computer in a wireless manner.

Figure 15:
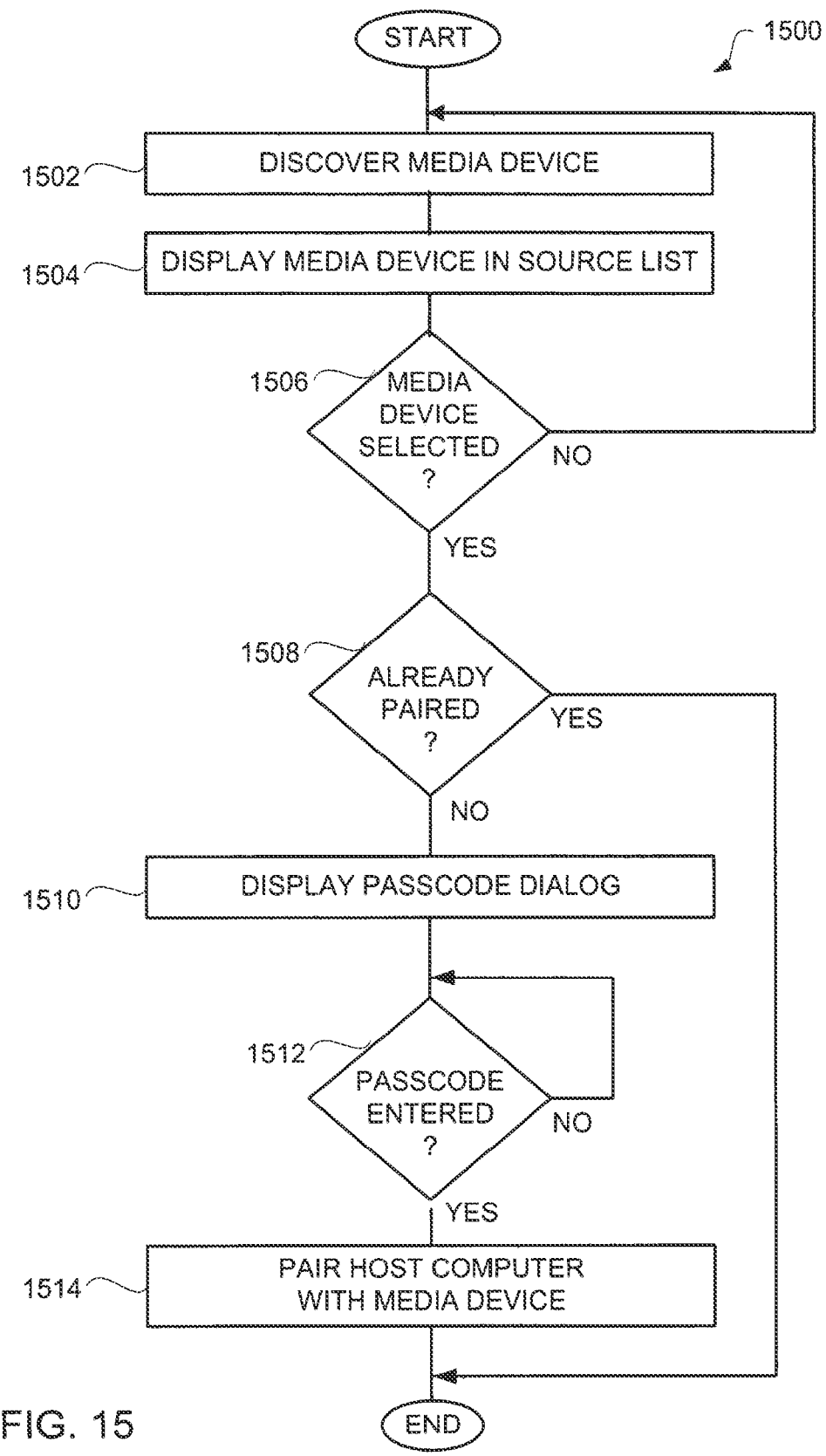
FIG. 15 is a flow diagram of a pairing process according to one embodiment of the invention.

FIG. 15 is a flow diagram of a pairing process 1500 according to one embodiment of the invention. A media device can be wirelessly connected to a host computer using a wireless protocol. Typically, short range wireless protocols, such as Bluetooth, requires a pairing operation. Although the wireless network is typically local, the wireless network range can vary. The pairing process 1500 concerns operations performed by the host computer in order to pair itself with a media device.

The pairing process 1500 can operate to discover 1502 a media device. Then, the media device can be displayed 1504 in a source list. A decision 1506 can then determines whether the media device is selected. Here, the selection of the media device can be manual by interaction with a user of the host computer or can be automatic by the host computer itself. In any case, when the decision 1506 determines that a media device has not been selected, the pairing process 1500 returns to repeat the block 1502 so that the host device can continue to monitor for the presence of media devices that are eligible to be selected.

On the other hand, when the decision 1506 determines that a media device has been selected, a decision 1508 determines whether the media device is already paired with the host computer. When the decision 1508 determines that the media device is already paired with the host computer, then the pairing process 1500 can end given that the media device is already paired with the host device. On the other hand, when the decision 1508 determines that the media device is not already paired with the host device, then a passcode dialog can be displayed 1510. Here, the passcode dialog is displayed on a display device associated with the host computer. The passcode dialog enables a user of the host computer to enter a passcode (or PIN code) that will be utilized in pairing the host computer with the media device. After the passcode dialog is displayed 1510, a decision 1512 determines whether a passcode has been entered. When the decision 1512 determines that a passcode has not yet been entered, the pairing processing 1500 awaits entry of a passcode. For example, a user of the host computer can enter a passcode. In one implementation, the media device presents (e.g., displays) its passcode, and the user of the host device then enter such same password into the passcode dialog. Once the decision 1512 determines that a passcode has been entered, the host computer can be paired 1514 with the media device. After the host computer has been paired 1514 with the media device, the pairing process 1500 ends with pairing having been successfully performed.

Figure 16:
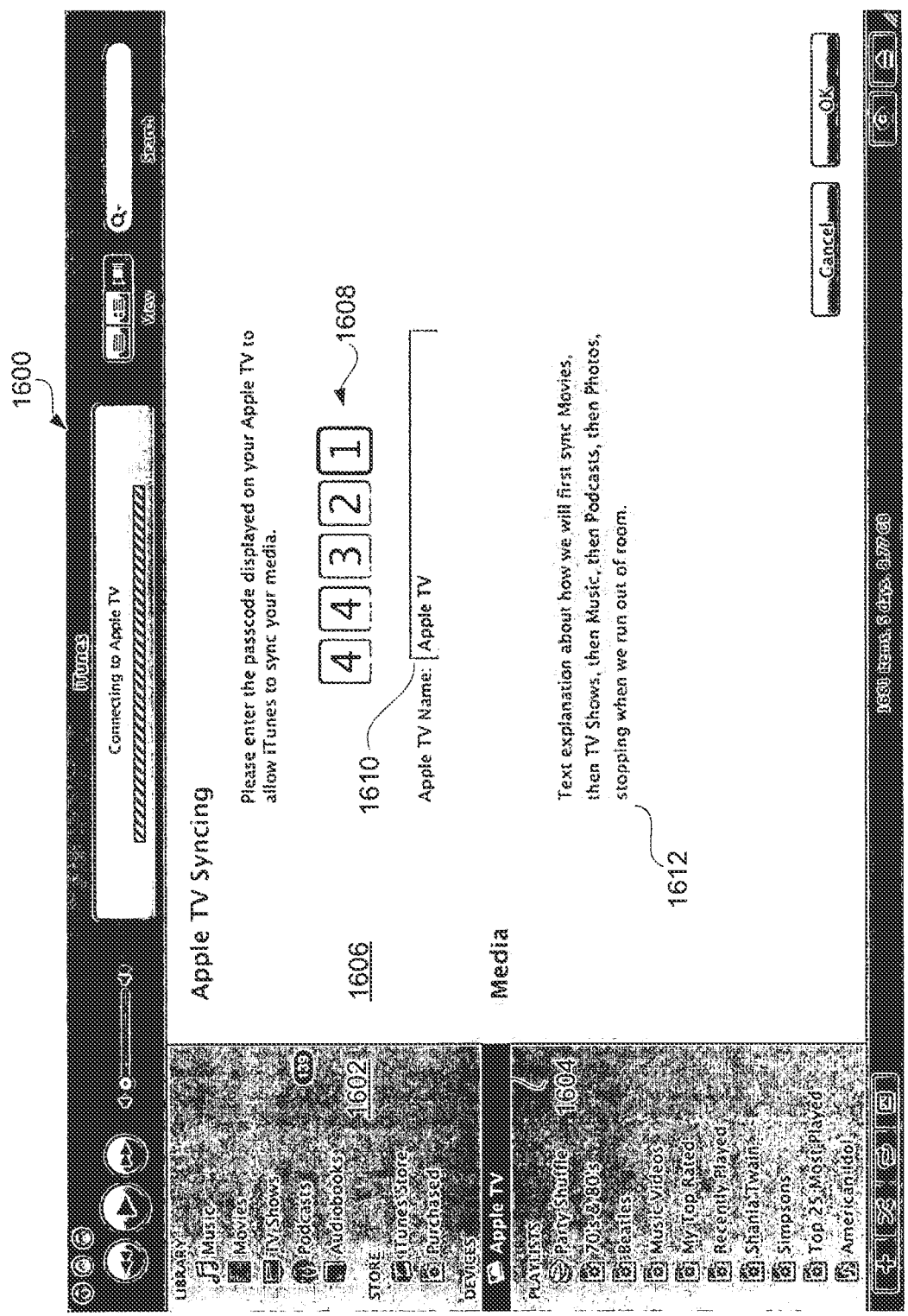
FIG. 16 is an exemplary screen shot of a passcode dialog page according to one embodiment of the invention.

FIG. 16 is an exemplary screen shot of a passcode dialog page 1600 according to one embodiment of the invention. The passcode dialog page 1600 includes a source portion 1602 in which a particular media device, referred to "Apple TV" is selected and denoted by visual highlighting 1604. The passcode dialog page 1600 also includes an information portion 1606. The information portion 1606 presents a graphical user interface that assists a user with entering a passcode. In this regard, the information portion 1606 includes a passcode entry component 1608, a device name component 1610, and a media synchronization explanation area 1612. For example, the media synchronization explanation area 612 can include an explanation of the general priority order used during synchronization of various different types (e.g., categories) of media assets.

Another aspect of one embodiment of the invention is synchronization of widgets. The synchronization can be performed differently for different device. The synchronization can also be influenced or controlled by widget synchronization preferences.

Figure 17:
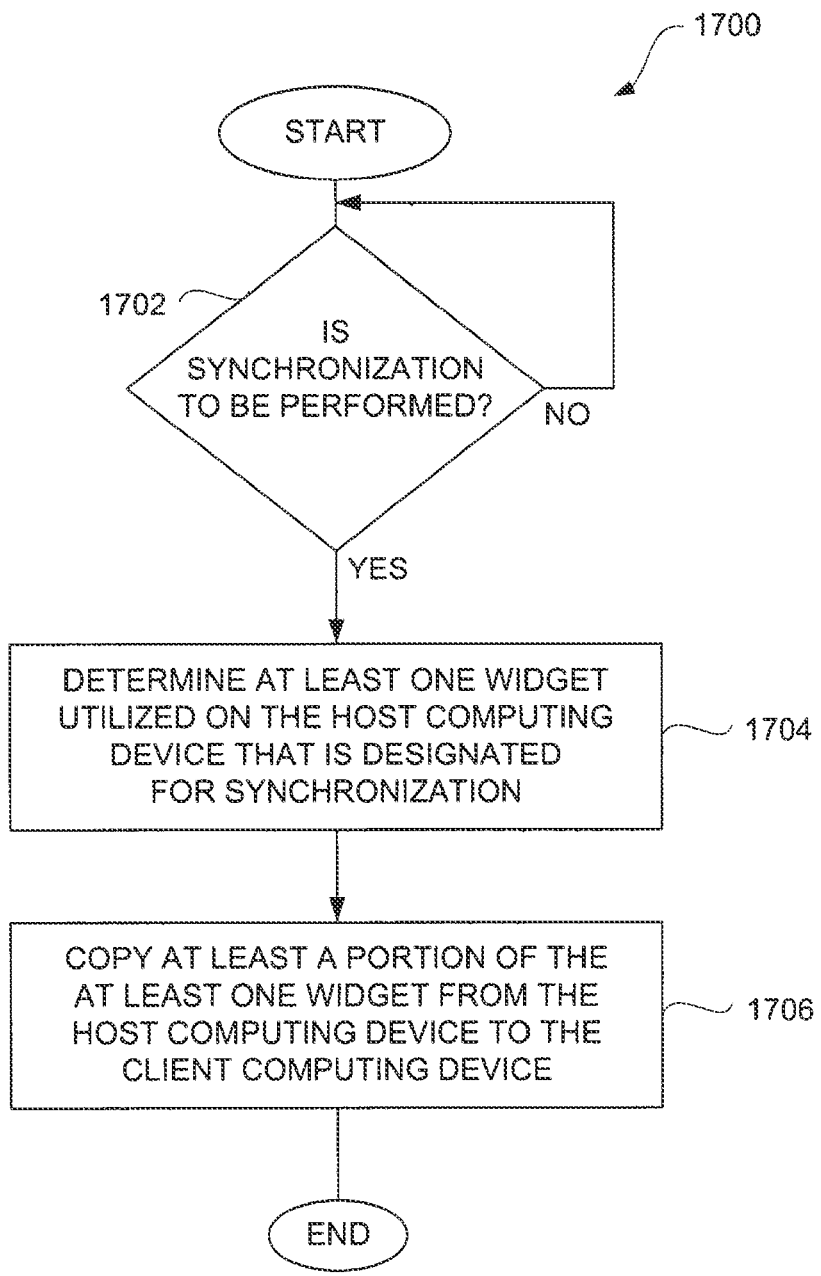
FIG. 17 is a flow diagram of a widget synchronization process according to one embodiment of the invention.

FIG. 17 is a flow diagram of a widget synchronization process 1700 according to one embodiment of the invention. The widget synchronization process 1700 is, for example, is performed by a host device, such as a host computing device. For example, the host device can correspond to the host computer 102 illustrated in FIG. 1A, the host computer 152 illustrated in FIG. 1B or the host computer 1302 illustrated in FIG. 13A.

The widget synchronization process 1700 can begin with a decision 1702 that determines whether synchronization is to be performed. When the decision 1702 determines that synchronization is not to be performed at this time, a widget synchronization process 1700 waits until synchronization is to be performed. Synchronization can be performed (i) when requested by a user or (ii) when a trigger event is detected.

In any case, once the decision 1702 determines that synchronization is to be performed, at least one widget utilized on the host computing device that is designated for synchronization can be determined 1704. Then, at least a portion of the at least one widget that has been determined can be copied 1706 from the host computing device to the client computing device. In this regard, data associated with the at least one widget is transferred from the host computing device to the client computing device. Hence, there exists a data connection between the host computing device and the client computing device. The data connection can be supported by a cable coupled between the host computing device and the client computing device, by a local area network, by a public or global network, by a wireless network, or by other means. After the at least one widget has been copied 1706 from the host computing device to the client computing device, the widget synchronization process 1700 ends.

Figure 18A:
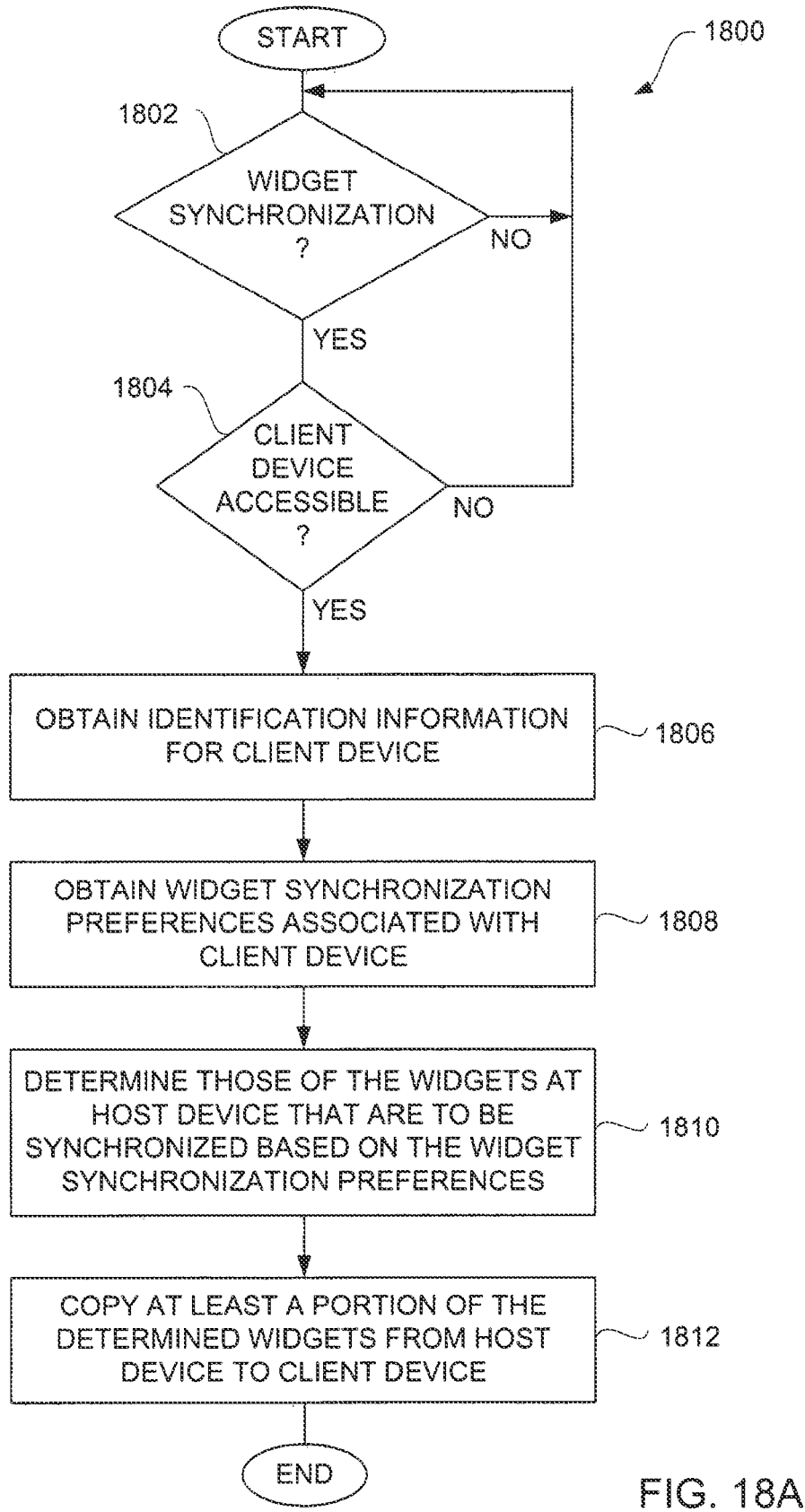
FIG. 18A is a flow diagram of a host synchronization process according to one embodiment of the invention.

FIG. 18A is a flow diagram of a host synchronization process 1800 according to one embodiment of the invention. The host synchronization process 1800 is, for example, performed by a host device, such as a host computing device. For example, the host device can correspond to the host computer 102 illustrated in FIG. 1A, the host computer 152 illustrated in FIG. 1B or the host computer 1302 illustrated in FIG. 13A.

The host synchronization process 1800 begins with a decision 1802 that determines whether widget synchronization has been triggered. When the decision 1802 determines that widget synchronization has not been triggered, the host synchronization process 1800 waits until widget synchronization has been triggered. For example, widget synchronization can be provided automatically following detection of a trigger event. Alternatively, once the decision 1802 determines that widget synchronization has been triggered, a decision 1804 determines whether a client device is accessible. When the decision 1804 determines that a client device is not accessible, then the host synchronization process 1800 returns to repeat the block 1802 since, in this case, the client device is not available to participate in the synchronization process at this time. On the other hand, when the decision 1804 determines that the client device is accessible, identification information for the client device is obtained 1806. The identification information for the client device can identify the type, characteristics or attributes of the client device. In addition, widget synchronization preferences associated with the client device are obtained 1808. Next, those of the widgets at the host device that are to be synchronized based on the widget synchronization preferences can be determined 1810. Thereafter, at least a portion of the determined widgets can be copied 1812 from the host device to the client device. Following the block 1812, the host synchronization process 1800 ends.

Figure 18B:
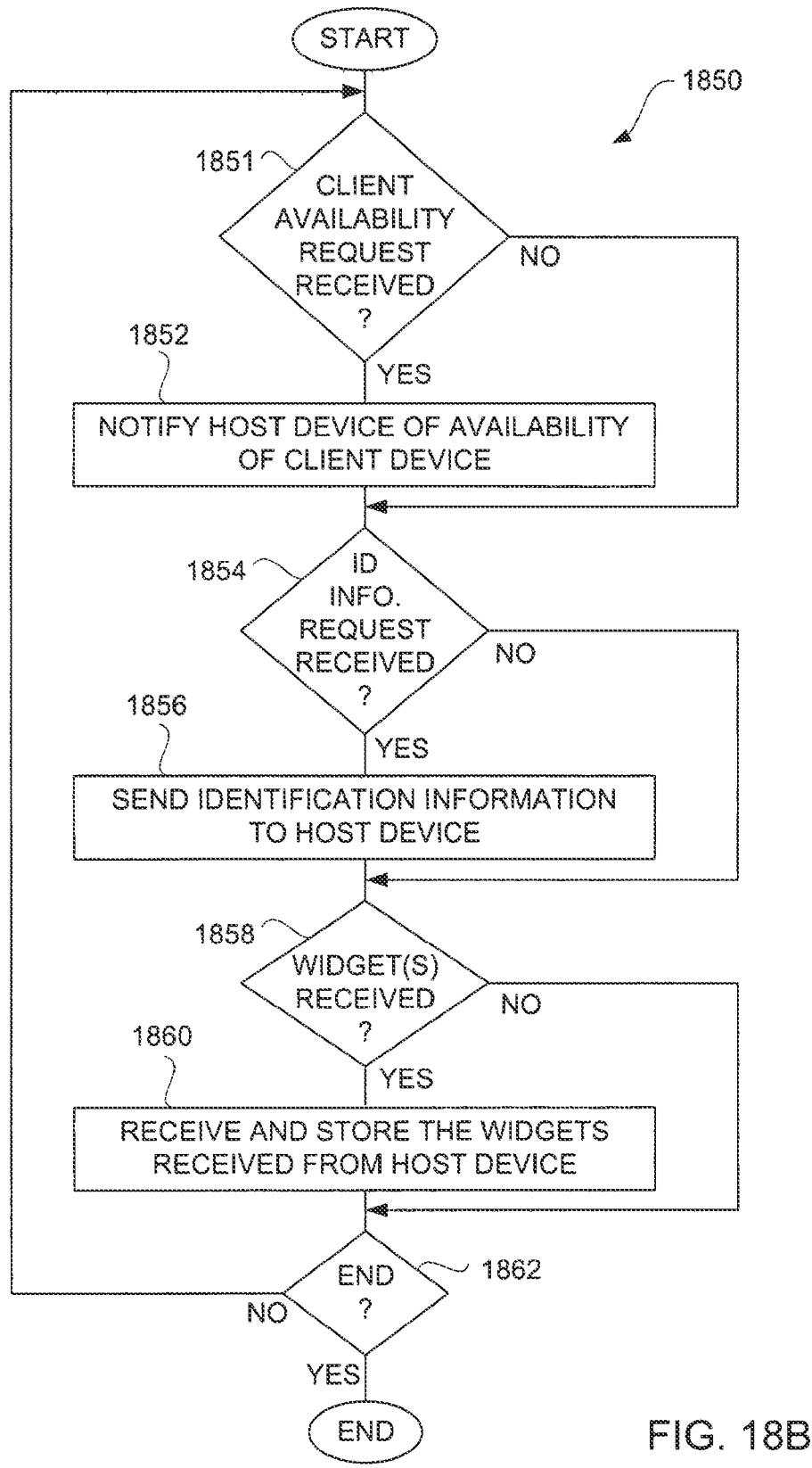
FIG. 18B is a flow diagram of a client synchronization process according to one embodiment of the invention.

FIG. 18B is a flow diagram of a client synchronization process 1850 according to one embodiment of the invention. The client synchronization process 1850 is, for example, performed by a client device, such as a client computing device. For example, the client device can correspond to the media devices 106-110 illustrated in FIG. 1A, the media device 170 illustrated in FIG. 1B or the client device 1304 illustrated in FIG. 13A. The client synchronization process 1850 can be considered as complimentary processing to the host synchronization process 1800 illustrated in FIG. 18A.

The client synchronization process 1850 can begin with a decision that determines whether a client availability request has been received. When the decision 1851 determines that a client availability request has been received, then the host device is notified 1852 of availability of the client device. On the other hand, when the decision 1851 determines that a client availability request has been received, the host device can be notified 1852 of the availability of the client device.

Following the block 1852, as well as directly following the decision 1851 when a client availability request has not been received, a decision 1854 determines whether an identifier information request can be received. When the decision 1854 determines that an identifier information request has been received, identification information can be sent 1856 to the host device. Following the block 1856, as well as directly following the decision 1854 when an identifier information request has not been received, a decision 1858 determines whether one or more widgets have been received from the host device. When the decision 1858 determines that one or widgets have been received, the one or more widgets can be received and stored 1860. Following the block 1860, as well as following the decision 1858 when a widget has not been received, a decision 1862 determines whether the client synchronization process 1850 should end. When the decision 1862 determines that the client synchronization process 1850 should not end, then the client synchronization process 1850 can return to repeat the decision 1851 and subsequent blocks so that additional client synchronization processing 1850 can continue. Alternatively, when the decision 1862 determines that the client synchronization process 1850 should end, then the client synchronization process 1850 ends.

Figure 19:
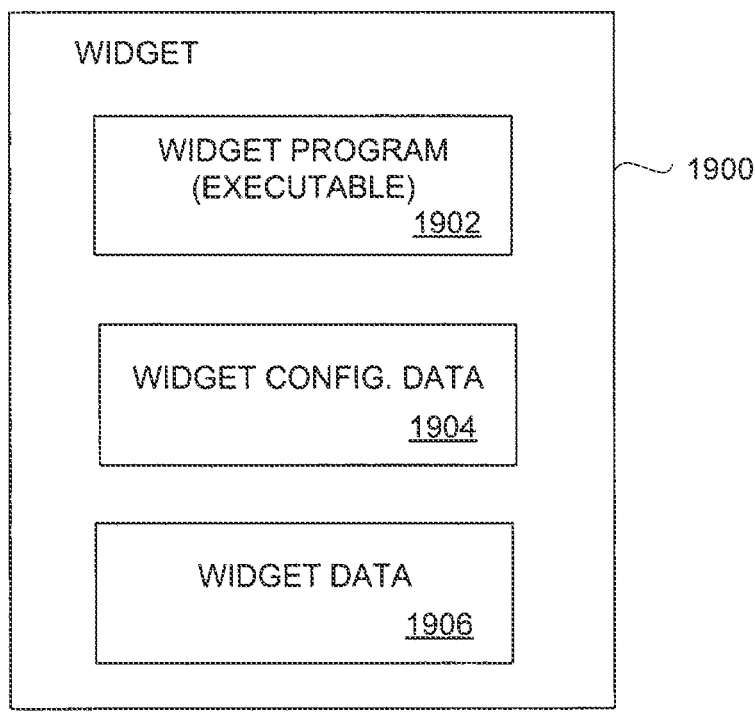
FIG. 19 is a diagram of an exemplary widget according to one embodiment of the invention.

FIG. 19 is a diagram of an exemplary widget 1900 according to one embodiment of the invention. The exemplary widget 1900 can include a widget program 1902, widget configuration data 1904 and widget data 1906. A widget program is an executable computer program that is operable on a computing device. Typically, a widget program is a small computer program that can be operated (executed or interpreted) by a computing device. The widget configuration data 1904 is utilized by the widget program 1902. The widget configuration data operates to configure the manner of operation of the widget by way of the widget program 1902. The widget data 1906 is data that is used, produced and/or stored by the widget program 1902.

Figure 20A:
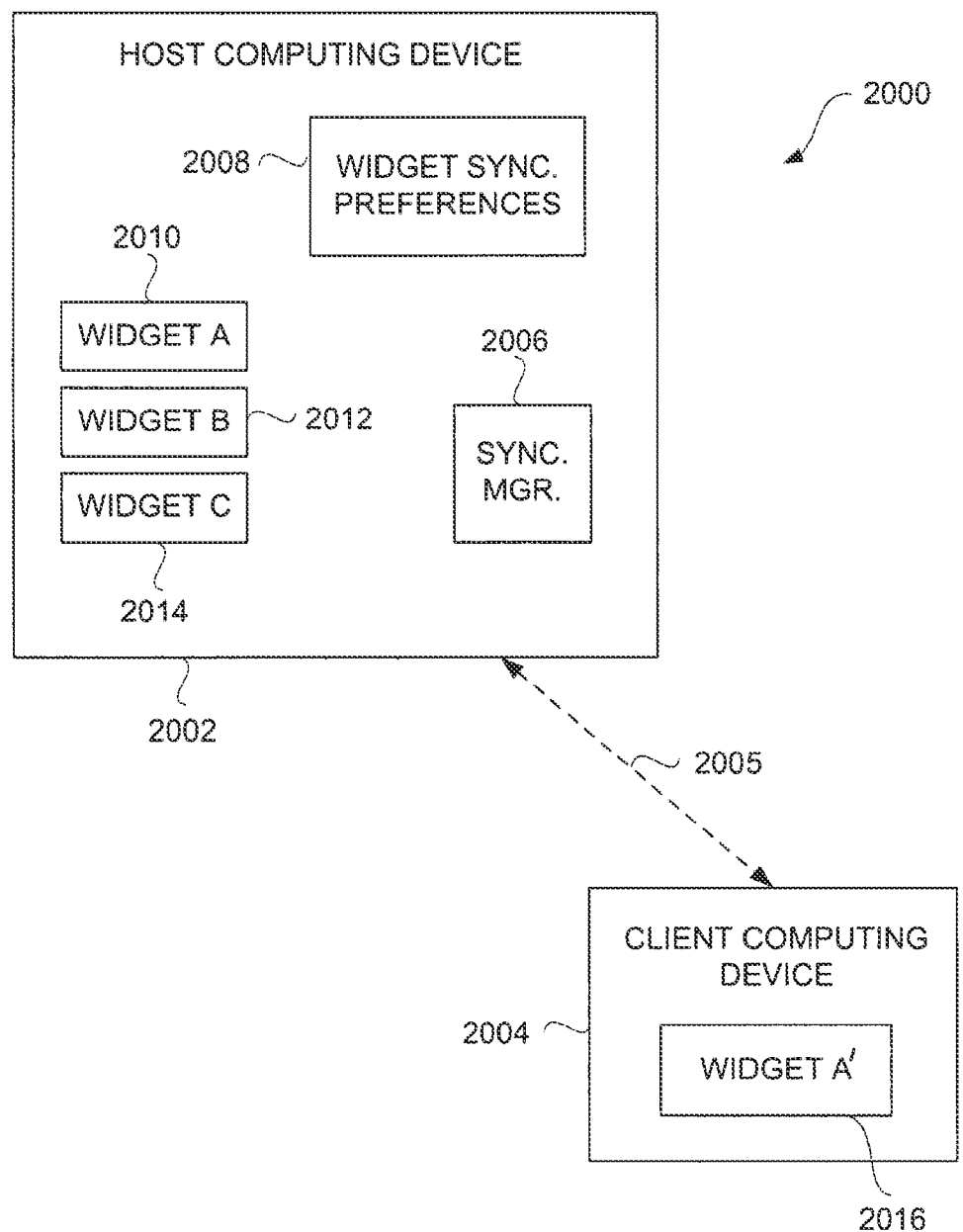
FIG. 20A is a block diagram of a widget synchronization system according to one embodiment of the invention.

FIG. 20A is a block diagram of a widget synchronization system 2000 according to one embodiment of the invention. The widget synchronization system 2000 includes a host computing device 2002 and a client computing device 2004. A data link 2005 can be provided between the host computing device 2002 and the client computing device 2004. The data link 2005, when provided, can be a wireless connection (e.g., via a wireless network) or a wired connection (e.g., via a cable or local area network). The host computing device 2002 can include a synchronization manager 2006. The synchronization manager 2006 is a program module operable on the host computing device 2002 to manage synchronization of the host computing device 2002 with one or more client computing devices, including the client computing device 2004.

Although various different types of data can be synchronized between devices, one type of data that can be managed by the synchronization manager 2006 are widgets. In managing the synchronization of widgets, the synchronization manager can utilize widget synchronization preferences 2008. In one embodiment, the widget synchronization preferences 2008 are established by a user of the host computing device 2002. For example, the user of the host computing device 2002 can interact with display screens that present a graphical user interface that assists the user in setting one or more synchronization preferences.

At the state shown in FIG. 20A, the host computing device 2002 presently stores three (3) widgets that are active and stored on the host computing device 2002. These active widgets include widget A 2010, widget B 2012, and widget C 2014. When the synchronization manager 2006 determines that the client computing device 2004 is coupled to the host computing device 2002 via the data link 2005, the synchronization manager 2006 can perform synchronization between the host computing 2002 and the client computing device 2004 in accordance with the widget synchronization preferences 2008. For example, as shown in FIG. 20A, the client computing device 2004 includes widget A' 2016 which is active and stored on the client computing device 2004. The widget A' 2016, for example, can represent an older version of the widget A 2010 that is active on the host computing device 2002. Hence, the synchronization manager 2006 determines that the active and stored widgets at the host computing device 2002 and the client computing device 2004 are different. As a result, the synchronization manager 2006 can cause the widgets to be synchronized between the host computing device 2002 and the client computing device.

Figure 20B:
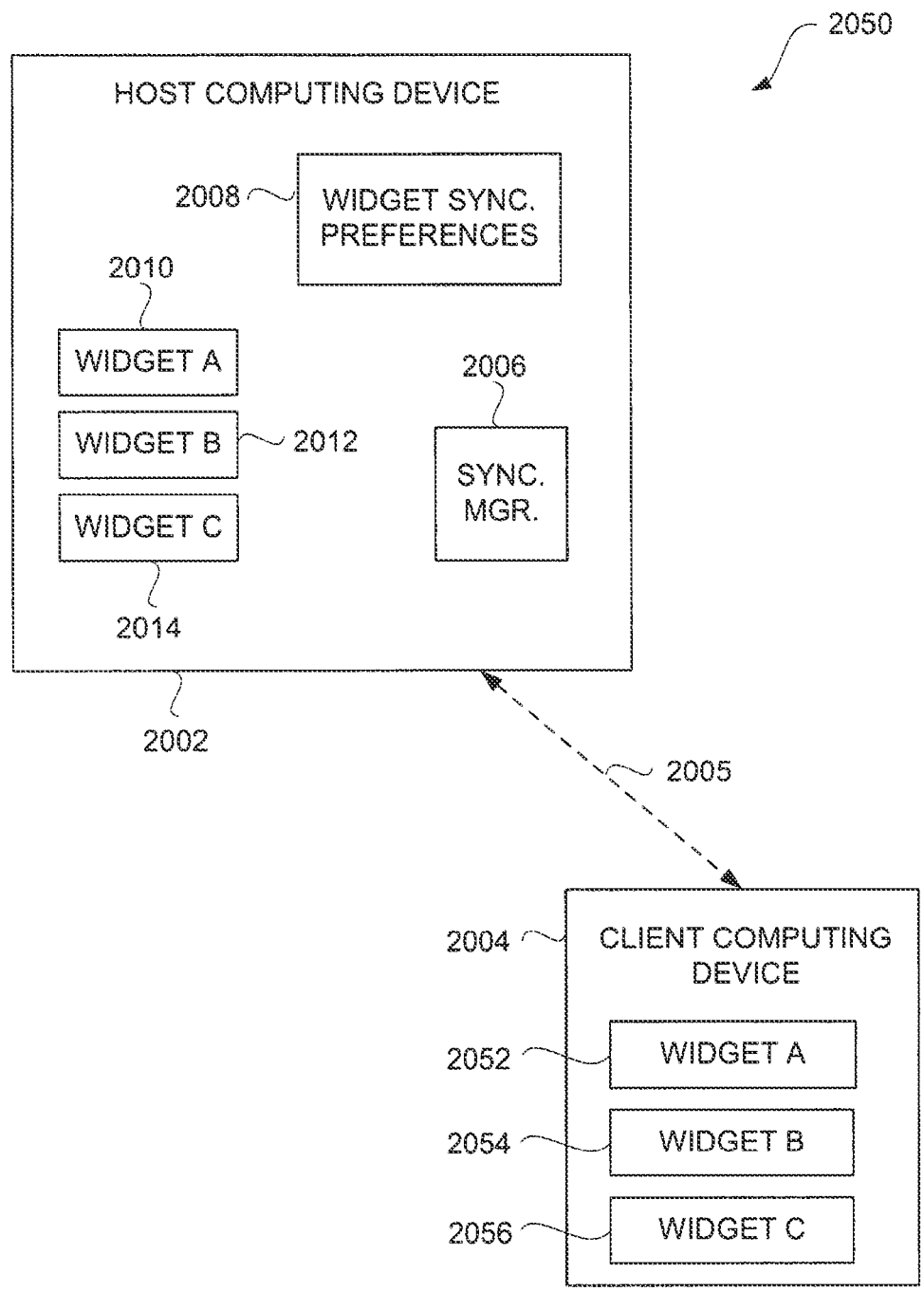
FIG. 20B is a block diagram of a widget synchronization system according to another embodiment of the invention.

FIG. 20B is a block diagram of a widget synchronization system 2050 according to another embodiment of the invention. The widget synchronization system 2050 is generally the same widget synchronization system 2000 as illustrated in FIG. 20A; however, the widget synchronization system 2050 has undergone a synchronization process between the host computing device 2002 and the client computing device 2004. As a result of the synchronization process, the host computing device 2002 had those widgets active and stored thereon copied to the client computing device 2004 so that the client computing device 2004 has its widgets synchronized with respect to those widgets at the host computing device 2002. In particular, the client computing device 2004, following synchronization, includes widget A 2052, widget B 2054, and widget C 2056. Although the client computing device 2004 previously stored the widget A' 2016, the widget A 2010 active and stored at the host computing device is (in this example) deemed a more recent version of the widget than was the widget A' 2016. During synchronization, the widget A 2010 from the host computing device 2002 is copied to and stored on the client computing device 2004 as widget A 2052. Hence, as illustrated in FIG. 20B, the widget A' 2016 within the client computing device 2004 in FIG. 20A has been replaced by the widget A 2052. Furthermore, the synchronization process operates to copy the widget B 2012 and the widget C 2014 from the host computing device 2002 to the client computing device 2004 as widget B 2054 and widget C 2056, respectively. In this example, it is assumed that the widget synchronization preferences 2008 authorize widget synchronization, and also request that during synchronization, all widgets (or at least widgets A, B and C) on the host computing device 2002 be synchronized or copied to the client computing device 2004.

It should also be noted that the widget synchronization preferences 2008 can differ for different client computing devices. Hence, the synchronization process with respect to another client computing device can operate differently by way of the user setting different widget synchronization preferences for the other client computing device.

Another aspect of one embodiment of the invention is a graphical user interface for setting widget synchronization preferences. As noted above, widget synchronization preferences can be set by a user and thereafter used in influencing or controlling that nature, manner and extent that data, namely, widget, are synchronized between different devices (e.g., computing device).

Figure 21A:
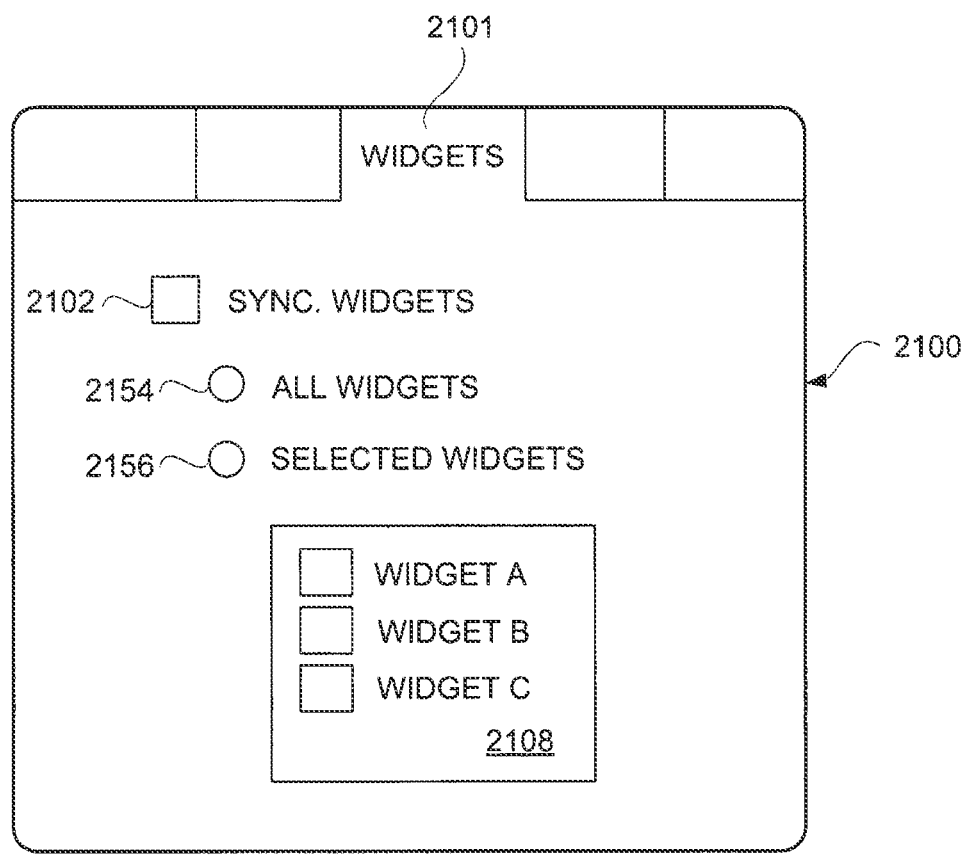
FIG. 21A is a widget synchronization preference screen according to one embodiment of the invention.

FIG. 21A is a widget synchronization preference screen 2100 according to one embodiment of the invention. The synchronization preference screen 2100 can be presented on a display device associated with a host device (e.g., host computing device). The widget synchronization preference screen 2100 indicates a widget tab 2101 being selected. When the widget tab 2101 is selected, the widget synchronization preference screen 2100 is presenting an active graphical user interface for a user. The graphical user interface enables the user to set one or more synchronization preferences to be utilized with respect to widgets. In this regard, the graphical user interface being presented on the widget synchronization preference screen 2100 includes a check box 2102 that can be used to request synchronization of widgets. Namely, when the check box 2102 is checked, synchronization of widgets is enabled, and when the check box 2102 is not checked, synchronization of widgets is disabled. When synchronization of widgets is requested, a selector 2104 can be used to request that all widgets be synchronized, and a selector 2106 can be used to request that selected widgets be synchronized. The selector 2106, when selected, enables a user to select one or more available widgets from a list 2108 being displayed. The list 2108 of available widgets can include those available widgets on the host device.

The widget synchronization preference screen 2100, according to one embodiment, can pertain to a particular client device. In particular, the host device can present the widget synchronization preference screen 2100 for setting of widget synchronization preferences for use when synchronizing widgets between the host device and the particular client device. In the case in which the host device supports a plurality of client devices, the host device can provide widget synchronization preference screens for each of the different devices. As such, the synchronization preference settings with respect to one client device can be different than the synchronization preference settings for another client device.

Figure 21B:
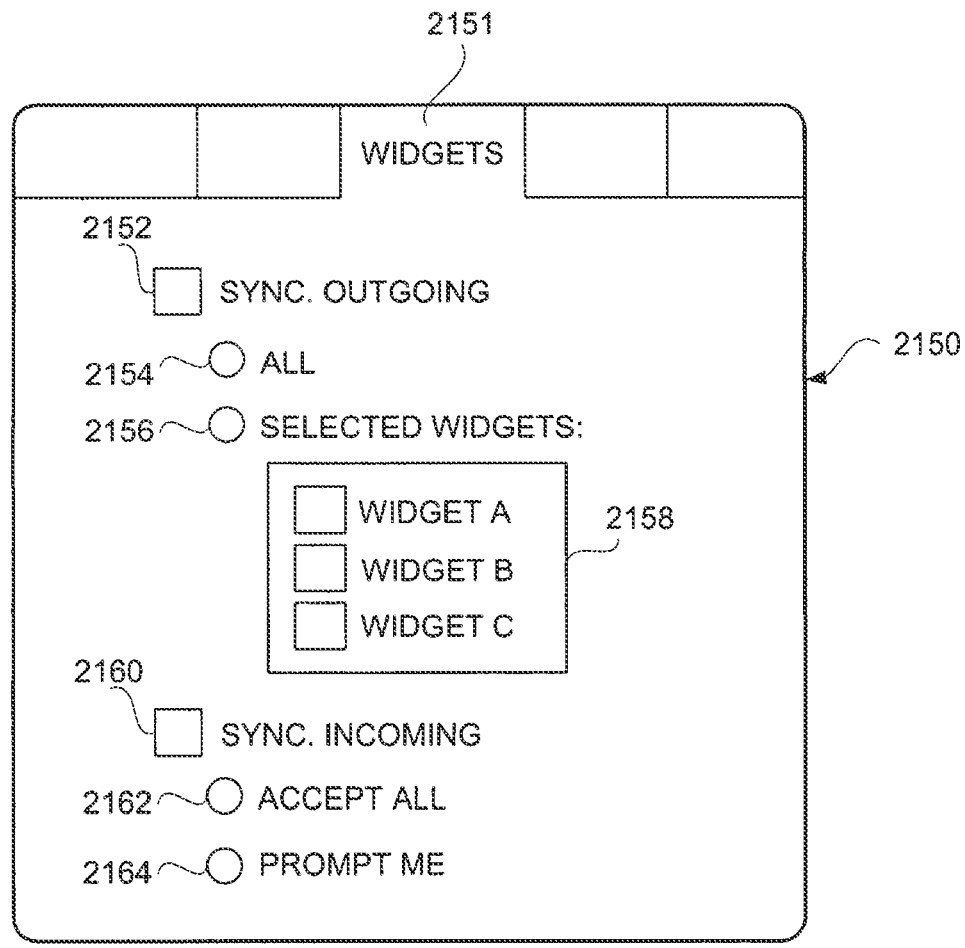
FIG. 21B is an exemplary diagram of a widget synchronization preference screen according to one embodiment of the invention.

FIG. 21B is an exemplary diagram of a widget synchronization preference screen 2150 according to one embodiment of the invention. The widget synchronization preference screen 2150 enables a user to make one or more selections to influence synchronization of widgets in a two-way manner. For example, the synchronization preferences can be set for outgoing synchronization as well incoming synchronization. Outgoing synchronization is with respect to synchronizing widgets available on a host device and determining which of such widgets are to be synchronized to a client device. Incoming synchronization involves determining the extent to which a host device should have its widgets synchronized with those existing on a client device. The widget synchronization preference screen 2150 includes a check box 2152 that can be used to request (e.g., enable or disable) synchronization of widgets in an outgoing manner. When synchronization of outgoing widgets is requested (e.g., enabled), a selector 2154 can be used to request that all widgets be synchronized, and a selector 2156 can be used to request that selected widgets be synchronized. The selector 2156, when selected, enables the user to select one or more available widgets from a list 2158 being displayed. Furthermore, with respect to incoming widgets, a user can make one or more selections to influence synchronization of incoming widgets. Specifically, a check box 2160 can be used to request (e.g., enable or disable) synchronization of incoming widgets. When synchronization of incoming widgets is requested (e.g., enabled), a selector 2162 can be used to request that all incoming widgets be synchronized and a selector 2164 can be used to request that the user be prompted when incoming widgets are available for synchronization to the host device. As an example, a user could be prompted by displaying a dialog box (e.g., information window) on the display associated with the host device. The user can then read the information concerning the available synchronization of one or more incoming widgets and decide whether to approve or decline the synchronization.

Additional details on widgets and their synchronization can be found in the following pending patent applications: (i) U.S. application Ser. No. 11/499,887, filed Aug. 4, 2006, and entitled "SYNCHRONIZATION OF WIDGETS AND DASHBOARDS," which is hereby incorporated herein by reference; and (ii) U.S. application Ser. No. 10/877,968, filed Jun. 25, 2004, and entitled "UNIFIED INTEREST LAYER FOR USER INTERFACES," which is hereby incorporated herein by reference.

Embodiments of the invention can be well suited for electronic devices having computer program execution and/or audio playback capabilities, such as portable media devices (e.g., digital media players or MP3 players) or other portable multi-function devices (e.g., mobile telephone or Personal Digital Assistant). For example, portable devices (including mobile devices) can often store and play digital media assets (media items), such as music (e.g., songs), videos (e.g., movies), audiobooks, podcasts, meeting recordings, and/or other multimedia recordings. Portable devices, such as portable media players or other portable multi-function devices, can also be small and highly portable and have limited processing resources. Often, portable devices are hand-held devices, such as hand-held media players or hand-held multi-function devices, which can be easily held by and within a single hand of a user. Portable devices can also be pocket-sized, miniaturized or wearable.

Figure 22:
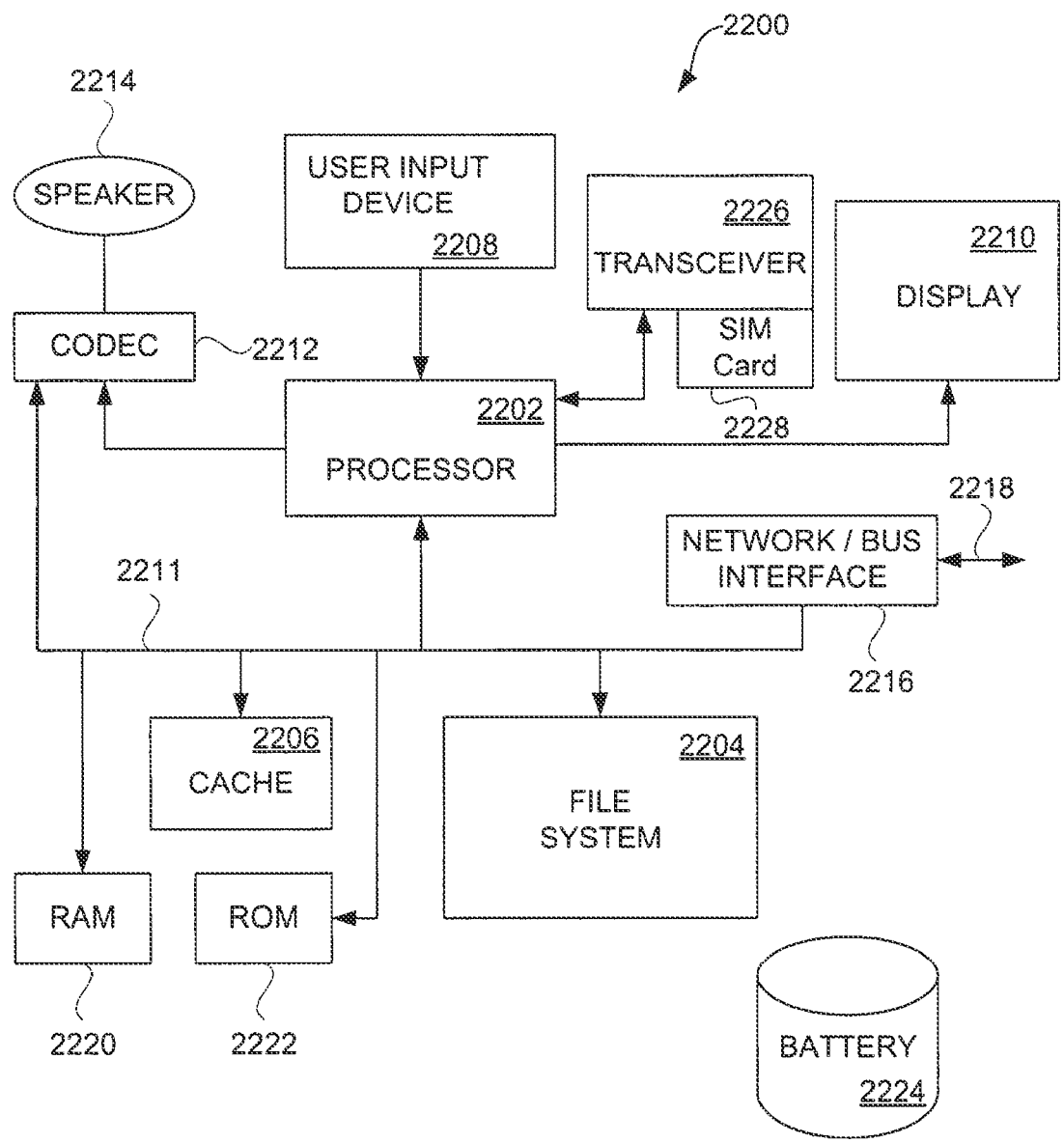
FIG. 22 is a block diagram of a mobile multi-function device according to one embodiment of the invention.

FIG. 22 is a block diagram of a mobile multi-function device 2200 according to one embodiment of the invention. The mobile multi-function device 2200 can, for example, include the circuitry of one or more of the media devices illustrated in FIG. 1A or the media device 170 illustrated in FIG. 1B. The mobile multi-function device 2200 includes hardware and software components to provide at least two functions, namely, a media playback function and a wireless voice communications function. When providing media playback, the mobile multi-function device 2200 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 2200 can operates a mobile telephone (e.g., cellular phone).

The mobile multi-function device 2200 includes a processor 2202 that pertains to a microprocessor or controller for controlling the overall operation of the mobile multi-function device 2200. The mobile multi-function device 2200 stores media data pertaining to media items in a file system 2204 and a cache 2206. In one embodiment, the file system 2204 is implemented by a storage disk or a plurality of disks. In another embodiment, the file system 2204 is implemented by EEPROM or Flash type memory. The file system 2204 typically provides high capacity storage capability for the mobile multi-function device 2200. However, since the access time to the file system 2204 is relatively slow, the mobile multi-function device 2200 can also include a cache 2206. The cache 2206 is, for example, Random-Access Memory (RAM) provided by semiconductor memory. The relative access time to the cache 2206 is substantially shorter than for the file system 2204. However, the cache 2206 does not have the large storage capacity of the file system 2204. Further, the file system 2204, when active, consumes more power than does the cache 2206. The power consumption is often a concern when the mobile multi-function device 2200 is a portable mobile multi-function device that is powered by a battery (not shown). The mobile multi-function device 2200 also includes a RAM 2220 and a Read-Only Memory (ROM) 2222. The ROM 2222 can store programs, utilities or processes to be executed in a non-volatile manner. The ROM 2222 can be implemented by an EEPROM or Flash type memory so as to provide writable non-volatile data storage. The RAM 2220 provides volatile data storage, such as for the cache 2206.

To support wireless voice communications, the mobile multi-function device 2200 includes a transceiver 2226. The transceiver 2226 supports wireless communication with a wireless network (such as a wireless cellular network). To support certain wireless networks, such as a GSM network, the multi-function device 2200 can also include a SIM card 2228. The SIM card 2228 includes an identifier (e.g., SIM identifier) can be used by the mobile multi-function device 2200 to gain access and utilize the wireless network.

The mobile multi-function device 2200 also includes a user input device 2208 that allows a user of the mobile multi-function device 2200 to interact with the mobile multi-function device 2200. For example, the user input device 2208 can take a variety of forms, such as a button, keypad, dial, etc. Still further, the mobile multi-function device 2200 includes a display 2210 (screen display) that can be controlled by the processor 2202 to display information to the user. A data bus 2211 can facilitate data transfer between at least the file system 2204, the cache 2206, the processor 2202, and the CODEC 2212.

In one embodiment, the mobile multi-function device 2200 serves to store a plurality of media items (e.g., songs) in the file system 2204. When a user desires to have the mobile multi-function device play a particular media item, a list of available media items is displayed on the display 2210. Then, using the user input device 2208, a user can select one of the available media items. The processor 2202, upon receiving a selection of a particular media item, supplies the media data (e.g., audio file) for the particular media item to a coder/decoder (CODEC) 2212. The CODEC 2212 then produces analog output signals for a speaker 2214. The speaker 2214 can be a speaker internal to the mobile multi-function device 2200 or external to the mobile multi-function device 2200. For example, headphones or earphones that connect to the mobile multi-function device 2200 would be considered an external speaker.

The mobile multi-function device 2200 also includes a bus interface 2216 that couples to a data link 2218. The data link 2218 allows the mobile multi-function device 2200 to couple to a host device (e.g., host computer or power source). The data link 2218 can also provide power to the mobile multi-function device 2200.

The mobile multi-function device 2200 illustrated in FIG. 22 represents only one embodiment of a mobile device suitable for use with the invention. Other embodiments can be significantly different. For example, other embodiments need not provide a wireless voice communications function. For example, the client device 1304 illustrated in FIG. 13 is typically a media device that primarily provides storage and playback of media assets. The client device 1304 can also support network access, such that media assets can be acquired from an online media store. However, the client device 1304 could be implemented by a device similar to the multi-function device 2200 illustrated in FIG. 22, though the device would support local wireless data communications with the transceiver 2226 and no SIM card 2228 would be needed. Also, the display could be separately provided from the client device 1304.

The various aspects, embodiments, implementations or features of the invention can be used separately or in any combination.

Media assets can pertain to audio (e.g., songs, audio books, podcasts), videos (e.g., movies, music videos) or images (e.g., photos), as different types of media assets. Media assets also includes any combinations of these different type of media assets with other data.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, memory cards, USB drives, magnetic tapes, optical data storage devices, and carrier waves. The computer readable medium can also be distributed over network-coupled computer systems so that the computer readable code is stored and executed in a distributed fashion.

U.S. application Ser. No. 10/973,925, filed Oct. 25, 2004, and entitled "MULTIPLE MEDIA TYPE SYNCHRONIZATION BETWEEN HOST COMPUTER AND MEDIA DEVICE," is hereby incorporated herein by reference. U.S. application Ser. No. 10/973,657, filed Oct. 25, 2004, and entitled "IMAGE SCALING ARRANGEMENT," is hereby incorporated herein by reference. U.S. application Ser. No. 10/987,649, filed Nov. 12, 2004, and entitled "WIRELESS SYNCHRONIZATION BETWEEN MEDIA PLAYER AND HOST DEVICE," is hereby incorporated herein by reference. U.S. application Ser. No. 10/277,418, filed Oct. 21, 2002, and entitled "INTELLIGENT INTERACTION BETWEEN MEDIA PLAYER AND HOST COMPUTER," is hereby incorporated herein by reference. U.S. application Ser. No. 10/118,069, filed Apr. 5, 2002, and entitled "INTELLIGENT SYNCHRONIZATION OF MEDIA PLAYER WITH HOST COMPUTER," is hereby incorporated herein by reference.

The advantages of the invention are numerous. Different embodiments or implementations may, but need not, yield one or more of the following advantages. One advantage of the invention is that synchronization of digital assets (e.g., media assets) across different media types can be performed. The synchronization across different media types can be performed using synchronization preferences configured for the different media types. The synchronization across different media types can be performed using different priorities for different media types. Another advantage of the invention is that graphical user interfaces can be presented to assist user in setting synchronization preferences. Another advantage of the invention is that widgets are able to be synchronized between electronic devices.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A method for media asset playback, the method comprising:
   receiving, by a client computing device, a request to play a first media asset during a first transmission of one or more second media assets for storage on the client computing device from a serving computing device, wherein the storage of the one or more second media assets is prioritized over storage of the first media asset; and
   in response to a determination that the first media asset is not stored on the client computing device due at least in part to a lack of storage capacity of the client computing device:
      temporarily suspending, without user interaction and by the client computing device, the first transmission of the one or more second media assets;
      initiating a second transmission of the first media asset from the serving computing device for playback on the client computing device; and
      in response to an end of playback of the first media asset on the client computing device, resuming the first transmission of the one or more second media assets.

2. The method of claim 1, wherein initiating the second transmission includes establishing a streaming connection, wherein establishing the streaming connection comprises:
   retrieving a network address for the first media asset; and
   opening the streaming connection to the serving computing device using the retrieved network address.

3. The method of claim 2, wherein the network address is retrieved from a media database stored on the client computing device.

4. The method of claim 1, wherein the second transmission is terminated when the first media asset has been transmitted to the client computing device.

5. The method of claim 1, wherein the second transmission is terminated based on an indication to stop playback of the first media asset.

6. The method of claim 1, wherein the second transmission comprises a streaming connection.

7. The method of claim 6, further comprising in response to the determination that the first media asset is not stored on the client computing device, establishing the streaming connection with the serving computing device based on a network address; and in response to an indication to stop streaming, closing the streaming connection.

8. The method of claim 1, further comprising:
   receiving, from the serving computing device, network addresses for the one or more second media assets; and
   storing the network addresses for the one or more second media assets on the client computing device.

9. A client computing device comprising:
   at least one processor;
   at least one non-transitory computer readable medium storing instructions, which, when executed by the at least one processor, cause the at least one processor to:
      receive a request to play a first media asset during a first transmission of one or more media second assets for storage on the client computing device from a serving computing device, wherein the storage of the one or more second media assets is prioritized over storage of the first media asset; and
      in response to a determination that the first media asset is not stored on the client computing device due at least in part to a lack of storage capacity of the client computing device:
         temporarily suspend, without user interaction and by the client computing device, the first transmission of the one or more second media assets;
         initiate a second transmission of the first media asset from the serving computing device for playback on the client computing device; and
         in response to an end of playback of the first media asset on the client computing device, resume the first transmission of the one or more second media assets.

10. The client computing device of claim 9, wherein the instructions to initiate the second transmission includes instructions to establish a streaming connection, wherein the instructions to establish the streaming connection comprises instructions, which, when executed by the at least one processor, cause the at least one processor to:
   retrieve a network address for the first media asset; and
   open the streaming connection to the serving computing device using the retrieved network address.

11. The client computing device of claim 10, wherein the network address is retrieved from a media database stored on the client computing device.

12. The client computing device of claim 9, wherein the second transmission is terminated when the first media asset has been transmitted to the client computing device.

13. The client computing device of claim 9, wherein the second transmission is terminated based on an indication to stop playback of the first media asset.

14. The client computing device of claim 9, wherein the second transmission comprises a streaming connection.

15. The client computing device of claim 14, wherein the instructions further comprise instructions, which, when executed by the at least one processor, cause the at least one processor to:
   in response to the determination that the first media asset is not stored on the client computing device, establish the streaming connection with the serving computing device based on a network address; and
   in response to an indication to stop streaming, close the streaming connection.

16. The client computing device of claim 9, wherein the instructions further comprise instructions, which, when executed by the at least one processor, cause the at least one processor to:
   receive, from the serving computing device, network addresses for the one or more second media assets; and
   store the network addresses for the one or more second media assets on the client computing device.

17. At least one non-transitory computer readable medium comprising instructions, which, when executed by at least one processor, cause the at least one processor to:
   receive a request to play a first media asset during a first transmission of one or more second media assets for storage on a client computing device from a serving computing device, wherein the storage of the one or more second media assets is prioritized over storage of the first media asset; and
   in response to a determination that the first media asset is not stored on the client computing device due at least in part to a lack of storage capacity of the client computing device:

temporarily suspend, without user interaction and by the client computing device, the first transmission of the one or more second media assets;

initiate a second transmission of the first media asset from the serving computing device for playback on the client computing device; and in response to an end of playback of the first media asset on the client computing device, resume the first transmission of the one or more second media assets.

18. The at least one non-transitory computer readable medium of claim 17, wherein the instructions to initiate the second transmission includes instructions to establish a streaming connection, wherein the instructions to establish the streaming connection comprises instructions, which, when executed by the at least one processor, cause the at least one processor to:

retrieve a network address for the first media asset; and open the streaming connection to the serving computing device using the retrieved network address.

19. The at least one non-transitory computer readable medium of claim 17, wherein the second transmission comprises a streaming connection.

20. The at least one non-transitory computer readable medium of claim 19, wherein the instructions further comprise instructions, which, when executed by the at least one processor, cause the at least one processor to:

in response to the determination that the first media asset is not stored on a client computing device, establish the streaming connection with the serving computing device based on a network address; and in response to an indication to stop streaming, close the streaming connection.

* * * * *